US010795776B2

(12) United States Patent
Sipka et al.

(10) Patent No.: US 10,795,776 B2
(45) Date of Patent: Oct. 6, 2020

(54) MULTIPLE POINT-IN-TIME COPIES ON A REMOTE SYSTEM

(71) Applicant: International Business Machines Corporation, Armonk, NY (US)

(72) Inventors: Andrea Sipka, Chandler's Ford (GB); John P. Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 15/804,994

(22) Filed: Nov. 6, 2017

(65) Prior Publication Data

US 2019/0138399 A1 May 9, 2019

(51) Int. Cl.
*G06F 17/30* (2006.01)
*G06F 11/14* (2006.01)

(52) U.S. Cl.
CPC ...... *G06F 11/1464* (2013.01); *G06F 11/1469* (2013.01)

(58) Field of Classification Search
CPC ...... G06F 16/184; G06F 16/27; G06F 16/273; G06F 16/1756; G06F 16/51; G06F 16/113
See application file for complete search history.

(56) References Cited

U.S. PATENT DOCUMENTS 5,339,407 A 8/1994 Goldman et al.
6,467,054 B1 10/2002 Lenny
6,785,789 B1 * 8/2004 Kekre ................ G06F 11/1446 711/156
6,996,733 B2 2/2006 Hershenson et al.
(Continued)

FOREIGN PATENT DOCUMENTS

WO 2009020978 A2 2/2009

OTHER PUBLICATIONS

Hitachi, "Hitachi ShadowImage Replication Software for Hitachi Storage," Datasheet, Jun. 2015, 2 pages, retrieved from https://www.hds.com/en-us/pdf/datasheet/hitachi-datasheet-shadowimage-heterogeneous-replication-software.pdf.
(Continued)

*Primary Examiner* — Daniel A Kuddus
(74) *Attorney, Agent, or Firm* — Zilka-Kotab, P.C.

(57) ABSTRACT

A computer program product, according to one embodiment, includes a computer readable storage medium having program instructions embodied therewith. The computer readable storage medium is not a transitory signal per se. Moreover, the program instructions readable and/or executable by a processor to cause the processor to perform a method which includes: maintaining, by the processor, a cascaded mapping relationship at a secondary system. The cascaded mapping relationship extends between the secondary system and a remote primary system. Furthermore, maintaining the cascaded mapping relationship includes: in response to receiving a remote point-in-time copy from the remote primary system, inserting, by the processor, the received remote point-in-time copy immediately downstream from an interface of the cascaded mapping relationship between the secondary system and the remote primary system; and inserting, by the processor, each local point-in-time copy of a storage volume in the secondary system immediately downstream from the storage volume.

17 Claims, 27 Drawing Sheets

(56) References Cited

U.S. PATENT DOCUMENTS

| | | | | |
|---|---|---|---|---|
| 7,032,089 | B1 * | 4/2006 | Ranade | G06F 11/2069 711/161 |
| 7,149,787 | B1 * | 12/2006 | Mutalik | G06F 16/221 709/217 |
| 7,174,451 | B2 | 2/2007 | Zimmer et al. | |
| 7,359,927 | B1 | 4/2008 | Cardente | |
| 7,386,695 | B2 | 6/2008 | Fuente | |
| 7,490,268 | B2 | 2/2009 | Keromytis et al. | |
| 7,536,523 | B2 | 5/2009 | Yagawa et al. | |
| 7,571,290 | B1 | 8/2009 | Ranade et al. | |
| 7,941,622 | B2 | 5/2011 | Yagawa et al. | |
| 8,001,085 | B1 * | 8/2011 | Kiselev | G06F 11/2071 707/639 |
| 8,074,019 | B2 | 12/2011 | Gupta et al. | |
| 8,359,491 | B1 | 1/2013 | Bloomstein | |
| 8,458,517 | B1 | 6/2013 | Vermeulen et al. | |
| 8,560,886 | B1 | 10/2013 | Kekre et al. | |
| 8,788,772 | B2 | 7/2014 | Clayton et al. | |
| 8,793,527 | B1 | 7/2014 | Franks | |
| 8,868,860 | B2 * | 10/2014 | Beeken | G06F 3/065 711/112 |
| 9,003,142 | B2 | 4/2015 | Blea et al. | |
| 9,164,846 | B2 | 10/2015 | Lang et al. | |
| 9,417,971 | B2 | 8/2016 | Agombar et al. | |
| 9,514,004 | B2 * | 12/2016 | Beeken | G06F 3/065 |
| 9,886,349 | B2 * | 2/2018 | Beeken | G06F 3/065 |
| 2002/0035706 | A1 | 3/2002 | Connor et al. | |
| 2005/0071549 | A1 | 3/2005 | Tross et al. | |
| 2005/0283504 | A1 | 12/2005 | Suzuki et al. | |
| 2006/0182020 | A1 | 8/2006 | Factor et al. | |
| 2007/0271313 | A1 | 11/2007 | Mizuno et al. | |
| 2008/0072003 | A1 * | 3/2008 | Vu | G06F 3/067 711/162 |
| 2010/0094802 | A1 | 4/2010 | Luotojarvi et al. | |
| 2011/0225380 | A1 * | 9/2011 | Agombar | G06F 11/1458 711/162 |
| 2013/0036091 | A1 | 2/2013 | Provenzano et al. | |
| 2013/0036098 | A1 | 2/2013 | Mutalik et al. | |
| 2013/0080695 | A1 * | 3/2013 | Beeken | G06F 11/1451 711/112 |
| 2013/0219118 | A1 * | 8/2013 | Beeken | G06F 3/065 711/112 |
| 2013/0346712 | A1 * | 12/2013 | Agombar | G06F 11/1458 711/162 |
| 2014/0201426 | A1 | 7/2014 | Ma | |
| 2015/0143168 | A1 * | 5/2015 | Beeken | G06F 11/1451 714/6.23 |
| 2015/0378832 | A1 | 12/2015 | Brown et al. | |
| 2016/0004602 | A1 | 1/2016 | Wilkinson | |
| 2017/0083404 | A1 * | 3/2017 | Beeken | G06F 3/0689 |
| 2017/0277601 | A1 * | 9/2017 | Beeken | G06F 11/1469 |

OTHER PUBLICATIONS

Sipka et al., U.S. Appl. No. 15/670,674, filed Aug. 7, 2017.

IBM, “High availability disaster recovery (HADR),” http://www-01.ibm.com/support/knowledgecenter/api/content/nl/en-us/, retrieved Apr. 9, 2015, 2 pages.

Wilkinson, J., U.S. Appl. No. 14/735,886, filed Jun. 10, 2015.

Non-Final Office Action from U.S. Appl. No. 14/735,886, dated Sep. 22, 2016.

Non-Final Office Action from U.S. Appl. No. 14/735,886, dated Apr. 19, 2017.

United Kingdom Search Report and Written Opinion from PCT Application No. GB920140046GB1, dated Jan. 12, 2015.

Azagury et al., “Point-in-Time Copy: Yesterday, Today and Tomorrow,” IEEE/NASA Conf. Mass Storage Systems, 2002, pp. 259-270, Retrieved From http://storageconference.us/2002/papers/d05bp-aaz.pdf.

Notice of Allowance from U.S. Appl. No. 14/735,886, dated Sep. 20, 2017.

* cited by examiner

MULTIPLE POINT-IN-TIME COPIES ON A REMOTE SYSTEM

BACKGROUND

The present invention relates to disaster recovery systems, and more specifically, this invention relates to creating more than one point-in-time copy on a remote systems.

Data replication may be implemented for a number of different reasons, which includes data retention. Accordingly, data may be replicated between two systems which may be connected together in order to facilitate the replication of a data volume from system A to system B. However, when a replica is created on a remote system, the process experiences a time delay during which an initial synchronization is performed.

For instance, when a storage system replicates a volume to a remote system, such as a disaster recovery (DR) location, the initial replication can take a significant amount of time. There is often a requirement to mount the volumes at the DR location on a server system, which may only happen once the initial replication has completed. As a result, the total time that passes before having the volumes successfully mounted is undesirably long.

Moreover, conventional products experience additional drawbacks while attempting to create a point-in-time copy of a volume on a remote system. Some conventional products attempt to take a point-in-time copy of a volume on a source system and then perform a synchronous or asynchronous replication of that point-in-time copy to a remote system. However, the complete point-in-time copy is required on the remote system before any of the data included therein may be read. Moreover, an undesirably high amount of the source system's storage is required to perform this replication, as a copy of the point-in-time copy is also stored at the source system. Other conventional products attempt to replicate the volume itself to the remote system, and thereafter take a point-in-time copy of the volume. However, the complete point-in-time copy is again required on the remote system before any of the data included therein may be read, in addition to using an undesirably large amount of the remote system's storage. Moreover, these conventional shortcomings are compounded when attempting to make multiple point-in-time copies on a remote system.

It follows that an improved process of creating multiple point-in-time copies on a remote system is desired.

SUMMARY

A computer program product, according to one embodiment, includes a computer readable storage medium having program instructions embodied therewith. The computer readable storage medium is not a transitory signal per se. Moreover, the program instructions readable and/or executable by a processor to cause the processor to perform a method which includes: maintaining, by the processor, a cascaded mapping relationship at a secondary system. The cascaded mapping relationship extends between the secondary system and a remote primary system. Furthermore, maintaining the cascaded mapping relationship includes: in response to receiving a remote point-in-time copy from the remote primary system, inserting, by the processor, the received remote point-in-time copy immediately downstream from an interface of the cascaded mapping relationship between the secondary system and the remote primary system; and inserting, by the processor, each local point-in-time copy of a storage volume in the secondary system immediately downstream from the storage volume.

A computer program product, according to another embodiment, includes a computer readable storage medium having program instructions embodied therewith. The computer readable storage medium is not a transitory signal per se. Moreover, the program instructions readable and/or executable by a processor to cause the processor to perform a method which includes: maintaining, by the processor, a cascaded mapping relationship at a primary system. The cascaded mapping relationship extends between the primary system and a remote secondary system. Furthermore, maintaining the cascaded mapping relationship includes: storing, by the processor, a source volume at a head of the cascaded mapping relationship in the primary system; inserting, by the processor, a local point-in-time copy of a storage volume in the primary system immediately downstream from the storage volume; sending, by the processor, a remote point-in-time copy of a storage volume in the primary system to the remote secondary system; receiving, by the processor, an indication from the remote secondary system that the remote point-in-time copy has been stored in the remote secondary system and that a secondary record, associated with the remote point-in-time copy sent to the remote secondary system, has been updated accordingly; and updating, by the processor, a remote primary record in response to receiving the indication.

Other aspects and embodiments of the present invention will become apparent from the following detailed description, which, when taken in conjunction with the drawings, illustrate by way of example the principles of the invention.

DETAILED DESCRIPTION

Figure 1:
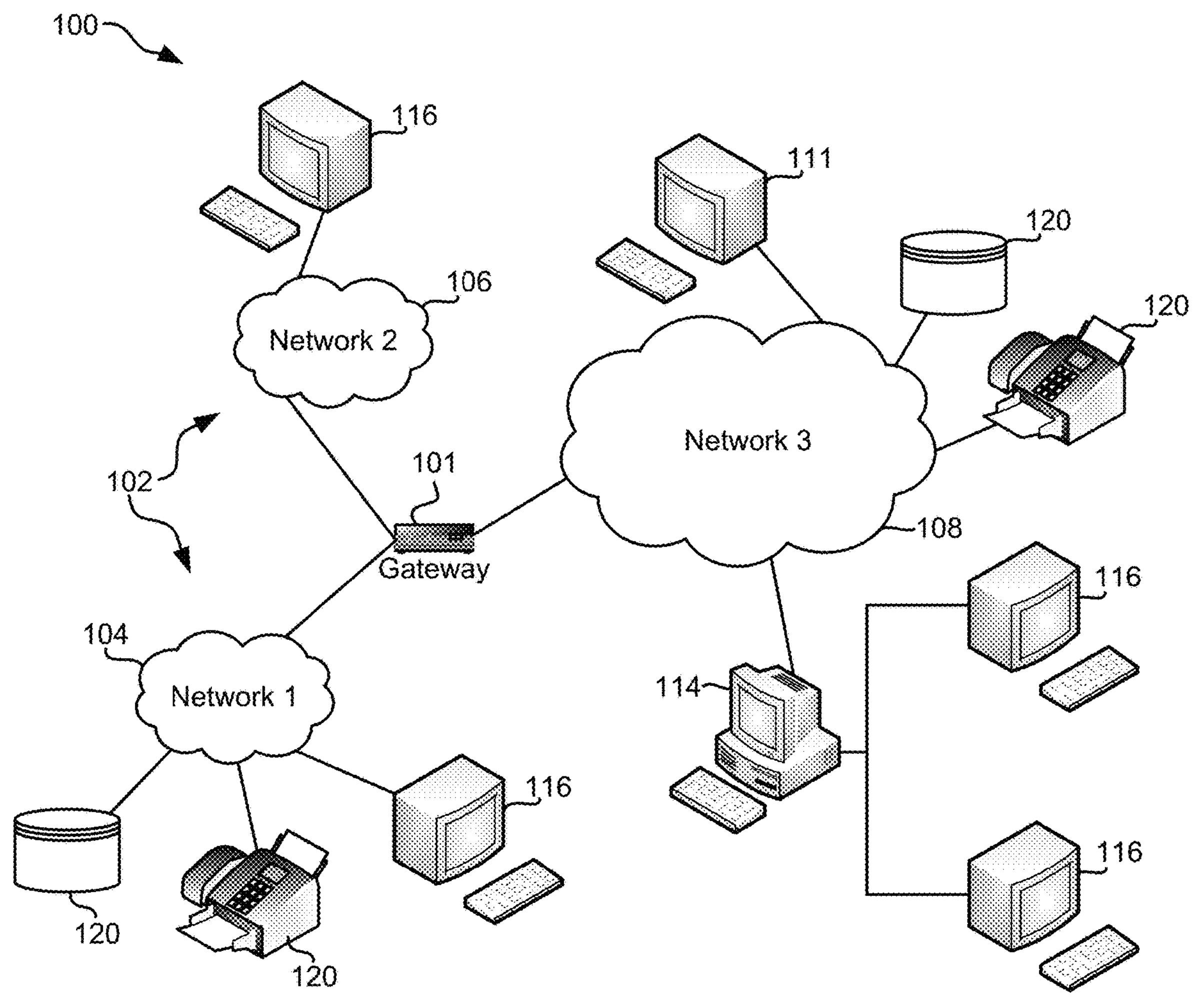
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for creating multiple instantly-available point-in-time data replication on a remote system. It should be noted that "instantly-available" is intended to mean that read and write requests may be performed even during the synchronization process of creating the point-in-time copy of the volume. In other words, upon initiating some of the processes described herein, a point-in-time copy at a remote location (relative to the original copy of the volume) may be read from and/or written to directly upon request.

In one general embodiment, a computer program product includes a computer readable storage medium having program instructions embodied therewith. The computer readable storage medium is not a transitory signal per se. Moreover, the program instructions readable and/or executable by a processor to cause the processor to perform a method which includes: maintaining, by the processor, a cascaded mapping relationship at a secondary system. The cascaded mapping relationship extends between the secondary system and a remote primary system. Furthermore, maintaining the cascaded mapping relationship includes: in response to receiving a remote point-in-time copy from the remote primary system, inserting, by the processor, the received remote point-in-time copy immediately downstream from an interface of the cascaded mapping relationship between the secondary system and the remote primary system; and inserting, by the processor, each local point-in-time copy of a storage volume in the secondary system immediately downstream from the storage volume.

In another general embodiment, a computer program product includes a computer readable storage medium having program instructions embodied therewith. The computer readable storage medium is not a transitory signal per se. Moreover, the program instructions readable and/or executable by a processor to cause the processor to perform a method which includes: maintaining, by the processor, a cascaded mapping relationship at a primary system. The cascaded mapping relationship extends between the primary system and a remote secondary system. Furthermore, maintaining the cascaded mapping relationship includes: storing, by the processor, a source volume at a head of the cascaded mapping relationship in the primary system; inserting, by the processor, a local point-in-time copy of a storage volume in the primary system immediately downstream from the storage volume; sending, by the processor, a remote point-in-time copy of a storage volume in the primary system to the remote secondary system; receiving, by the processor, an indication from the remote secondary system that the remote point-in-time copy has been stored in the remote secondary system and that a secondary record, associated with the remote point-in-time copy sent to the remote secondary system, has been updated accordingly; and updating, by the processor, a remote primary record in response to receiving the indication.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
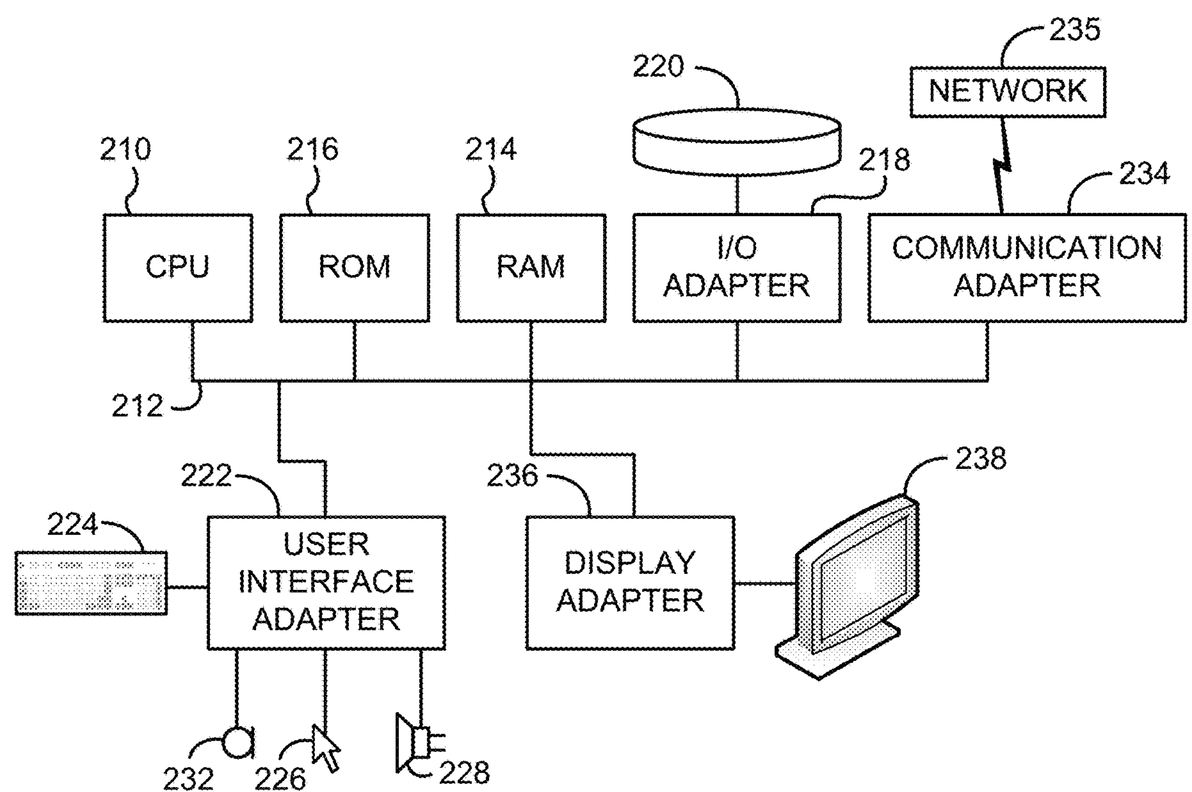
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
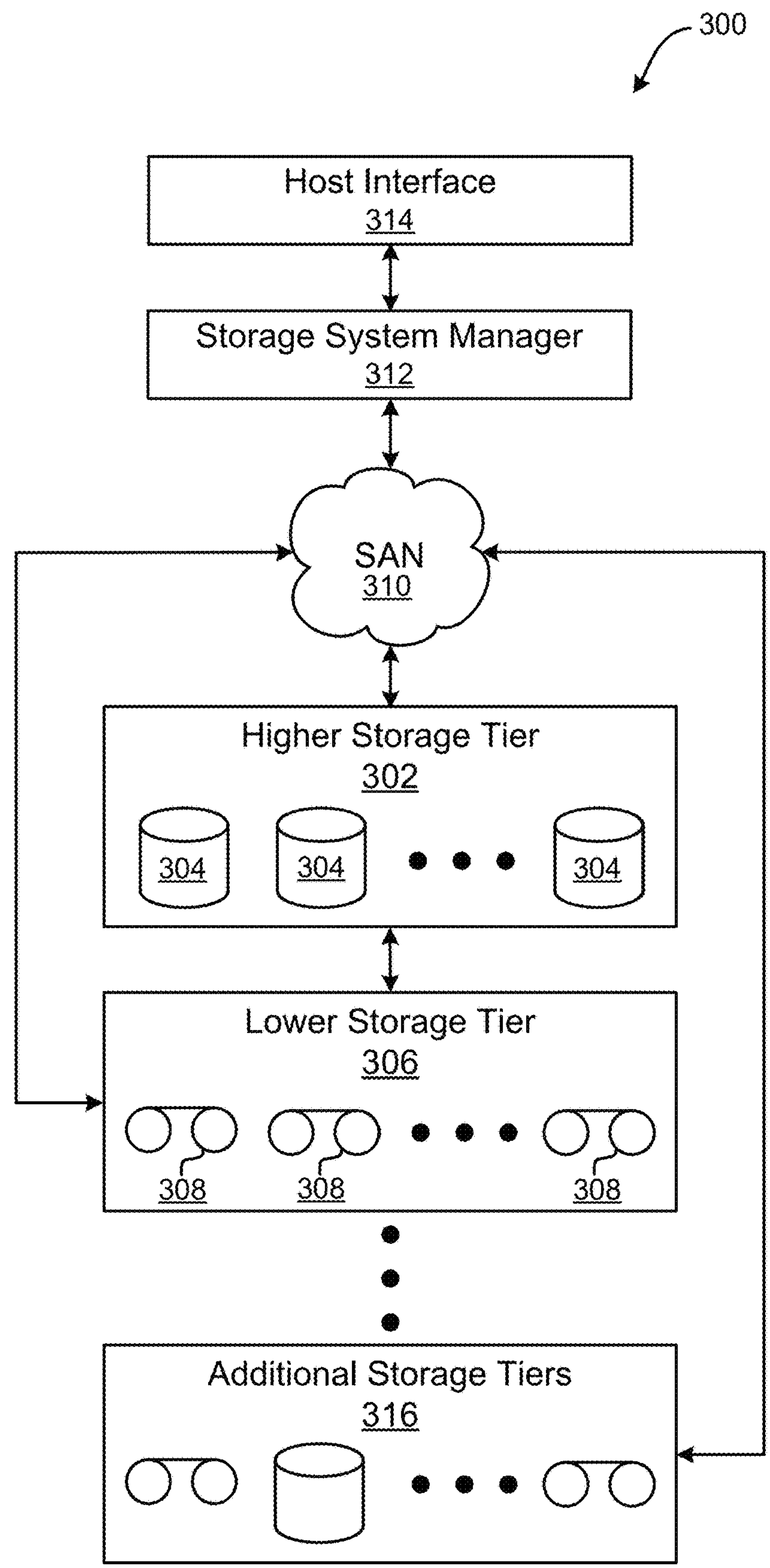
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, conventional products experience significant drawbacks involved with attempting to create a point-in-time copy of a volume on a remote system. Some conventional products attempt to take a point-in-time copy of a volume on a source system and then perform a synchronous or asynchronous replication of that point-in-time copy to a remote system. However, the complete point-in-time copy is required on the remote system before any of the data included therein may be read or written to. Moreover, an undesirably high amount of the source system's storage is required to perform this replication, because a copy of the point-in-time copy is also stored at the source system. Other conventional products attempt to replicate the volume itself to the remote system, and thereafter take a point-in-time copy of the volume. However, the complete point-in-time copy is again required on the remote system before any of the data included therein may be read or written to, in addition to using an undesirably large amount of the remote system's storage to store both the replicated volume and point-in-time copy.

In sharp contrast, various embodiments described herein may be able to achieve an improved process of creating instantly available point-in-time copies of volumes, the point-in-time copies being created on remote systems, e.g., as will be described in further detail below.

The ability to efficiently create point-in-time copies on remote systems is desirable for various reasons, including, but not limited to, being able to perform data analytics on host systems remote from the production location, storing backups offsite for better resiliency and cost (e.g., where land and/or power is less expensive), cloning to a remote system a volume that currently has a good state but which will shortly be modified with data that does not need to be replicated, cloning a volume to a new system and making the copy immediately readable and writable, etc. Moreover, being able to use the point-in-time copy before initial synchronization (which could take days) makes the system much more responsive to business requirements than conventional products.

Figure 4:
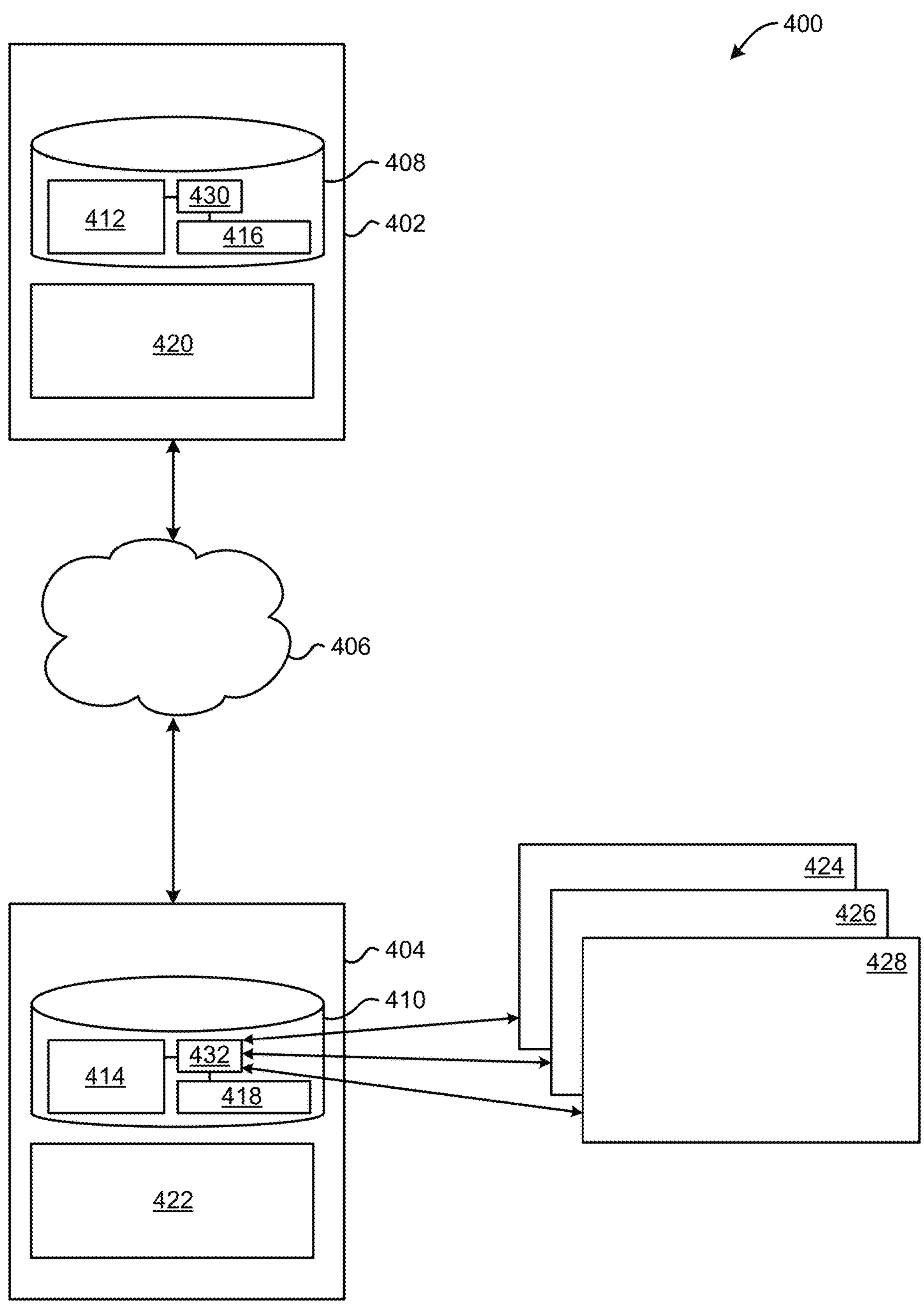
FIG. 4 is a partial representative view of a storage system in accordance with one embodiment.

Looking now to FIG. 4, a partial representative view of an overarching storage system 400 is illustrated in accordance with one embodiment. As an option, the present storage system 400 may be implemented in conjunction with features from any other embodiment listed herein, such as those described with reference to the other FIGS. However, such storage system 400 and others presented herein may be used in various applications and/or in permutations which may or may not be specifically described in the illustrative embodiments listed herein. Further, the storage system 400 presented herein may be used in any desired environment. Thus FIG. 4 (and the other FIGS.) may be deemed to include any possible permutation.

As shown, the storage system 400 includes a primary system 402 and a secondary system 404. Here, the primary and secondary systems 402, 404 are remote from each other, meaning that the two systems are sufficiently separated. According to different approaches, the primary and secondary systems 402, 404 may be located at two different geographical locations, physically isolated from each other (e.g., not having any shared hardwiring) in a same overarching system, subjected to different administrative management schemes, etc. However, the primary system 402 and a secondary system 404 are coupled to each other (e.g., wirelessly connected) via a network 406, which may take any form including, but not limited to, a LAN, a WAN (e.g., such as the Internet), PSTN, internal telephone network, etc. Moreover, each of the primary system 402 and the secondary system 404 may be connected to the network 406 itself wirelessly and/or via a wired connection, e.g., depending on system parameters. Accordingly, the primary and secondary systems 402, 404 may transfer information (e.g., data) therebetween despite being remote from each other.

The primary and secondary systems 402, 404 each include a respective storage 408, 410. Moreover, each of the storages 408, 410 in turn include a bitmap 412, 414 and storage volume 416, 418 respectively. The primary and secondary systems 402 404 preferably use the respective bitmaps 412, 414 to maintain records of the data included in the storage volumes 416, 418. Furthermore, primary and secondary systems 402, 404 each include a respective replication component 420, 422 which may be used to execute one or more replication processes, e.g., according to any of the approaches described herein. In some approaches, the secondary system 404 may be considered a disaster recovery (DR) system which is used to store a backup copy of the data included in the storage volume 416 of the primary system 402. Accordingly, the storage volume 418 of the secondary system 404 may include a secondary copy of the data included in the storage volume 416 of the primary system 402, e.g., as will be described in further detail below. This secondary copy stored in the storage volume 418 of the secondary system 404 may be used to recover the storage volume 416 of the primary system 402 in response to experiencing a hardware failure, a software failure, unintentional deletion of data, etc., or any other reason which may cause the storage volume 416 of the primary system 402 to lose data.

The bitmaps 412, 414 correspond to regions of the respective storage volumes 416, 418 and may therefore be used to record the synchronisation of a replication process. According to an exemplary approach, the primary bitmap 412 may set the bits included therein to record (indicate) that certain portions of data included in the primary storage volume 416 have been sent to the secondary storage volume 418. Moreover, the secondary bitmap 414 may set bits which correspond to regions in the secondary storage volume 418 which have received an up-to-date copy of the data included in the primary storage volume 416. The bits included in each of the bitmaps may also be used to handle read and/or write requests received by either of the primary and/or secondary systems 402, 404, e.g., as will be described in further detail below.

Requests to access (e.g., read and/or write to) the replicated data may be processed by a controller 432 which is coupled to the secondary storage volume 418 and bitmap 414 of the secondary system 404. Thus, one or more host servers 424, 426, 428 may send access requests to the controller 423 as illustrated in FIG. 4. Moreover, requests to access the data included in the storage volume 416 of the primary system 402 may be processed by a controller 430 coupled to the primary storage volume 416 and bitmap 412 of the primary system 402. However, the manner in which received read and/or write requests are performed may vary depending on where the request is received, the status of an active storage volume replication process, user preference, etc.

Figure 5:
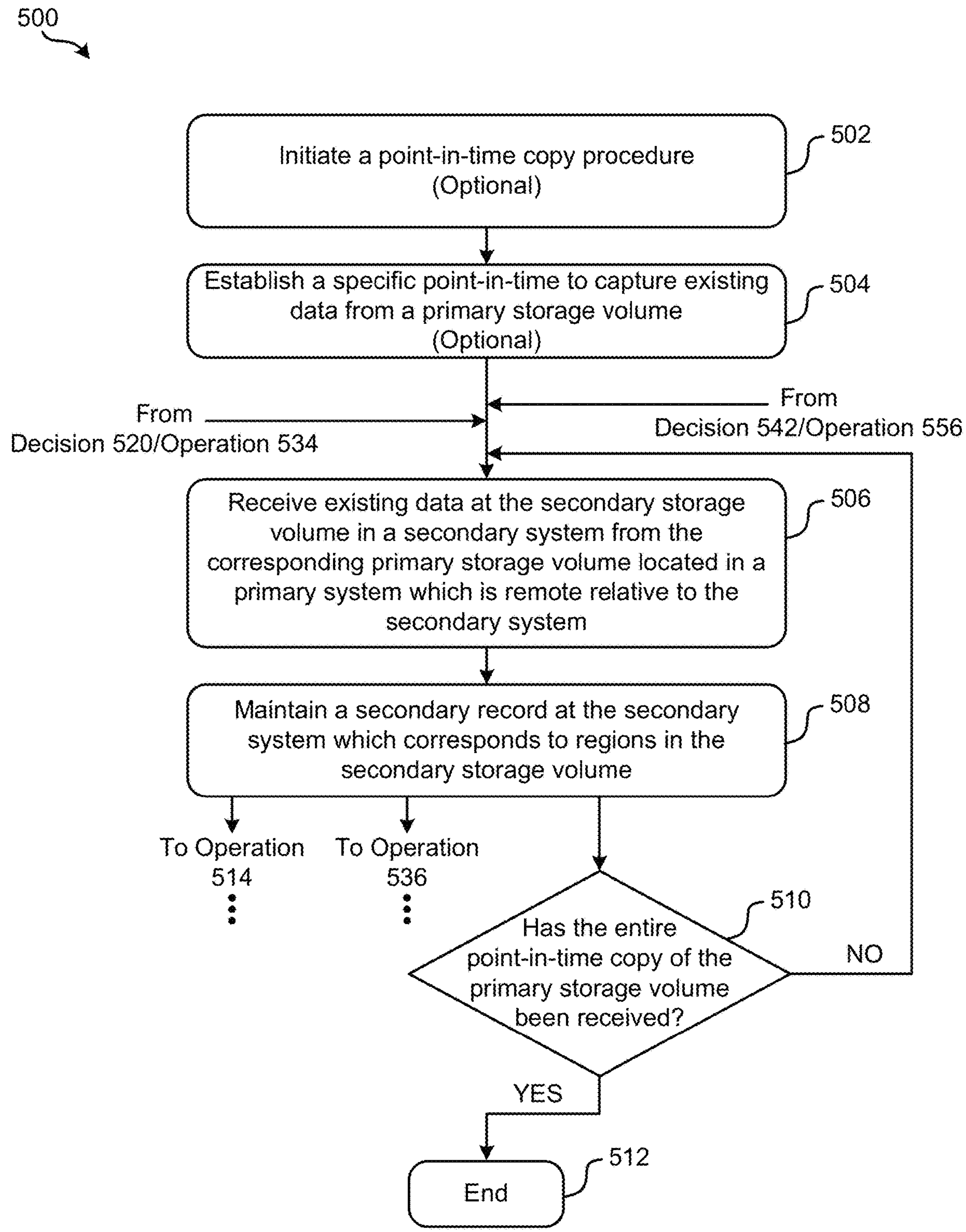
FIG. 5 is a flowchart of a method in accordance with one embodiment.
Figure 5:
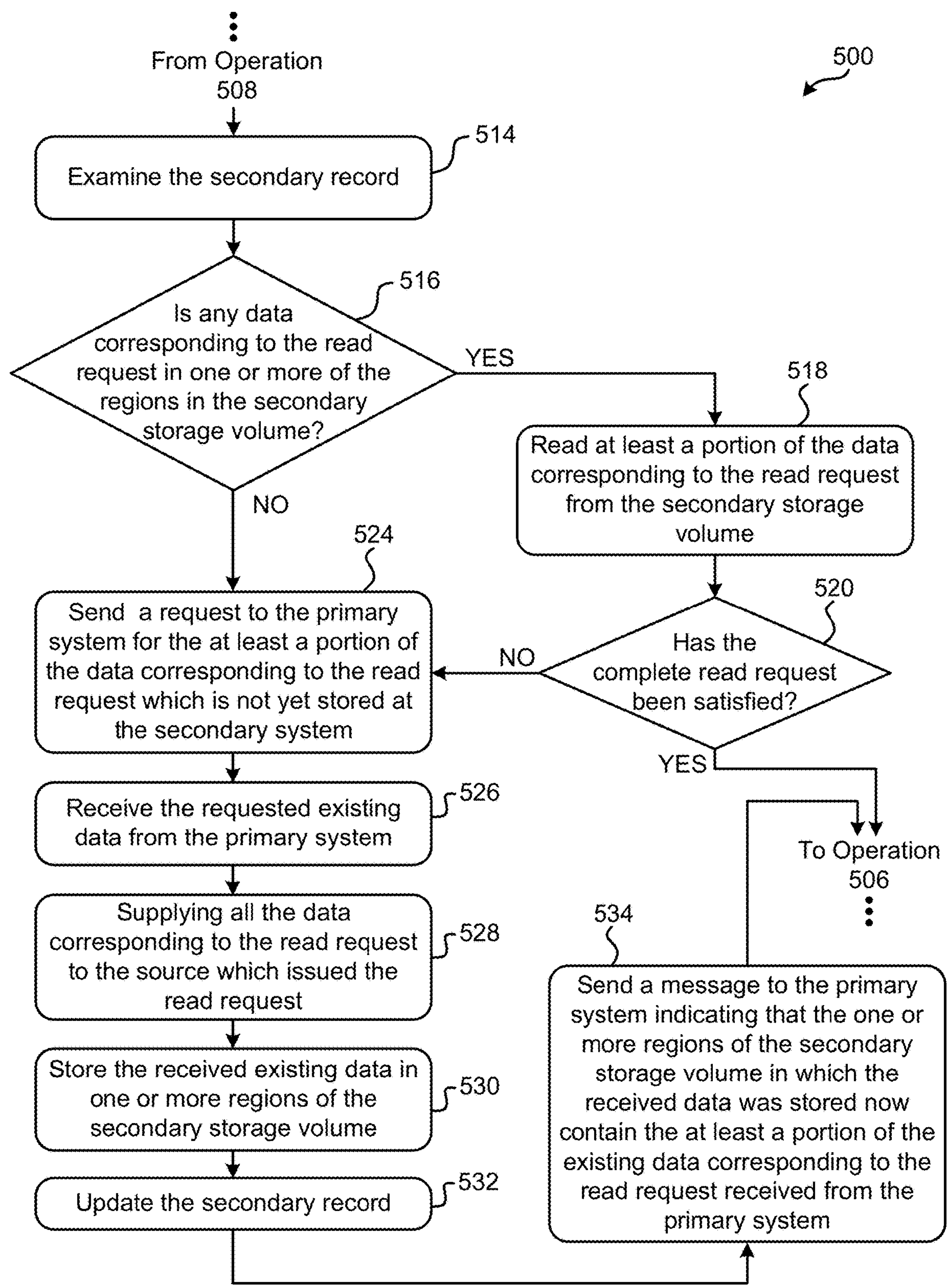
Figure 5:
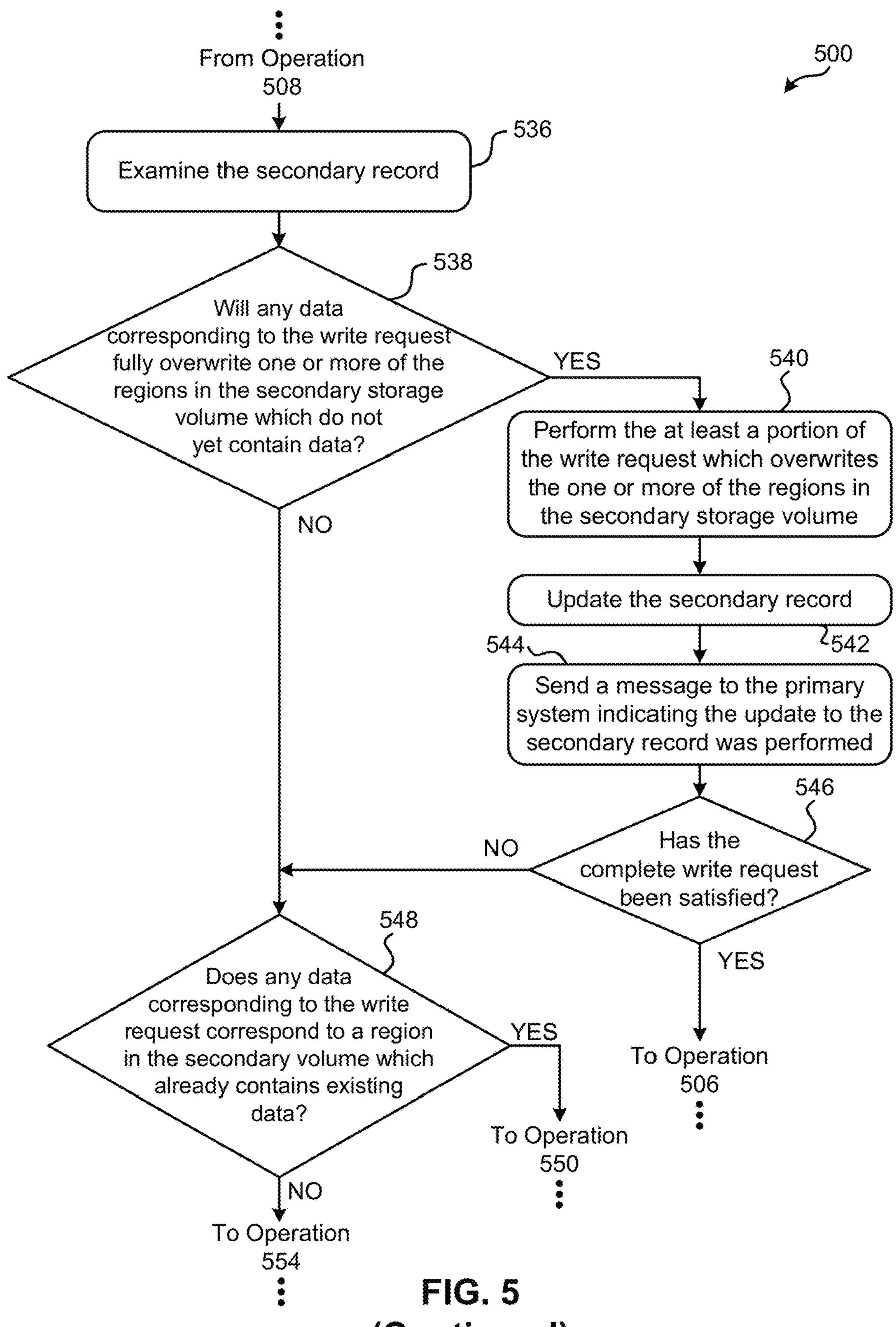
Figure 5:
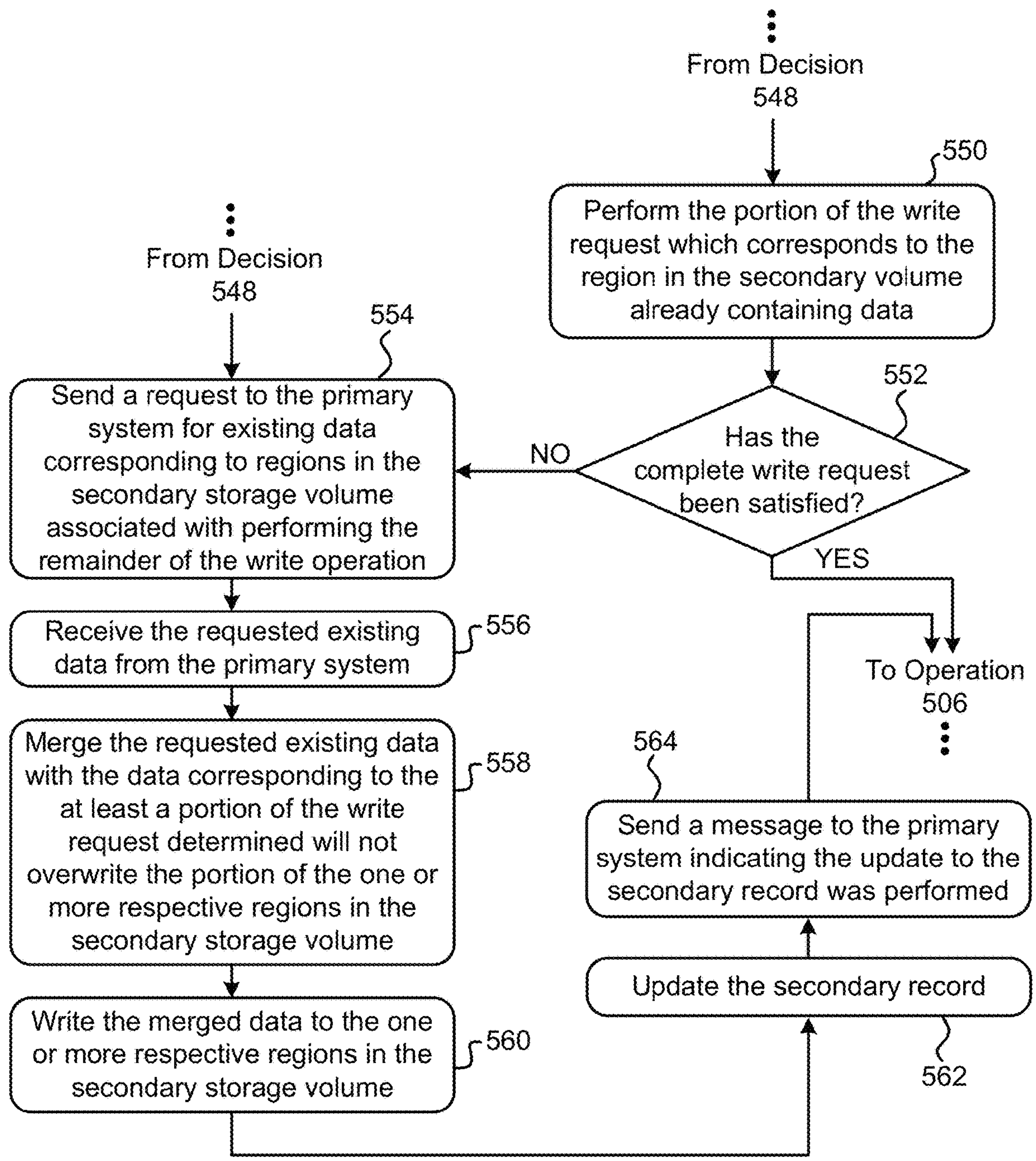

Looking to FIG. 5, a flowchart of a computer-implemented method 500 for creating a copy of a data storage volume on a remote system is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller (e.g., see 430, 432 of FIG. 4), a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, optional operation 502 of method 500 includes initiating a point-in-time copy procedure. As mentioned above, the ability to efficiently create point-in-time copies on remote systems is desirable for various reasons such as, being able to perform data analytics on host systems remote from the production location, storing backups offsite for better resiliency and cost (e.g., where land and/or power is less expensive), cloning to a remote system a volume that currently has a good state but which will shortly be modified with data that does not need to be replicated, cloning a volume to a new system and making the copy immediately readable and writable, etc. Accordingly, a point-in-time copy procedure may be initiated in response to a user request, a predetermined condition being met, etc.

Moreover, optional operation 504 includes establishing a specific point-in-time to capture existing data from a primary storage volume (a source volume) in response to the point-in-time copy procedure being initiated. The established point-in-time serves as a reference point at which data existing in the primary storage volume is captured and copied onto a secondary backup volume. Establishing the reference point-in-time is particularly desirable in distributed systems where each node of the system preferably agrees what writes form part of the point-in-time copy. According to various approaches, any manner of establishing a specific point-in-time which would be apparent to one skilled in the art after reading the present description may be employed. Moreover, once a specific point-in-time has been established, the steady state of the remote point-in-time copy system will be to copy uncopied regions of the primary storage volume to the secondary volume, e.g., as a part of a "background copy" process. It should be noted that a "remote point-in-time copy" as used herein is intended to mean a copy of an existing volume, where the copy and existing volume are the same size but located on different systems (e.g., the copy is located in the primary system while the remote point-in-time copy is in the secondary system). However, in some approaches the copy and the existing volume (e.g., source volume) may have different sizes when formed and/or thereafter, e.g., due to modifications, user input, system parameters, etc.

Operation 506 further includes receiving existing data at the secondary storage volume in a secondary system from the corresponding primary storage volume located in a primary system which is remote relative to the secondary system. As mentioned above, the existing data received at the secondary storage volume may be a point-in-time copy of the data existing in the primary storage volume. Accordingly, the data received may correspond to data existing in the primary storage volume as it were at an established point-in-time. The secondary storage volume may serve as a DR copy of the existing data in some approaches, e.g., should the primary volume be lost due to corruption, unintentional deletion, system failure, etc. It should be noted that "existing data" as used herein is intended to refer to the data included in the primary storage volume which is being replicated onto the secondary storage volume. Thus, according to an exemplary approach, "existing data" may be the data included in a point-in-time copy of the primary storage volume being replicated onto the secondary storage volume.

It is preferred that as the existing data is being received at the secondary storage volume from the primary storage volume, the secondary storage volume is made available for read and/or write access before the entire point-in-time copy of the primary storage volume has been copied to the secondary storage volume. Thus, read and/or write requests received at the secondary system may be performed during the replication process. Moreover, it should be noted that the "replication process" as used herein refers to the process of forming a copy of a primary storage volume on a remote system.

In order to achieve read and/or write functionality at the secondary storage volume during the replication process, operation 508 includes maintaining a secondary record at the secondary system which corresponds to regions in the secondary storage volume. According to an illustrative approach, the secondary record may be a bitmap (e.g., see 414 of FIG. 4). Each bit of the bitmap may correspond to a respective region in the secondary storage volume on which the existing data received in operation 506 is stored. Accordingly, in preferred approaches, maintaining the secondary record includes indicating which of the regions in the secondary storage volume contain a portion of the received existing data. In other words, maintaining the secondary record preferably includes indicating which of the regions in the secondary storage volume have been written to. Moreover, a "region" is a fixed-size quantity of the given volume. In other words, each region in a given volume is preferably the same size. However, different volumes may implement different sized regions, e.g., depending on the desired approach.

In approaches where the secondary record is a bitmap, setting a bit to have a logical value of "1" may indicate that the corresponding region of the secondary storage volume contains an appropriate portion of the received existing data, while setting a bit to have a logical value of "0" may indicate that the corresponding region of the secondary storage volume does not yet contain any data. Thus the background copy process will gradually set the bits of both bitmaps as the primary storage volume is copied to the secondary system. However, any other desired method of indicating whether a given region in the secondary storage volume contains an appropriate portion of existing data may be implemented. It follows that the secondary record indicated which regions of the primary storage volume have been copied to the secondary storage volume in the secondary system.

Moreover, as the primary and secondary records (particularly the secondary record) contain information which is important in ensuring a complete copy of the primary storage volume is formed in the secondary system, it is desirable that the primary and secondary records are managed in an appropriately resilient manner. According to an illustrative approach, the primary and/or secondary records may be maintained on a clustered system, preferably such that each of the bitmaps are stored on two or more different nodes in the respective clustered system. Moreover, it is preferred that each copy of the primary and secondary records is modified before any action is taken based on changing the bitmap state. In other words, it is preferred that the primary and secondary records are matched before any read and/or write operations are performed on either of the storage volumes. However, in other approaches, a storage system may implement other solutions for ensuring appropriately resilient data, e.g., such as storing the primary and/or secondary records as multiple on-disk copies.

For embodiments which include clustered systems, it is desirable that a single node is responsible for receiving and/or transmitting requests for a given storage volume at any given time. In other words, if the primary and/or secondary systems are implemented as clustered systems, it is desirable that a single node on the primary system is used to receive/send write and/or read requests corresponding to the primary storage volume, while a single node on the secondary system is used to receive/send write and/or read requests corresponding to the secondary storage volume. This permits the systems to ensure that only one data transfer request is sent (e.g., see operation 524 below) for each region. Those skilled in the art will appreciate after reading the present description that the use of a single node for transmitting requests simplifies implementation of this invention. Moreover, the responsibility of receiving and/or sending write and/or read requests may be dynamically moved between nodes of the clustered system, e.g., to avoid creating a single point of failure.

Existing data may continue to be received at the secondary storage volume from the corresponding primary storage volume until the entire point-in-time copy of the primary storage volume has been received. Accordingly, decision 510 includes determining whether the entire point-in-time copy of the primary storage volume has been received. The outcome of decision 510 may be determined a number of different ways depending on the approach. For instance, in some approaches the secondary system may receive a notification from the primary system that the entire point-in-time copy of the primary storage volume has been sent to the secondary storage volume. In other approaches, the secondary system may deduce that the entire point-in-time copy of the primary storage volume has been received at the secondary storage volume once all the bits in a bitmap associated with the secondary storage volume have been set to indicate each of the regions in the secondary storage volume contain an appropriate portion of the point-in-time copy of the primary storage volume.

It is desirable that all data corresponding to the point-in-time copy of the primary storage volume is replicated in the secondary storage volume such that the primary storage volume may be reconstructed as needed. This copy stored in the secondary storage volume of the secondary system may be used to recover the primary storage volume of the primary system in response to experiencing a hardware failure, a software failure, unintentional deletion of data, etc., or any other reason which may cause the primary storage volume to lose the data previously stored therein.

As shown, method 500 returns to operation 506 in response to determining that the entire point-in-time copy of the primary storage volume has not yet been received, whereby additional existing data may be received from the primary storage volume located in a primary system. However, method 500 may alternatively proceed to operation 512 and subsequently end in response to determining that the entire point-in-time copy of the primary storage volume has been received at the secondary system. This may be reflected in the primary and secondary records, where the primary record will indicate that data from all regions in the primary storage volume has been sent to the secondary storage volume, and the secondary record will indicate that all regions in the secondary storage volume contain data received from the primary system. However, it should be noted that in various approaches, method 500 may return to operation 502 and re-initiate a point-in-time copy procedure, e.g., in response to being prompted with a data transmission request from a separate storage system, a user input, a predetermined condition being met, etc.

Read and/or write requests may be received at the secondary system before the entire point-in-time copy of the primary storage volume has been received. Accordingly, the flowchart of method 500 may proceed to operation 514 and/or 536 depending on whether a read request and/or a write request is received before the entire point-in-time copy of the primary storage volume has been received. The flowchart of FIG. 5 has thereby been separated into three different paths which stem from operation 508. Thus, depending on the given situation, method 500 may proceed differently from operation 508, e.g., as will be described in further detail below.

Again, read requests may be received while existing data is being received at the secondary system from a remote (at least relative to the secondary system) primary system. In response to receiving such a read request for data at the secondary system, method 500 preferably proceeds to operation 514. There, operation 514 includes examining the secondary record (e.g., bitmap) to determine whether a portion of the data corresponding to the read request has been received and stored in the secondary storage volume. For approaches in which the secondary record is a bitmap, operation 514 may include examining the bitmap to determine whether one or more of the bits corresponding to the regions associated with the received read request are set indicating that there is valid data stored in the respective region(s). Moreover, decision 516 includes determining whether any data corresponding to the read request is in one or more of the regions in the secondary storage volume.

In some approaches, determining whether any data corresponding to the read request is in one or more of the regions in the secondary storage volume may include sending a request to a primary system for the range of logical block addresses (LBAs) which are addressed by the received read request. Moreover, the LBAs may further be used according to any desired approach which would be apparent to one skilled in the art after reading the present description.

With continued reference to FIG. 5, method 500 proceeds to operation 518 in response to determining that the at least a portion of the data corresponding to the read request is in one or more of the regions in the secondary storage volume. As shown, operation 518 includes reading at least a portion of the data corresponding to the read request from the secondary storage volume. As existing data is received from the primary storage volume, it is stored in appropriate regions in the secondary storage volume, preferably such that the secondary storage volume eventually includes a replica of the existing data stored in the primary storage volume. In other words, the data stored in a given region of the secondary system preferably contains the same data which exists (e.g., is stored) in a corresponding region of the primary system, thereby increasing the ease by which the secondary system may assume the primary system's storage responsibilities in the event that the primary system goes offline, e.g., due to a crash, scheduled maintenance, system timeout(s), etc.

However, in some instances not all of the data corresponding to the read request may be stored in the secondary system. For instance, depending on the size of a received read request, the data corresponding to the request may be stored in one or more regions of the secondary storage volume. Moreover, regions on the secondary storage volume may be filled as the data corresponding thereto is received. Thus, all, part, or none of the data corresponding to a received read request may be stored in one or more of the regions at a given point in time. According to an example, which is in no way intended to limit the invention, a read request received by the secondary system may correspond to a given amount of data "X". However, at the point in time the read request is received, only a portion "X-Y" of the full amount of data may be stored at the secondary storage volume. Thus, the portion of data "X-Y" which corresponds to the read request and which is stored in the regions of the secondary storage volume may be read, but the remaining portion of the data "Y" not yet stored in the regions of the secondary storage volume cannot be read (accessed) from the secondary system as it has not been received yet from the primary system.

It follows that method 500 includes determining whether the complete read request has been satisfied. See decision 520. As mentioned above, in some instances although it is determined that a portion of the data corresponding to the read request is stored in regions of the secondary storage volume, a remainder of the data corresponding to the read request may not yet have been copied thereto. Accordingly, in response to determining that the complete read request has been satisfied, method 500 returns to operation 506 whereby additional existing data may be received from the primary storage volume. Moreover, any of the other processes included in method 500 may be repeated as additional existing data, write requests, read requests, etc. are received at the secondary system.

Referring again to decision 520, method 500 proceeds to operation 524 in response to determining that the complete read request has not yet been satisfied. There, operation 524 includes sending a request to the primary system for the at least a portion of the data corresponding to the read request which is not yet stored at the secondary system. As shown, method 500 may also progress to operation 524 from decision 516 in some approaches. Returning to decision 516, method 500 may progress to operation 524 in response to determining that the data corresponding to the read request is not in any of the regions in the secondary storage volume. It follows that operation 524 may be performed in order to request any data needed in order to complete the received read request. According to an exemplary approach, the request sent to the primary system in operation 524 may request the range of LBAs addressed by the read request, expanded outwards at the start and/or end of the read request such that the request covers an integer number of regions.

Moreover, operation 526 includes receiving the requested existing data from the primary system. Depending on how much of the data corresponding to the read request was already stored in the regions of the secondary storage volume, the existing data received in operation 526 may only be a portion, a majority, all, etc., of the data corresponding to the read request. Once received, all the data corresponding to the read request is supplied to the source (e.g., whoever and/or whatever) which issued the read request received at the secondary system. See operation 528. Accordingly, the existing data received may be grouped together with data corresponding to the read request which was already stored in regions of the secondary storage volume in instances where only a portion of the data corresponding to the read request was requested from the primary system. Depending on the approach, the data corresponding to the read request may be supplied to one or more locations depending on the read request originally received. Moreover, the data may be supplied in any desired format.

Method 500 further includes storing the existing data received in operation 526 in one or more regions of the secondary storage volume. See operation 530. Thus, at least a portion of the data corresponding to the read request may be added to the one or more regions in the secondary storage volume. The data is preferably added to the appropriate regions of the secondary storage volume such that each region in the secondary storage volume contains the same portion of data as a corresponding region in the primary storage volume. However, it should be noted that the data may be stored in any desired manner depending on the desired approach.

Moreover, operation 532 includes updating the secondary record to indicate that the one or more regions in the secondary storage volume in which the received data was stored contain the at least a portion of the existing data corresponding to the read request received from the primary system. In other words, operation 532 includes updating the secondary record to indicate that the data received in operation 526 has been added to the appropriate regions of the secondary storage volume. As previously mentioned, the secondary storage volume may be a bitmap in some approaches. In such approaches, operation 532 may include setting each of the bits in the bitmap which correspond to regions which the data was added to in operation 526, where each of the bits are set to indicate that a respective region includes an appropriate portion of existing data received from the primary storage volume.

Furthermore, operation 534 includes sending a message to the primary system indicating that the one or more regions of the secondary storage volume in which the received data was stored now contain the at least a portion of the existing data corresponding to the read request received from the primary system. Sending this message allows for the primary system to be informed of any updates which have occurred to the regions of the secondary storage volume and/or the secondary record itself. Thus, the message sent in operation 534 may effectively be for updating a primary record that indicates which portions of the point-in-time copy of the primary storage volume have been received by the secondary system. As a result, the primary record and the secondary record may maintain a matching record of which portions of the primary storage volume have been replicated in the secondary storage volume. Maintaining matching (e.g., equivalent) primary and secondary records allows for the primary and secondary systems to ensure that the replication process creates a full version of the point-in-time copy in the secondary storage volume, thereby avoiding data loss, data corruption, etc., as will be described in further detail below.

Thereafter, method 500 returns to operation 506 whereby additional existing data may be received from the primary storage volume. Moreover, any of the other processes included in method 500 may be repeated as additional existing data, write requests, read requests, etc. are received at the secondary system.

However, it should be noted that if multiple read requests are received in quick succession at the secondary system, each of which correspond to a same region, the read requests received after a first read request for the region are preferably postponed. The secondary system is preferably able to detect that there is an outstanding (ongoing) read request corresponding to the given region in the secondary storage volume, and therefore the performance of subsequent read requests to that same region may be postponed until the data corresponding to the outstanding request is retrieved. By postponing subsequently received read requests which correspond to a same region as an outstanding read request, more than one read request may be satisfied with the data that is retrieved. In other words, if the secondary system is already in the process of receiving or at least requesting data from that region in the primary system, that data may be used to perform more than one read request rather than sending multiple requests to the primary system which correspond to the same data. Likewise, if the secondary system has a read request outstanding while receiving data from a same region of the primary storage volume for a different reason not related to the read request, the secondary system may act as though the data being received is in response to issuing a retrieval request corresponding to the outstanding read request. Accordingly, once the data is received at the secondary system and stored in the appropriate region(s) of the secondary storage volume, it may be used to perform the outstanding read request. By transmitting the data from the primary system to the secondary system only once, the configuration is able to avoid a more complex scheme to ensure successful data transfer and read performance, thereby ensuring efficiency.

Returning to operation 508, as mentioned above, read and/or write requests may be received at the secondary system before the entire point-in-time copy of the primary storage volume has been received. Accordingly, the flowchart of method 500 may proceed from operation 508 to operation 514 and/or 536 depending on whether a read request and/or a write request is received before the entire point-in-time copy of the primary storage volume has been received. In response to receiving write request at the secondary system corresponding to the secondary storage volume, method 500 preferably proceeds to operation 536. There, operation 536 includes examining the secondary record. As mentioned above, the secondary record may be a bitmap, the bits of which may be examined to determine whether a portion of the existing data being received from the primary storage volume which corresponding to the write request has already been received and stored in the secondary storage volume. Accordingly, decision 538 includes determining whether data corresponding to at least a portion of the write request will fully overwrite one or more of the regions in the secondary storage volume which do not yet contain data.

As mentioned above, for embodiments which include clustered systems, it is desirable that a single node is responsible for receiving and/or transmitting requests for a given storage volume at any given time. In other words, if the primary and/or secondary systems are implemented as clustered systems, it is desirable that a single node on the primary system is used to receive/send write and/or read requests corresponding to the primary storage volume, while a single node on the secondary system is used to receive/send write and/or read requests corresponding to the secondary storage volume. As a result, only one read or write request may be outstanding for a given system. Otherwise, it would be possible for two nodes to attempt to write replicated data to the secondary storage volume at substantially (e.g., about) the same time, thereby potentially overwriting any host write(s) that had been applied therebetween. Moreover, the responsibility of receiving and/or sending write and/or read requests may be dynamically moved between nodes of the clustered system, e.g., to avoid creating a single point of failure.

Moreover, as described above, if multiple write requests are received in quick succession at the secondary system, each of which correspond to a same region, the write requests received after a first write request for the region are preferably postponed. The secondary system is preferably able to detect that there is an outstanding (ongoing) write request corresponding to the given region in the secondary storage volume, and therefore the performance of subsequent write requests to that same region may be postponed until the data corresponding to the outstanding request is retrieved from the primary storage volume and/or the outstanding write request itself is performed. By postponing subsequently received write requests which correspond to a same region as an outstanding write request, more than one write request may be satisfied with the data that is retrieved from the primary system and/or written to the region, thereby improving efficiency.

With continued reference to FIG. 5, method 500 proceeds to operation 540 from decision 538 in response to determining that the data corresponding to the at least a portion of the write request will fully overwrite one or more of the regions in the secondary storage volume which do not yet contain data. There, operation 540 includes performing the at least a portion of the write request which overwrites the one or more of the regions in the secondary storage volume.

However, in some instances not all of the data corresponding to the write request will fully overwrite regions in the secondary storage volume which do not yet contain existing data. For instance, depending on the size of a received write request, the data corresponding to the request may be stored in one or more regions of the secondary storage volume. Moreover, regions on the secondary storage volume are filled as the data corresponding thereto is received. Thus, all, some, or none of the one or more regions which are to be affected (e.g., written to) using the data corresponding to the received write request may not yet contain data. According to an example, which is in no way intended to limit the invention, a write request received by the secondary system may correspond to a given amount of data "X". However, at the point in time the write request is received, only a portion "X-Y" of the full amount of data may be stored at the secondary storage volume. Thus, the portion of data "X-Y" which corresponds to the write request and which is stored in the regions of the secondary storage volume may be handled accordingly (e.g., see decision 548 below), but the remaining portion of the data "Y" which corresponds to data not yet stored in the regions of the secondary storage volume may be used to perform at least a portion of the write request.

Method 500 further proceeds to operation 542 which includes updating the secondary record to indicate that each of the one or more respective regions in the secondary storage volume which have been written to now contain valid data. In other words, operation 542 includes updating the secondary record to indicate that at least some of the data received in the write request has been added to the appropriate regions of the secondary storage volume. As previously mentioned, the secondary storage volume may be a bitmap in some approaches. In such approaches, operation 542 may include setting each of the bits in the bitmap which correspond to regions which the data was added to in operation 540, where each of the bits are set to indicate that a respective region includes an appropriate portion of existing data received from the primary storage volume.

Furthermore, operation 544 includes sending a message to the primary system indicating the update to the secondary record was performed. In other words, operation 544 may inform the primary system that the one or more regions of the secondary storage volume in which the received data was written to now contain the at least a portion of the existing data received in the write request, and therefore contain valid data. Sending this message allows for the primary system to be informed of any updates which have occurred to the regions of the secondary storage volume and/or the secondary record itself. Thus, the message sent in operation 544 may effectively be for updating a primary record in order to indicate which regions in the secondary system contain valid data. As a result, the primary record and the secondary record may maintain a matching record of which portions of the secondary storage volume contain valid data, e.g., as will be described in further detail below.

Thereafter, method 500 proceeds to decision 546 which includes determining whether the complete write request has been satisfied. In some instances, although at least a portion of the write request is performed, a remainder of the data corresponding to the write request may remain outstanding (e.g., not yet performed). Accordingly, in response to determining that the complete write request has not yet been satisfied, method 500 proceeds to decision 548, which will be described in further detail below. However, in response to determining that the complete write request has been satisfied by operation 540, method 500 returns to operation 506 whereby additional existing data may be received from the primary storage volume. Moreover, any of the other processes included in method 500 may be repeated as additional existing data, write requests, read requests, etc. are received at the secondary system.

Returning to decision 538, method 500 may also progress to decision 548 in response to determining that the data corresponding to the at least a portion of the write request will not fully overwrite one or more of the regions in the secondary storage volume which do not yet contain data. There, decision 548 includes determining whether any data corresponding to the write request corresponds to a region in the secondary volume which already contains existing data. As depicted, method 500 proceeds to operation 550 in response to determining that data corresponding to the write request corresponds to a region in the secondary volume which already contains existing data. There operation 550 includes performing the at least a portion of the write request which corresponds to one or more regions in the secondary volume which already contain existing data.

Furthermore, decision 552 of method 500 determines whether the complete write request has been satisfied. In response to determining that the complete write request has not yet been satisfied, method 500 proceeds to operation 554, which will be described in further detail below. However, in response to determining that the complete write request has been satisfied by operation 550, method 500 returns to operation 506 whereby additional existing data may be received from the primary storage volume. Moreover, any of the other processes included in method 500 may be repeated as additional existing data, write requests, read requests, etc. are received at the secondary system.

Returning to decision 548, method 500 may also progress to operation 554 in response to determining that data corresponding to the write request does not correspond to a region in the secondary volume which already contains existing data. There, operation 554 includes sending a request to the primary system for existing data corresponding to a portion of one or more respective regions in the secondary storage volume associated with performing the remainder of the write operation. As mentioned above, a portion of the write request may correspond to data which has not yet been received by the secondary storage volume from the primary storage volume. It follows that such data is preferably requested from the primary storage volume such that the complete write request may be performed. In other words, operation 554 may be performed in order to request any data needed in order to successfully complete the received write request. As alluded to above (and shown in FIG. 5), method 500 may also progress to operation 554 from decision 552 in some approaches.

Moreover, operation 556 includes receiving the requested existing data from the primary system. Depending on how much of the data corresponding to the write request was already stored in the regions of the secondary storage volume, the existing data received in operation 556 may only be a portion, a majority, all, etc., of the data corresponding to the write request.

Once received, operation 558 includes merging the requested (and received) existing data with the data corresponding to the at least a portion of the write request determined will not overwrite the portion of the one or more respective regions in the secondary storage volume. Moreover, operation 560 includes writing the merged data to the one or more respective regions in the secondary storage volume. In other words, operation 558 includes merging the requested existing data with a remainder of the write request which has not yet been performed. Accordingly, the requested existing data and the remainder of the write request may be added to the secondary storage volume in a single operation (operation 560) rather than two distinct operations, thereby desirably reducing latency, decreasing consumption of system resources, etc.

However, in other approaches the requested existing data may be written to the secondary storage volume before the remainder of the write request is performed. Thus, in approaches where a given region was only partially filled with data and therefore was not able to be written to, the received existing data may be merged with the data which was already partially filling the given region.

Furthermore, operation 562 includes updating the secondary record to indicate that each of the one or more respective regions in the secondary storage volume which have been written to now contain valid data. In other words, operation 562 includes updating the secondary record to indicate that the data received in operation 556 has been added to the appropriate regions of the secondary storage volume. As previously mentioned, the secondary storage volume may be a bitmap in some approaches. In such approaches, operation 562 may include setting each of the bits in the bitmap which correspond to regions which the data was added to in operation 556, where each of the bits are set to indicate that a respective region includes an appropriate portion of existing data received from the primary storage volume.

Furthermore, operation 564 includes sending a message to the primary system indicating the update to the secondary record was performed. In other words, operation 564 may inform the primary system that the one or more regions of the secondary storage volume in which the received data was written to now contain the at least a portion of the existing data received from the primary system, and therefore contain valid data. Sending this message allows for the primary system to be informed of any updates which have occurred to the regions of the secondary storage volume and/or the secondary record itself. Thus, the message sent in operation 564 may effectively be for updating a primary record in order to indicate which portions of the point-in-time copy of the primary storage volume have been received by, and implemented in, the secondary system. As a result, the primary record and the secondary record may maintain a matching record of which portions of the primary storage volume have been replicated in the secondary storage volume, e.g., as will be described in further detail below.

Thereafter, method 500 returns to operation 506 whereby additional existing data may be received from the primary storage volume. Moreover, any of the other processes included in method 500 may be repeated as additional existing data, write requests, read requests, etc. are received at the secondary system.

However, should the primary system go offline (e.g., due to a system failure) during the replication process described in method 500 before the whole copy of the primary volume is received by the secondary storage volume, it is preferred that appropriate action is taken to avoid data corruption and replication failure.

Figure 6:
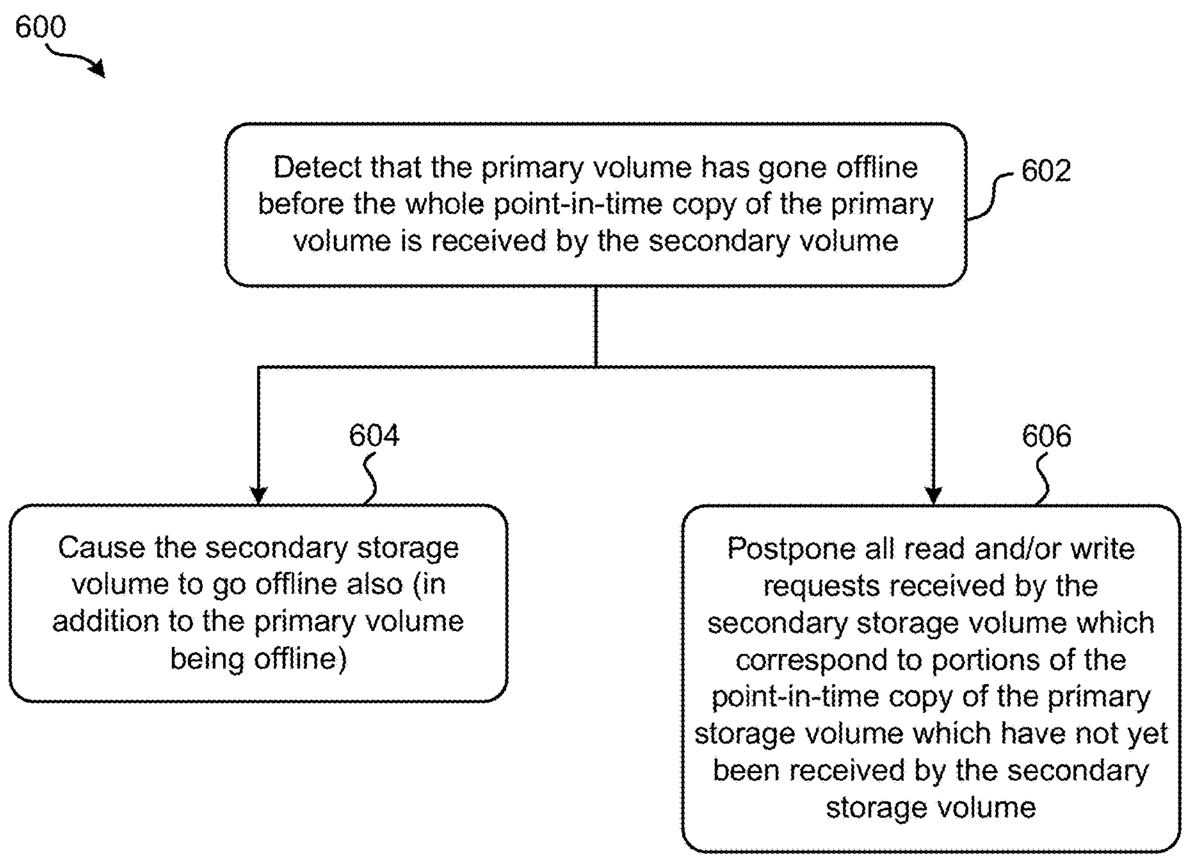
FIG. 6 is a flowchart of a method in accordance with one embodiment.

Accordingly, looking to FIG. 6, an exemplary method 600 for handling a system failure is illustrated according to one embodiment, which is in no way intended to limit the invention. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, operation 602 includes detecting that the primary volume has gone offline before the whole point-in-time copy of the primary volume is received by the secondary volume. According to various approaches, the detection in operation 602 may be made in response to receiving a notification from a user at the primary system that the primary volume has gone offline, in response to not receiving a status report from the primary system once a predetermined amount of time has passed since a last status report, upon experiencing a system timeout, etc.

Upon detecting that the primary volume has gone offline before the whole point-in-time copy of the primary volume is received by the secondary volume, the secondary system may take action in order to avoid data corruption. FIG. 6 illustrates two different exemplary operations which may be employed in order to avoid such data corruption. Which one or more of the two operations is actually implemented may be determined based on user input, automatically based on system conditions and/or parameters, based on information received from the primary system, etc.

Looking to operation 604, method 600 may include causing the secondary storage volume to go offline also (in addition to the primary volume being offline). By causing the secondary storage volume to go offline, no read and/or write requests may be processed by the secondary system, thereby avoiding any discrepancies from forming between the data included in the secondary storage volume at the secondary system and the primary storage volume at the primary system. It follows that once the primary storage volume is brought back online, the secondary storage volume may also be brought back online as well and replication of the point-in-time copy may resume where the primary and secondary systems left off prior to the primary storage volume going offline.

Alternatively, operation 606 includes postponing all read and/or write requests received by the secondary storage volume which correspond to portions of the point-in-time copy of the primary storage volume which have not yet been received by the secondary storage volume. In other words, the secondary storage volume remains online such that read and/or write requests which involve data which has already been stored in the secondary storage volume may be performed despite the primary storage volume being offline. However, read and/or write requests received by the secondary storage volume which pertain to data that has not yet been received from the primary storage volume are postponed to avoid discrepancies from forming between the data included in the secondary storage volume and the primary storage volume.

The read and/or write requests which are postponed may be stored in memory, e.g., such that they may be performed once the primary storage volume is brought back online. However, in some approaches the read and/or write requests received while the primary storage volume is offline may simply be rejected (e.g., failed). Again, once the primary storage volume is brought back online to a normal mode of operation, the secondary storage volume may also be brought back online as well. According to some approaches, once the secondary storage volume is brought back online, any postponed read and/or write requests may be performed prior to re-initiating replication of the point-in-time copy of the primary storage volume. Once resumed, replication of the point-in-time copy may continue where the primary and secondary systems left off prior to the primary storage volume going offline. Moreover, now that the secondary storage volume is in a normal mode of operation, received read and/or write requests which may have been postponed (or rejected altogether) while the primary storage volume was offline may be performed when received.

It follows that, a secondary storage system may receive replicated data from a volume in a remote primary storage system (relative to the secondary storage system) and efficiently form a copy of the volume by performing various ones of the operations described above with reference to FIG. 5. Moreover, read and/or write requests received during the replication process may be performed even before all the data corresponding to the volume being copied has been received. Thus, the data is instantly available at the secondary storage volume once the replication process has been initiated in that the data may be read and/or written to (overwritten, updated, appended to, etc.). This is a significant improvement in comparison to conventional products which are unable to perform read or write requests at a remote system until after the complete copy has been stored on the remote system.

Although the approaches included above were described from the secondary (e.g., DR) storage system's point of view, similar processes may be performed at the primary system in order to achieve these improvements as well. Accordingly, looking to FIG. 7, a method 700 for creating a copy of a data storage volume on a remote system is shown from a primary system's point of view according to one embodiment. Accordingly, one or more of the processes included in method 700 may include various ones of the approaches described above with reference to FIG. 5.

The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Moreover, each of the steps of the method 700 may be performed by any suitable component of the operating environment. For example, in various embodiments, the method 700 may be partially or entirely performed by a controller (e.g., see 430, 432 of FIG. 4), a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

Figure 7:
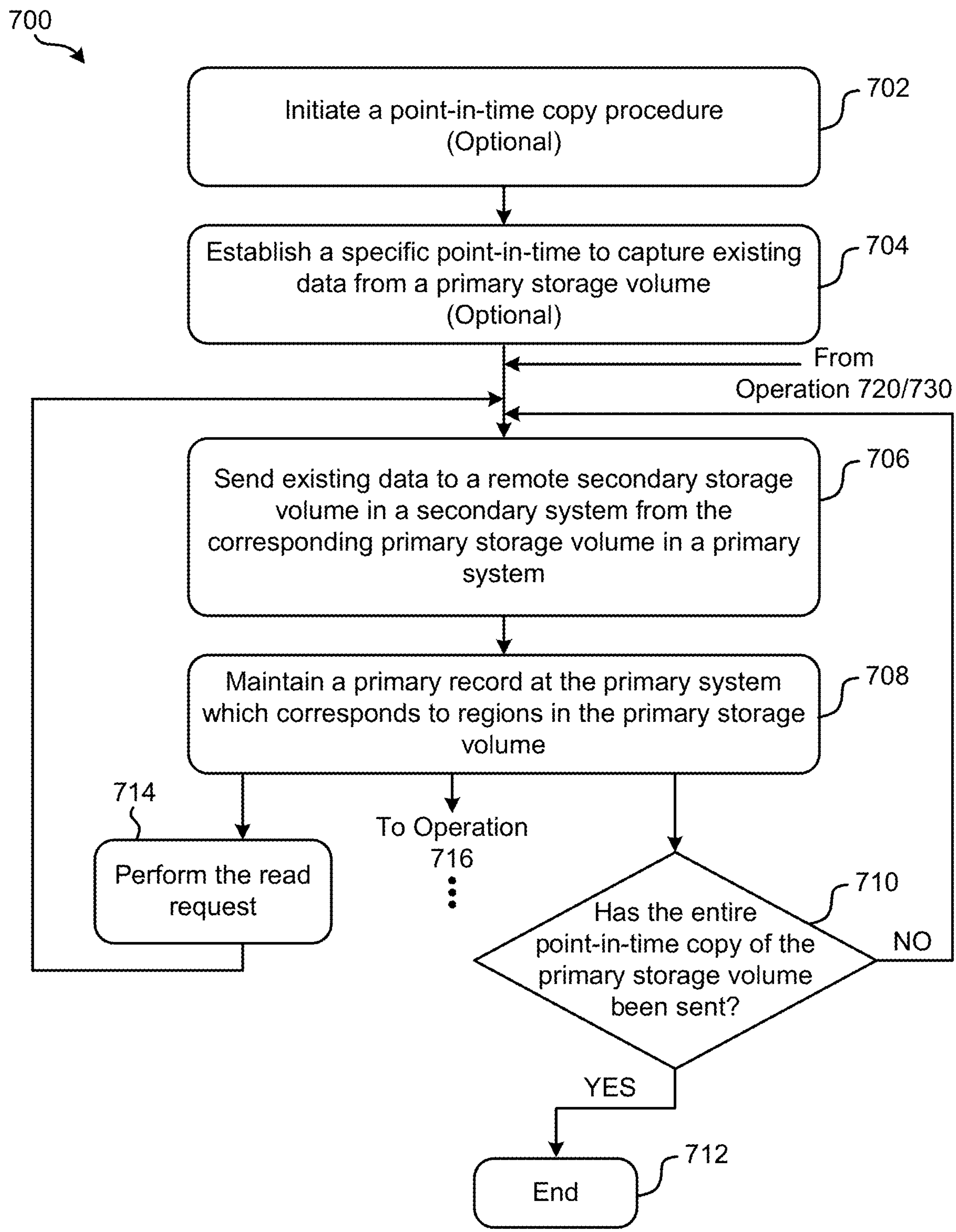
FIG. 7 is a flowchart of a method in accordance with one embodiment.
Figure 7:
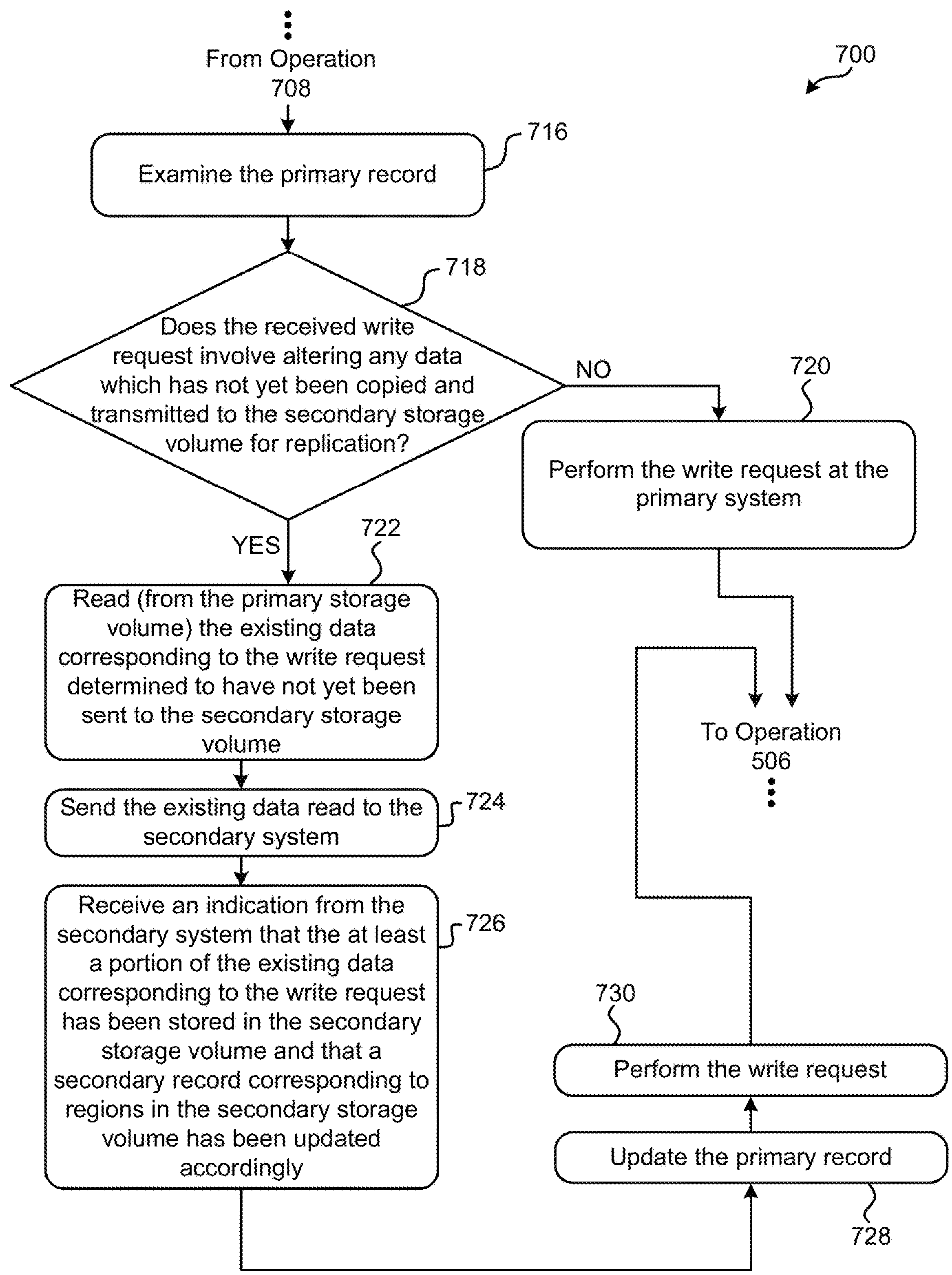

As shown in FIG. 7, optional operation 702 of method 700 includes initiating a point-in-time copy procedure. As previously mentioned, the ability to efficiently create point-in-time copies on remote systems is desirable for various reasons such as, being able to perform data analytics on host systems remote from the production location, storing back-ups offsite for better resiliency and cost (e.g., where land and/or power is less expensive), cloning to a remote system a volume that currently has a good state but which will shortly be modified with data that does not need to be replicated, cloning a volume to a new system and making the copy immediately readable and writable, etc. Accordingly, a point-in-time copy procedure may be initiated in response to a user request, a predetermined condition being met, etc.

Moreover, optional operation 704 includes establishing a specific point-in-time to capture existing data from the primary storage volume (the source volume) in response to the point-in-time copy procedure being initiated. The established point-in-time serves as a reference point at which data existing in the primary storage volume is captured and eventually sent to a secondary backup volume. Establishing the reference point-in-time is particularly desirable in distributed systems where each node of the system preferably agrees what writes form part of the point-in-time copy. According to various approaches, any manner of establishing a specific point-in-time which would be apparent to one skilled in the art after reading the present description may be employed. Moreover, once a specific point-in-time has been established, the steady state of the remote point-in-time copy system will be to copy uncopied regions of the primary storage volume to the secondary volume, e.g., as a part of a "background copy" process.

Operation 706 further includes sending existing data to a remote secondary storage volume in a secondary system from the corresponding primary storage volume in a primary system. As mentioned above, the existing data sent to the secondary storage volume may be a point-in-time copy of the data existing in the primary storage volume. Accordingly, the data sent may correspond to data existing in the primary storage volume as it were at an established point-in-time. The secondary storage volume may serve as a DR copy of the existing data in some approaches, e.g., should the primary volume be lost due to corruption, unintentional deletion, system failure, etc. It should again be noted that "existing data" as used herein is intended to refer to the data included in the primary storage volume which is being replicated onto (sent to) the secondary storage volume. Thus, according to an exemplary approach, "existing data" may be the data included in a point-in-time copy of the primary storage volume being replicated onto the secondary storage volume.

It is preferred that as the existing data is being sent to the secondary storage volume from the primary storage volume, the primary storage volume is made available for read and/or write access before the entire point-in-time copy of the primary storage volume has been copied to the secondary storage volume. Thus, read and/or write requests received at the primary system may be performed during the replication process. Moreover, it should again be noted that the "replication process" as used herein refers to the process of forming a copy of a primary storage volume on a remote system.

In order to achieve read and/or write functionality at the primary storage volume during the replication process, operation 708 includes maintaining a primary record at the primary system which corresponds to regions in the primary storage volume. According to an illustrative approach, the primary record may be a bitmap (e.g., see 414 of FIG. 4). Each bit of the bitmap may correspond to a respective region in the primary storage volume on which the existing data being sent in operation 706 is stored in its original form. Accordingly, in preferred approaches, maintaining the primary record includes indicating which of the regions in the primary storage volume contain data which has already been sent (e.g., transmitted) to the secondary system. As mentioned above, a "region" is a fixed-size quantity of the given volume. In other words, each region in a given volume is preferably the same size. However, different volumes may implement different sized regions, e.g., depending on the desired approach. Moreover, the primary record may be maintained according to any of the approaches described above with reference to the secondary record. For instance, in some approaches the primary record may be a bitmap which may be maintained by setting the bits to have a logical value which indicates whether the corresponding region of the primary storage volume contains data which has already been sent to the secondary system (and preferably successfully copied to the secondary storage volume).

As mentioned above, the primary and secondary records (particularly the secondary record) contain information which is important in ensuring a complete copy of the primary storage volume is formed in the secondary system, and it is therefore desirable that the primary and secondary records are managed in an appropriately resilient manner. According to an illustrative approach, the primary and/or secondary records may be maintained on a clustered system, preferably such that each of the bitmaps are stored on two or more different nodes in the respective clustered system. Moreover, it is preferred that each copy of the primary and secondary records is modified before any action is taken based on changing the bitmap state. In other words, it is preferred that the primary and secondary records are matched before any read and/or write operations are performed on either of the storage volumes. However, in other approaches, a storage system may implement other solutions for ensuring appropriately resilient data, e.g., such as storing the primary and/or secondary records as multiple on-disk copies.

Existing data may continue to be sent to the secondary storage volume from the primary storage volume until the entire point-in-time copy of the primary storage volume has been sent. Accordingly, with continued reference to FIG. 7, decision 710 includes determining whether the entire point-in-time copy of the primary storage volume has been sent to the secondary system. The outcome of decision 710 may be determined a number of different ways depending on the approach. For instance, in some approaches the primary system may receive a notification from the secondary system that the entire point-in-time copy of the primary storage volume has been successfully stored in the secondary storage volume. In other approaches, the primary system may deduce that the entire point-in-time copy of the primary storage volume has been sent to the secondary storage volume once all the bits in a bitmap associated with the primary storage volume have been set to indicate each of the regions in the primary storage volume have been sent to the secondary system.

As shown, method 700 returns to operation 706 in response to determining that the entire point-in-time copy of the primary storage volume has not yet been sent, whereby additional existing data may be sent to the secondary storage volume. However, method 700 may alternatively proceed to operation 712 and subsequently end in response to determining that the entire point-in-time copy of the primary storage volume has been sent to the secondary system. As previously mentioned, this may be reflected in the primary and secondary records, where the primary record will indicate that data from all regions in the primary storage volume has been sent to the secondary storage volume, and the secondary record will indicate that all regions in the secondary storage volume contain data received from the primary system. However, it should be noted that in various approaches, method 700 may return to operation 702 and re-initiate a point-in-time copy procedure, e.g., in response to being prompted with a data transmission request from a separate storage system, a user input, a predetermined condition being met, etc.

As alluded to above, read and/or write requests may be received at the primary system before the entire point-in-time copy of the primary storage volume has been sent to the secondary system. Accordingly, the flowchart of method 700 may proceed to operation 714 and/or 716 depending on whether a read request and/or a write request is received at the primary system before the entire point-in-time copy of the primary storage volume has been sent. The flowchart of FIG. 7 has thereby been separated into three different paths which stem from operation 708. Thus, depending on the given situation, method 700 may proceed differently from operation 708, e.g., as will soon become apparent.

Again, read requests may be received while existing data is being sent to the remote secondary system. In response to receiving such a read request for data at the primary system, method 700 preferably proceeds to operation 714. There, operation 714 includes performing the read request. While performing read requests at the secondary storage volume involve additional operations and/or determinations, a read request may be performed at the primary storage volume at any time because a full copy of the volume exists there. Thus, the data corresponding to a read request received at the secondary system is already stored in the secondary storage volume, and may be read.

Once the read request has been performed, method 700 returns to operation 706 whereby additional existing data may be sent to the secondary system. Moreover, any of the other processes included in method 700 may be repeated as additional write and/or read requests are received.

Returning to operation 708, as mentioned above, read and/or write requests may be received at the primary system before the entire point-in-time copy of the primary storage volume has been sent to the secondary system. Accordingly, the flowchart of method 700 may proceed from operation 708 to operation 714 and/or 716 depending on whether a read request and/or a write request is received before the entire point-in-time copy of the primary storage volume has been sent. In response to receiving write request at the primary system corresponding to the primary storage volume, method 700 preferably proceeds to operation 716. There, operation 716 includes examining the primary record. As mentioned above, the primary record may be a bitmap, the bits of which may be examined to determine whether a portion of the existing data being sent to the secondary storage volume has already been sent to the secondary storage volume. Accordingly, decision 718 includes determining whether existing data corresponding to the write request has already been copied to the secondary storage volume. In other words, decision 718 includes determining whether the received write request involves altering any data which has not yet been copied and transmitted to the secondary storage volume for replication.

As shown, method 700 proceeds to operation 720 in response to determining that all the existing data corresponding to the write request has already been copied to the secondary storage volume. There, operation 720 includes performing the write request at the primary system. Thereafter, method 700 returns to operation 706 whereby additional existing data may be sent to the secondary storage volume. It should be noted that write requests may be performed by padding out the write operations to a corresponding number of the regions in the respective storage volume, e.g., as would be appreciated by one skilled in the art after reading the present description.

However, returning to decision 718, method 700 proceeds to operation 722 in response to determining that at least a portion of the existing data corresponding to the write request has not already been sent to the secondary storage volume. As shown, operation 722 includes reading the existing data corresponding to the write request determined to have not yet been sent to the secondary storage volume, the existing data being read from the primary storage volume. Moreover, operation 724 includes sending the existing data read in operation 722 to the secondary system. Accordingly, operations 722 and 724 ensure that any existing data stored in the primary storage volume which will be affected by (e.g., updated, overwritten, appended to, etc.) a received write request is copied in its original form to the secondary storage volume before the received write operation is performed. Thus, the point-in-time copy formed on the secondary storage volume matches the data as it was in the primary storage volume at the specific point-in-time established in operation 704, thereby desirably avoiding data corruption and/or discrepancies between the primary and secondary storage volumes.

The primary system may delay performance of the received write request until an indication is received from the secondary system which signals that the at least a portion of the existing data corresponding to the write request has been stored in the secondary storage volume and that a secondary record corresponding to regions in the secondary storage volume has been updated accordingly. See operation 726. Delaying performance of the write request until the indication is received from the secondary system may desirably ensure that the existing data sent in operation 724 has been successfully stored in regions of the secondary storage volume. Thus, should any issues occur at the secondary system while attempting to store the existing data in the secondary storage volume, the primary system is able to resend the existing data as it has not yet been altered by the write request.

Furthermore, operation 728 of method 700 includes updating the primary record in response to receiving the indication as described in relation to operation 726. As mentioned above, it is desirable that the primary and secondary records maintain a record of which portions of the data in the primary storage volume have been replicated in the secondary storage volume. The message received from the secondary system allows for the primary system to be informed of any updates which have occurred to the regions of the secondary storage volume and/or the secondary record itself. Thus, the message received in operation 726 may effectively have been sent from the secondary system to update the primary record in order to indicate which portions of the point-in-time copy of the primary storage volume have been received by, and implemented in, the secondary system.

Thereafter, operation 730 includes performing the write request. It should be noted that although the embodiment illustrated in FIG. 7 indicates that the write request is performed in response to receiving the indication and updating the primary record, in other embodiments the write request may be performed in response to receiving an indication as seen in operation 726, in response to updating the primary record as seen in operation 726, in response to simply sending the existing data to the secondary system as seen in operation 722, etc., or according to any other desired progression. Moreover, rather than waiting for all data corresponding to the write request to be written to the secondary storage volume before performing the full write request on the primary storage system, portions of the write request may be performed on individual regions in the primary storage volume as indications are received that corresponding regions of the secondary storage volume have been successfully filled (written to) and secondary record has been updated accordingly.

Thereafter, method 700 returns to operation 706 whereby additional existing data may be sent to the secondary storage volume. Once the read request has been performed, method 700 returns to operation 706 whereby additional existing data may be sent to the secondary system. Moreover, any of the other processes included in method 700 may be repeated as additional existing data is sent to the secondary system, write requests are received, read requests are received, etc.

However, it should be noted that if multiple write requests are received in quick succession at the primary system, each of which correspond to a same region, the write requests received after a first write request for the region are preferably postponed. The primary system is preferably able to detect that there is an outstanding (ongoing) write request corresponding to the given region in the primary storage volume, and therefore the performance of subsequent write requests to that same region may be postponed until the data corresponding to the outstanding request is written to the region. By postponing subsequently received write requests which correspond to a same region as an outstanding write request, more than one write request may be satisfied at once. In other words, if the primary system is already in the process of sending data to the secondary system, that transmission of data may be used to perform more than one write request rather than sending multiple copies of the data to the secondary system. Likewise, if the primary system has a write request outstanding while sending data from a same region of the primary storage volume for a different reason not related to the write request, the primary system may act as though the data being sent is in response to issuing a transmission corresponding to the outstanding write request. By transmitting the data from the primary system to the secondary system only once, the configuration is able to avoid a more complex scheme to ensure successful data transfer and write performance, thereby ensuring efficiency. Moreover, if the primary system is aware that data has been pulled from the secondary system for a given region, but the indication that the secondary record has been set has not yet been received at the primary system, any write requests to that same region may not be performed by the primary system, but instead will wait for the data transfer to the secondary system to complete (e.g., receive the indication in operation 726.

Should the secondary system go offline (e.g., due to a system failure) during the replication process described in method 700 before the whole copy of the secondary volume has been sent to the secondary storage volume, it is preferred that appropriate action is taken to avoid data corruption and replication failure.

Figure 8:
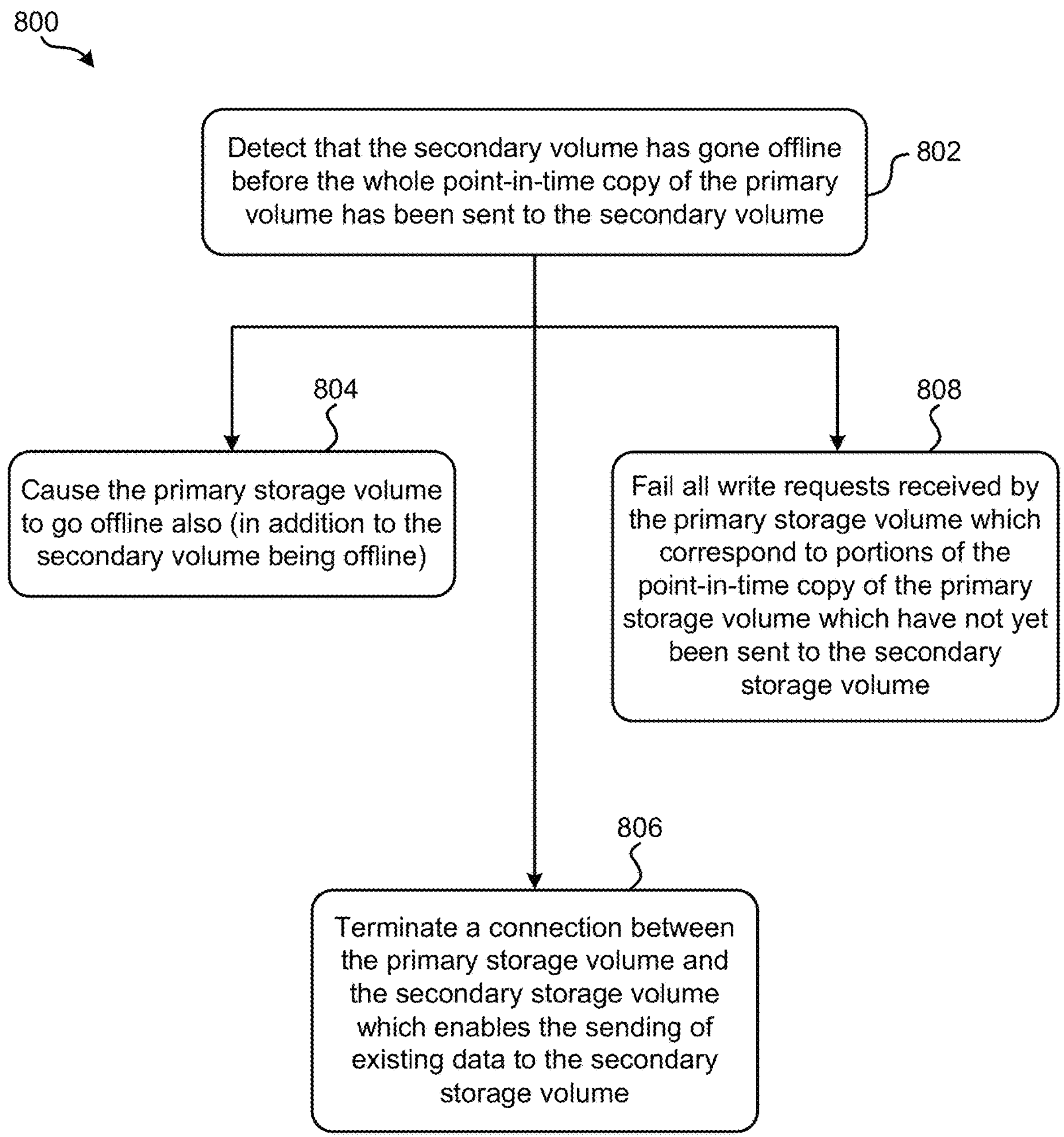
FIG. 8 is a flowchart of a method in accordance with one embodiment.

Accordingly, looking to FIG. 8, an exemplary method 800 for handling a system failure is illustrated according to one embodiment, which is in no way intended to limit the invention. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, operation 802 includes detecting that the secondary volume has gone offline before the whole point-in-time copy of the primary volume has been sent to the secondary volume. According to various approaches, the detection in operation 802 may be made in response to receiving a notification from a user at the secondary system that the secondary volume has gone offline, in response to not receiving a status report from the secondary system once a predetermined amount of time has passed since a last status report, upon experiencing a system timeout, etc.

Upon detecting that the secondary volume has gone offline before the whole point-in-time copy of the primary volume has been sent to the secondary storage volume, the primary system may take action in order to avoid data corruption. FIG. 8 illustrates three different exemplary operations which may be employed in order to avoid such data corruption. Which one or more of the three operations is actually implemented may be determined based on user input, automatically based on storage system conditions and/or parameters, based on information received from the primary system, etc. Moreover, it is preferred that information regarding whether the primary and/or secondary storage volumes are online or offline is preferably shared between the systems in order to assist in determining which of the following operations should be performed.

Looking to operation 804, method 800 may include causing the primary storage volume to go offline also (in addition to the secondary volume being offline). By causing the primary storage volume to go offline, no read and/or write requests may be processed by the primary system, thereby avoiding any discrepancies from forming between the data included in the secondary storage volume at the secondary system and the primary storage volume at the primary system. It follows that once the secondary storage volume is brought back online, the primary storage volume may also be brought back online as well and replication of the point-in-time copy may resume where the primary and secondary systems left off prior to the primary storage volume going offline.

Moreover, operation 806 includes terminating a connection between the primary storage volume and the secondary storage volume which enables the sending of existing data to the secondary storage volume. By terminating the connection between the primary and secondary storage volumes, the primary system may desirably be prevented from performing write requests at the primary storage volume while the secondary storage volume is offline. It follows that in some approaches, operation 806 may be performed in response to receiving a write request at the primary system which corresponds to portions of the point-in-time copy of the primary storage volume which have not yet been sent to the secondary storage volume.

In some approaches, operation 806 may be achieved by simply terminating the connection between the primary and secondary systems. According to an example, which is in no way intended to limit the invention, a network connection extending between the primary and secondary systems (e.g., see 406 of FIG. 4) may be terminated. However, it should be noted that the connection between the primary and secondary systems is preferably restored after the secondary system is back online. Depending on the manner in which the connection between the primary and secondary systems was terminated, restoring the connection may be performed in any manner which would be apparent to one skilled in the art after reading the present description.

With continued reference to FIG. 8, operation 808 includes failing all write requests received by the primary storage volume which correspond to portions of the point-in-time copy of the primary storage volume which have not yet been sent to the secondary storage volume. In other words, the primary storage volume may remain online such that any read request and/or write requests which involve data which has already been sent to and stored in the secondary storage volume may be performed despite the secondary storage volume being offline. However, write requests received by the primary storage volume which pertain to data that has not yet been sent to the secondary storage volume are failed to avoid discrepancies from forming between the data included in the secondary storage volume and the primary storage volume.

However, in some approaches, rather than failing all write requests received by the primary storage volume which correspond to portions of the point-in-time copy of the primary storage volume which have not yet been sent to the secondary storage volume, these received write requests may simply be postponed. The write requests which are postponed may be stored in memory, e.g., such that they may be performed once the secondary storage volume is brought back online. Again, once the secondary storage volume is brought back online to a normal mode of operation, the primary storage volume may also be brought back online as well. According to some approaches, once the primary storage volume is brought back online, any postponed read and/or write requests may be performed prior to re-initiating replication of the point-in-time copy of the primary storage volume. Once resumed, replication of the point-in-time copy may continue where the primary and secondary systems left off prior to the secondary storage volume going offline. Moreover, now that the primary storage volume is in a normal mode of operation, received write requests which may have been postponed (or rejected altogether) while the secondary storage volume was offline may be performed when received.

As previously mentioned, the redundant point-in-time copy stored in the secondary storage volume may be used to recover the primary storage volume of the primary system in response to experiencing a hardware failure, a software failure, unintentional deletion of data, etc., or any other reason which may cause the primary storage volume to lose the data previously stored therein. Moreover, it should be noted that although various ones of the approaches included herein are described in relation to creating a point-in-time copy on a remote system, any desired type of data copy may be created using the same or similar processes included herein as would be appreciated by one skilled in the art after reading the present description.

Various in-use examples, which are in no way intended to limit the invention, are described below. It should be noted that any of the following in-use examples may be implemented with any of the approaches described above, e.g., depending on the desired embodiment, as would be appreciated by one skilled in the art after reading the present description.

Consistency Groups

According to an in-use example, which is in no way intended to limit the invention, the ability to process data across multiple volumes in a consistent way is desired. In order to do so, it is important to provide the capability to capture data on the primary system across an arbitrary set of volumes. This may be achieved by defining one or more volumes to belong to a "consistency group". Depending on the embodiment, there may be any number of consistency groups in a given storage system. However, the key point at which consistency group is crucial to a volume is when the specific point-in-time is established prior to replication being initiated between the primary and secondary storage volumes, e.g., see optional operations 502, 702 above. Moreover, it is desirable that the point-in-time is established across all volumes in the consistency group, which may be performed according to any procedure which would be apparent to one skilled in the art after reading the present description. For instance, establishing the point-in-time across more than one volume in a consistency group may be performed using a FlashCopy operation.

Once the point-in-time has been established, the consistency group membership of the volumes may be inconsequential. In some approaches, the source (primary) volumes and the backup (secondary) volumes may be managed as an entire consistency group for simplicity. However, the various processes described above with reference to FIGS. 5-8 may not be modified.

Adjusting Background Copy

According to another in-use example, which is in no way intended to limit the invention, it may be desirable that a user is able to choose to prioritize or deprioritize a background copy process. According to the present description, a "background copy process" refers to the data replication process described according to the various embodiments above. This prioritization or deprioritization may be achieved by assigning the background copy procedure more or less of the bandwidth respectively, between the primary and secondary systems. Deprioritizing and slowing the background copy process leaves more bandwidth available to perform read and/or write requests that are received, but also results in a greater proportion of the read and/or write requests being unable to be performed without requesting the additional transfer of data between the systems (e.g., see operations 554, 722 above). Moreover, the secondary (backup) system will depend on the primary (source) system for a longer period of time. Therefore the tradeoff between available bandwidth and processing time may be weighed depending on the particular situation.

For example, if it is more important (e.g., to a user) that the primary storage volume is independent of the primary storage volume, the background copy process may even be modified to be disabled (or slowed to a zero rate). Accordingly, regions that have been read will be cached on the secondary system for subsequent access, while writes are stored on the secondary system. Such use may tend to result in the secondary storage volume becoming a temporary copy, to be discarded after use. Moreover, because unread and/or unwritten regions will not be copied, this scheme may save on bandwidth between systems. Furthermore, if the secondary storage volume is thin-provisioned, this may also lower the storage requirements on the secondary system.

Predicting What to Prioritize with Background Copy

According to another in-use example, various ones of the embodiments described herein may be extended to perform intelligent background copies of the regions most likely to be read and/or written to, thereby desirably minimizing the copy overhead.

According to different approaches, the regions most likely to be read and/or written to may be determined based on a number of different factors. One such factor includes detecting sequential reads and/or writes, whereby a background copy for the next few regions may be prioritized. Another factor includes examining historical knowledge of hot regions of the given storage volume which may be acquired from software that matches volume regions to the appropriate tier of storage, e.g., such as IBM Easy Tier. Another factor includes determining whether the source volume is thin-provisioned, whereby allocated regions should be prioritized ahead of unallocated regions. Yet another factor includes determining whether the data layout of the volume is known, whereby the most frequently-used parts of the storage volume may be located in well-defined regions and may thereby be prioritized. However various other factors may have an effect on what to prioritize with a background copy process.

Optimizing Writing Data to the Secondary Storage Volume

According to yet another in-use example, if multiple writes to a single region on the secondary storage volume are received by the secondary system in quick succession, the write requests received after the first write request may be postponed until any missing data has been retrieved. Subsequent write requests may be merged into the retrieved data and applied as part of the same write operation. If enough writes are submitted to the secondary storage volume such that an entire region is covered, while that region is being retrieved, those writes may be applied immediately and completed back to the host. Moreover, secondary record may be updated as soon as the writes complete, and a message may be sent to the primary system to dirty the primary record, even while the region is being retrieved. The retrieved data may be ignored when it later arrives. As a result, sequential writes to the secondary storage volume may result in improved performance.

It follows that various embodiments described herein are able to achieve instantly-available data replication for point-in-time copies of a primary storage volume. It should be noted that "instantly-available" is intended to mean that read and write requests may be performed even during the synchronization process of creating the point-in-time copy of the volume. In other words, upon initiating some of the processes described herein, a point-in-time copy of the data included in a storage volume at a remote location (relative to the source copy of the volume) may be read from and/or written to directly upon request.

The improvements achieved by enabling this functionality are significant in comparison to conventional products. As previously mentioned, conventional products experience significant drawbacks involved with attempting to create a point-in-time copy of a volume on a remote system. These drawbacks in conventional products include long delays before any data may be read from and/or written to the copy, consumption of an undesirably high amount of the source system's storage, etc. In sharp contrast, various embodiments described herein may be able to achieve an improved process of creating instantly available point-in-time copies of volumes on remote systems, which is able to increase system throughput, improve system efficiency, improve access to data, etc.

Although various approaches described above may be implemented in order to efficiently create an instantly available point-in-time copy of a volume on a remote system, creating more than one point-in-time copy on even a single remote system may desirably include additional processes in order to achieve efficiency, e.g., rather than simply repeating various ones of the processes described above in order to create the more than one point-in-time copy. According to preferred approaches, multiple copies of one or more volumes may be formed on a remote storage system by implementing cascaded point-in-time copying processes, e.g., as will be described in further detail below.

Referring back momentarily to FIG. 4, an overarching storage system 400 may include a primary system 402 and a secondary system 404, where the primary and secondary systems 402, 404 are remote from each other, meaning that the two systems are sufficiently separated from each other. As described above, a point-in-time copy (or another type of copy) of the data included in a storage volume (primary storage volume 416) in the primary system 402 may be sent to the remote secondary system 404. However, in further embodiments additional point-in-time copies (or other types of copies) may be sent from the primary system 402 to the secondary system 404, e.g., for DR purposes. Depending on the approach, the additional point-in-time copies sent from the primary system 402 to the secondary system 404 may be subsequent point-in-time copies of the data included in the same storage volume, or point-in-time copies of the data included in additional storage volumes which may be in the primary system 402.

Figure 9A:
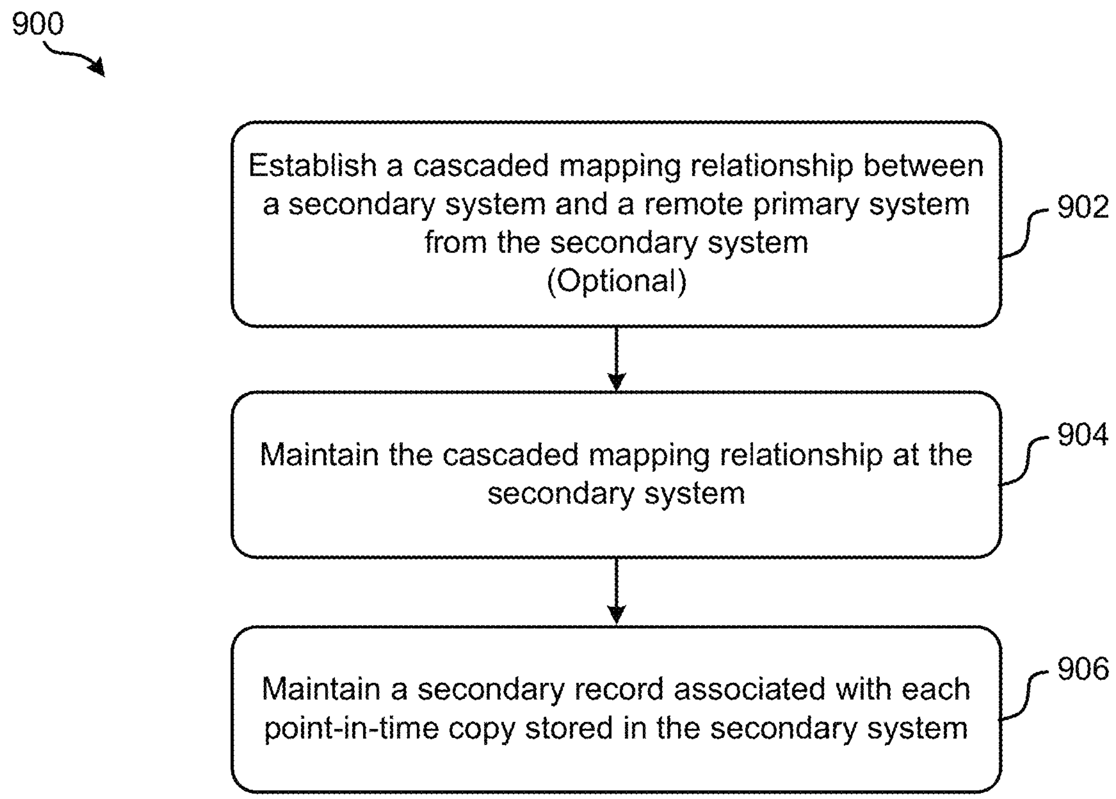
FIG. 9A is a flowchart of a method in accordance with one embodiment.

Accordingly, looking to FIG. 9A, a flowchart of a computer-implemented method 900 for creating more than one copy of a data storage volume on a remote system is shown according to one embodiment. The method 900 may be performed in accordance with the present invention in any of the environments depicted in FIGS. 1-4, among others, in various embodiments. Of course, more or less operations than those specifically described in FIG. 9A may be included in method 900, as would be understood by one of skill in the art upon reading the present descriptions.

Each of the steps of the method 900 may be performed by any suitable component of the operating environment. For example, in various embodiments, the method 900 may be partially or entirely performed by a controller (e.g., see 430, 432 of FIG. 4), a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9A, optional operation 902 of method 900 includes establishing a cascaded mapping relationship between a secondary system and a remote primary system from the secondary system. Operation 902 is presented as being an "optional" operation in the present embodiment, because the cascaded mapping relationship may need not be established each time method 900 is performed. For instance, the cascaded mapping relationship may have already been established, e.g., in a previous iteration.

According to one approach, which is in no way intended to limit the invention, a cascaded mapping relationship may be established between the primary and secondary systems by programming a controller and/or a storage volume corresponding to each of the respective primary and secondary systems to abide by a cascaded mapping relationship which effectively extends between the two. However, in other approaches the cascaded mapping relationship may be established in any other manner which would be appreciated by one skilled in the art after reading the present description. For instance, in one approach, the cascaded mapping relationship may be established between the primary and secondary systems by forming a FlashCopy relationship between the two systems.

Moreover, operation 904 of method 900 includes maintaining the cascaded mapping relationship at the secondary system. Although a cascaded mapping relationship itself may already be established between the secondary system and the remote primary system, the manner in which the cascaded mapping relationship is actually managed (e.g., implemented during use) may include various different sub-processes depending on the situation, e.g., as will be described in further detail below.

Figure 13A:
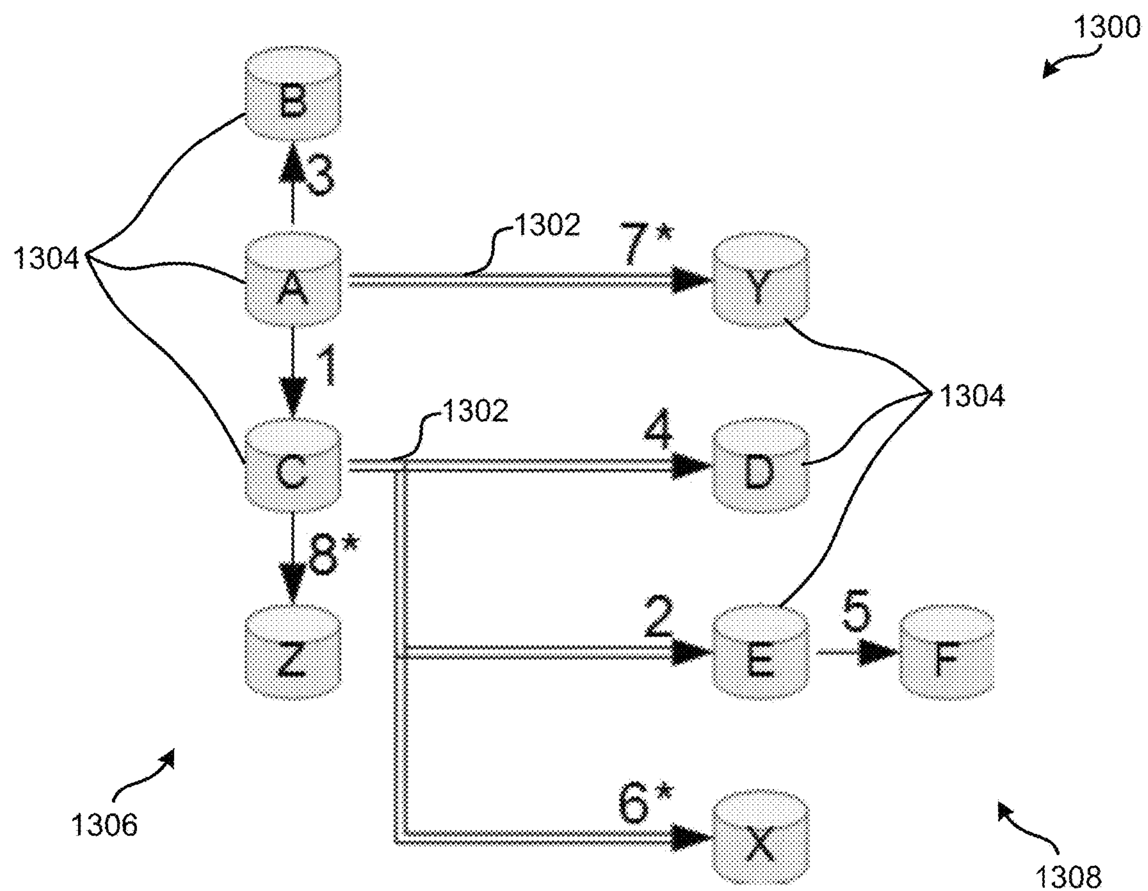
FIG. 13A-13F are representative views of a cascaded mapping relationship which extends between a primary system and a secondary system in accordance with one embodiment.
Figure 13B:
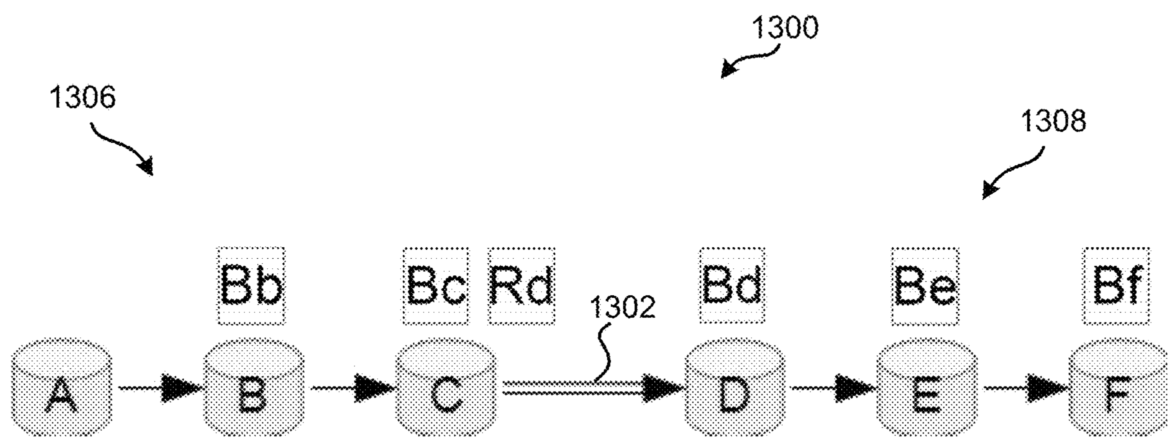

For example, referring momentarily to FIGS. 13A-13B, a same cascaded mapping relationship is depicted in a tree-like structure and logical flow configuration respectively, according to a given example. As shown, storage volumes containing data are located on both sides of the interface 1302 of the cascaded mapping relationship between the secondary system and the remote primary system, the organization of which will be discussed in further detail below. Looking specifically to the logical flow configuration of the cascaded mapping relationship shown in FIG. 13B, the different storage volumes are spread out in a left-to-right fashion, with storage volumes 1304 at the primary system 1306 on the left of the interface 1302, and storage volumes 1304 at the secondary system 1308 on the right of the interface 1302. Moreover, in order to better understand the various processes described herein, it should be noted that a storage volume at the primary system may be designated as a "source volume" and may be considered as being at the head of the cascaded mapping relationship.

According to the present configuration illustrated in FIG. 13B, the leftmost storage volume at the primary system may be referred to as the source volume, which may be considered as being at the head of the cascaded mapping relationship. Moreover, the storage volumes to the right of the source volume may be considered as being "downstream" from the source volume, while a storage volume to the left of another storage volume may be considered "upstream" from it. However, this interrelationship between the different storage volumes of the primary and secondary systems is in no way intended to limit the invention. In other embodiments, a cascaded mapping relationship may correspond to any desired representational logical flow, e.g., which progresses from right-to-left, bottom-to-top, top-to-bottom, etc.

Referring again to FIG. 9A, operation 906 further includes maintaining a secondary record associated with each point-in-time copy stored in the secondary system. As mentioned above, each secondary record indicates which regions in a storage volume corresponding to the respective point-in-time copy contain valid data. In preferred approaches the secondary records include (e.g., at least some are) bitmaps, where each bit in a given bitmap preferably corresponds to a given region of the storage volume in which the respective point-in-time copy is stored, e.g., according to any of the approaches introduced herein. For instance, a clustered system may be implemented whereby each of the bitmaps may be stored on two or more nodes in the clustered system, e.g., as described in further detail above. However, it should again be noted that any one or more of the secondary records associated with the point-in-time copies stored in the secondary system may have a different form depending on the desired embodiment.

Figure 9B:
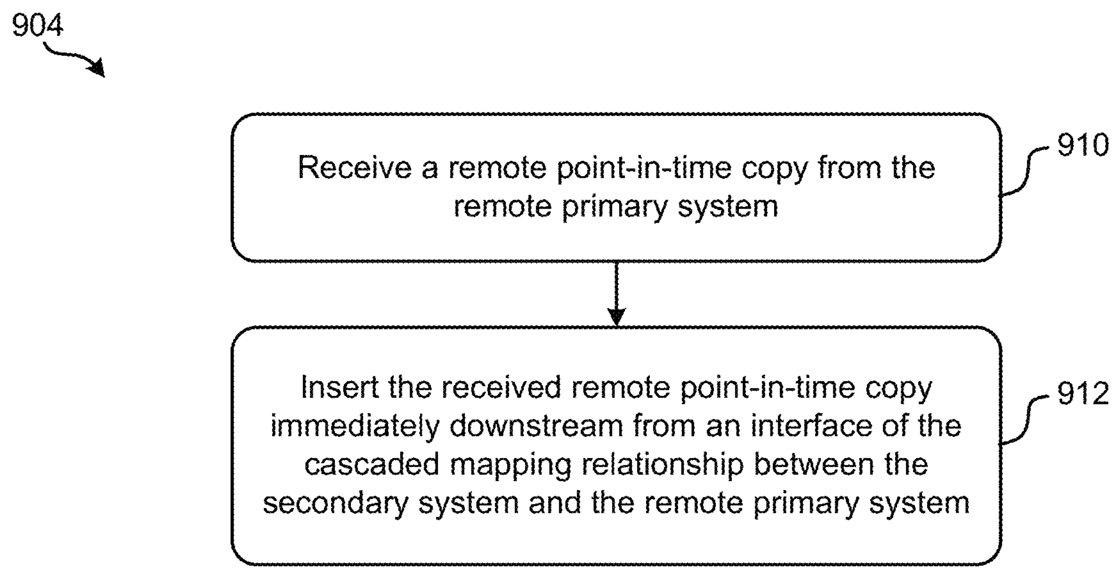
FIG. 9B is a flowchart of sub-operation which may be performed as a part of an operation included in the method of FIG. 9A, in accordance with one embodiment.
Figure 9C:
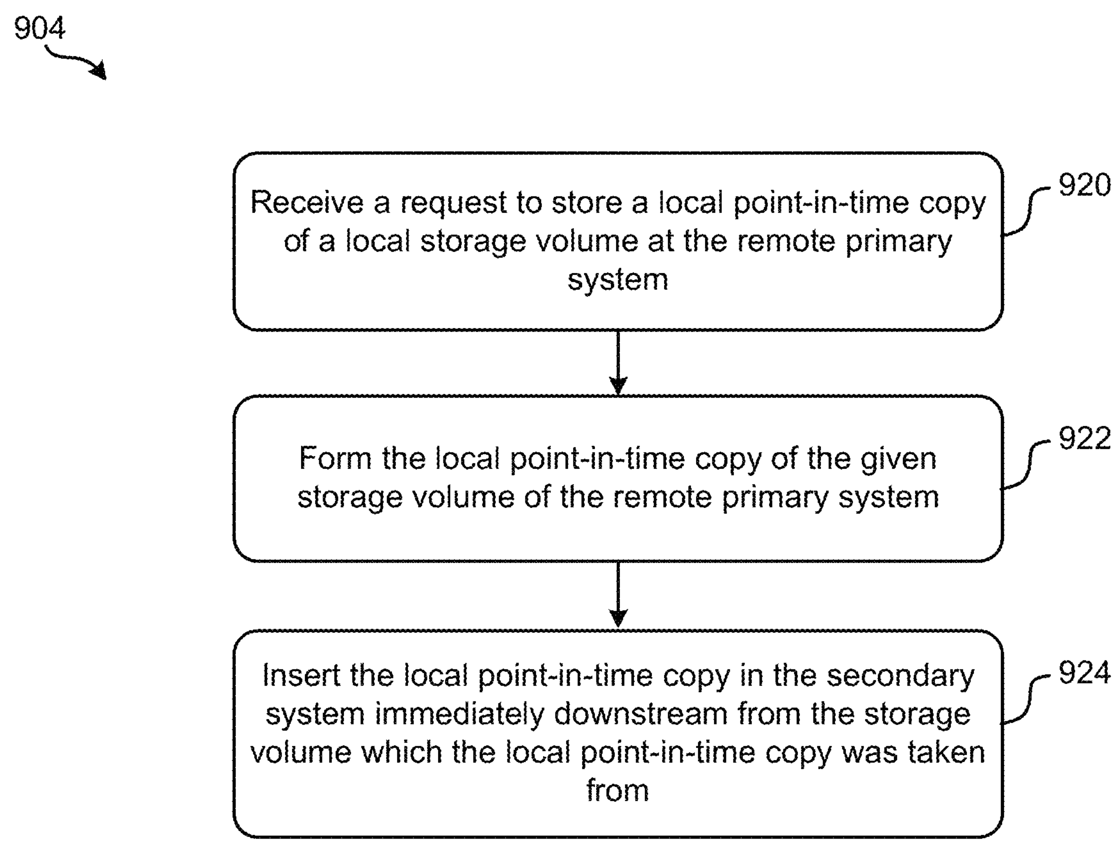
FIG. 9C is a flowchart of sub-operation which may be performed as a part of an operation included in the method of FIG. 9A, in accordance with one embodiment.

As mentioned above, sub-processes involved with maintaining the cascaded mapping relationship at the secondary system as seen in operation 904 may vary depending on the particular situation. Accordingly, FIGS. 9B-9F depict sub-processes which may be implemented in order to maintain the cascaded mapping relationship at a secondary system in response to experiencing different conditions. For example, which is in no way intended to limit the invention, FIG. 9B includes exemplary sub-processes involved with maintaining the cascaded mapping relationship which may be implemented in response to receiving a remote point-in-time copy from the remote primary system. It follows that any one or more of the sub-processes included in FIG. 9B may be implemented in order to perform operation 904 of FIG. 9A. However, it should be noted that the sub-operations of FIG. 9B are illustrated in accordance with one embodiment which is in no way intended to limit the invention.

Referring now to FIG. 9B, sub-operation 910 includes receiving a remote point-in-time copy from the remote primary system. As described above, the point-in-time copy received may be a copy of the data included in a storage volume stored at the primary storage system. Thus, sub-operation 910 effectively includes receiving a point-in-time copy at the secondary system of data stored in a particular storage volume at the remote primary system.

Moreover, sub-operation 912 includes inserting the received remote point-in-time copy immediately downstream from an interface of the cascaded mapping relationship between the secondary system and the remote primary system.

Accordingly, referring momentarily again to FIG. 13B, sub-operation 912 may include inserting a received pointin-time copy immediately to the right of (e.g., adjacent to, or downstream from) the interface 1302 of the cascaded mapping relationship, thereby effectively shifting all the other point-in-time copies at the secondary system downstream one position.

In other approaches, a request to store a point-in-time copy of the data located in a storage volume at the secondary system itself may be received. Accordingly, referring now to FIG. 9C, sub-operation 920 includes receiving a request to store a local point-in-time copy of a local storage volume at the remote primary system. It should be noted that a "local point-in-time copy" as used herein is intended to mean a copy of an existing volume, where the copy and existing volume are the same size and located on the same system. However, in some approaches the copy and the existing volume (e.g., source volume) may have different sizes when formed and/or thereafter, e.g., due to modifications, user input, system parameters, etc.

Moreover, sub-operation 922 includes forming the local point-in-time copy of the given storage volume of the remote primary system, while sub-operation 924 includes inserting the local point-in-time copy in the secondary system immediately downstream from the storage volume which the local point-in-time copy was taken from. In some approaches, a "storage volume" may simply be a logical volume that is used to store the data of in a corresponding point-in-time copy. In other approaches, a storage volume may at least include pointers to a logical and/or physical location at which the actual data corresponding to the point-in-time copy is stored. For example, a storage volume may include pointers to the data stored in another local and/or remote storage volume.

By inserting each local point-in-time copy immediately downstream from a corresponding source storage volume desirably ensures that copies on a given system are grouped together in the cascaded mapping relationship such that the most recent copies are upstream from the less recent copies. Accordingly, storage efficiency and access rates are improved e.g., as will be described in further detail below.

Figure 9D:
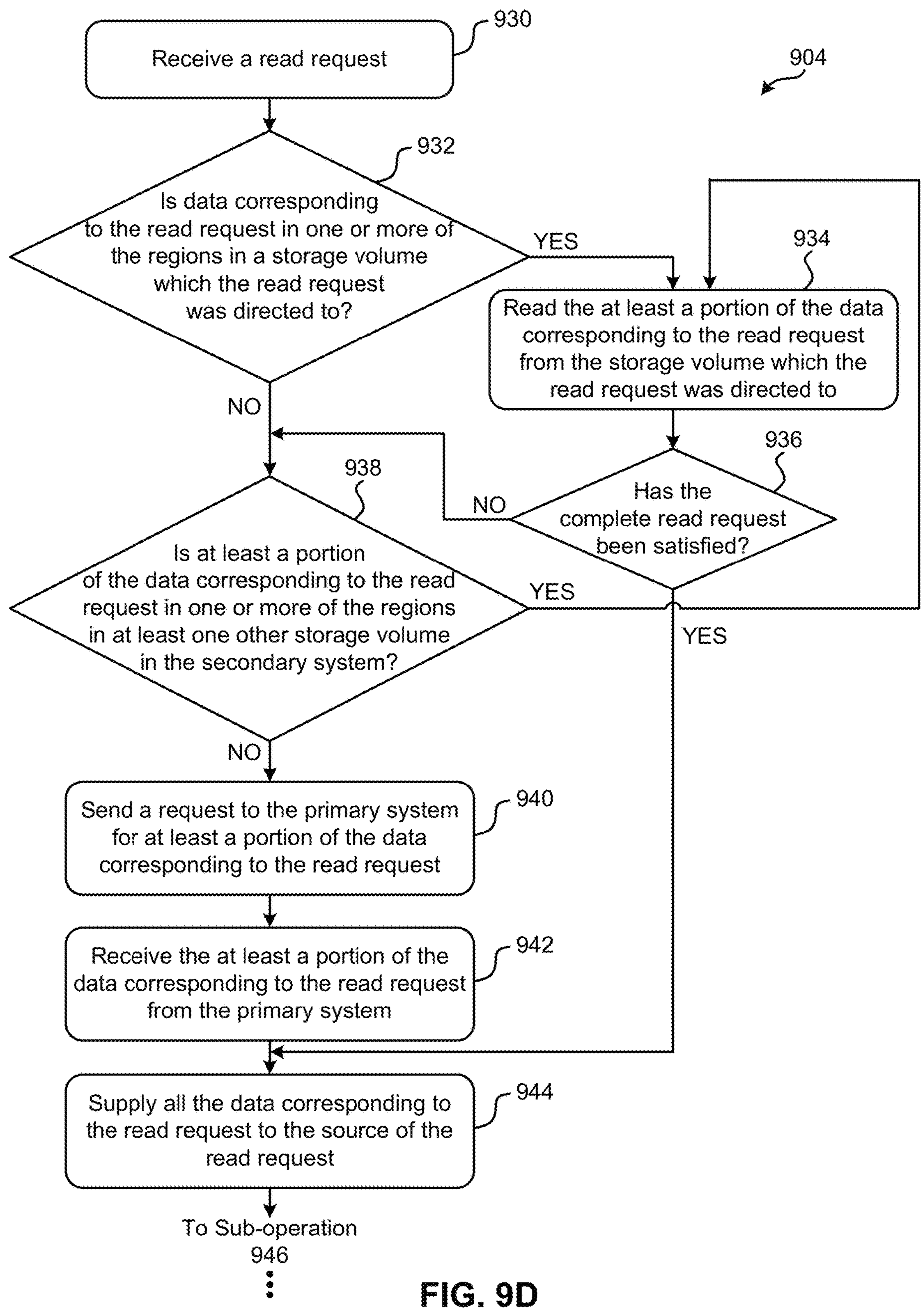
FIG. 9D is a flowchart of sub-operation which may be performed as a part of an operation included in the method of FIG. 9A, in accordance with one embodiment.
Figure 9D:
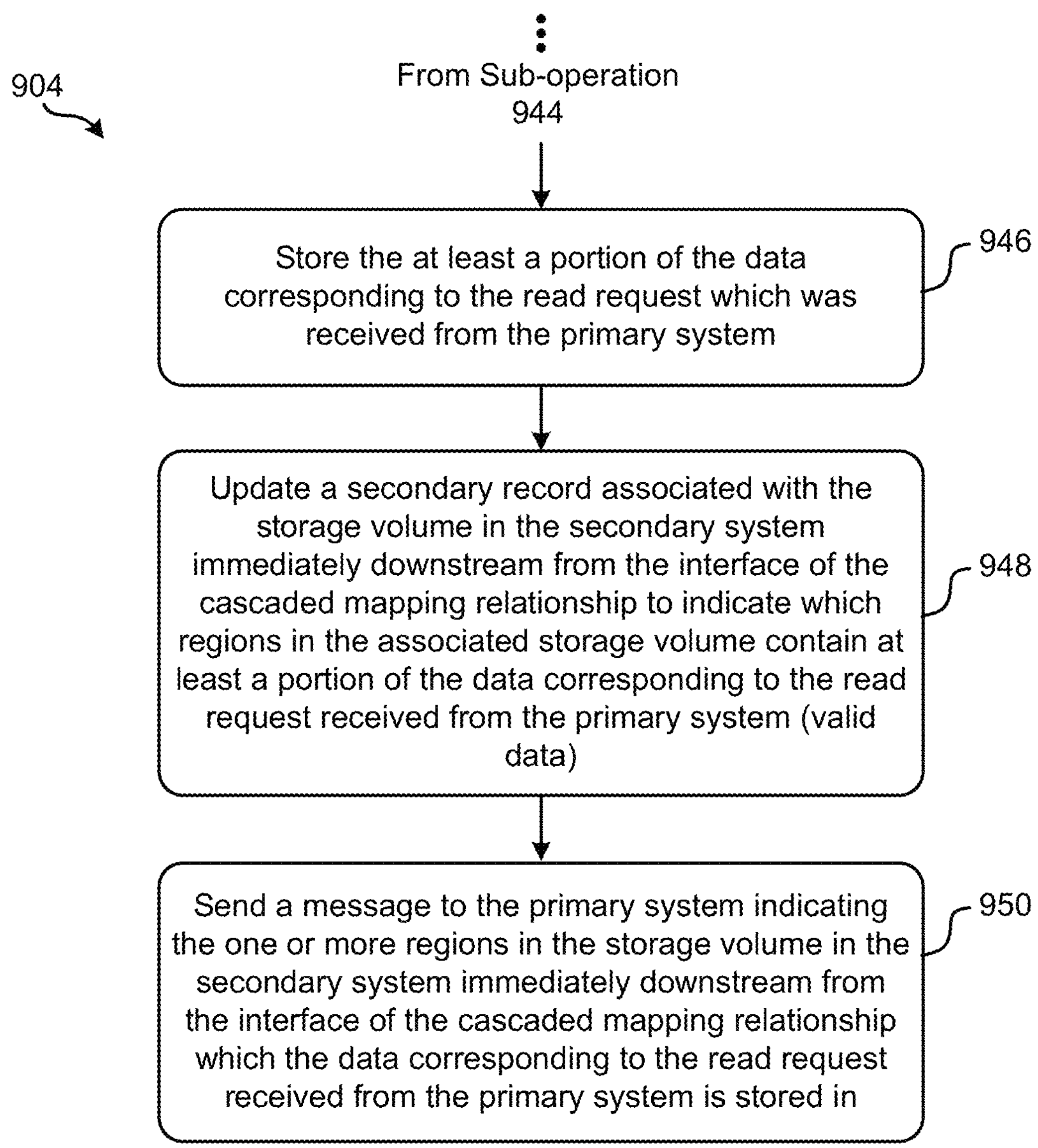

Referring now to FIG. 9D, exemplary sub-processes involved with maintaining the cascaded mapping relationship which may be implemented in response to receiving a read request are illustrated in accordance with another embodiment. It follows that any one or more of the sub-processes included in FIG. 9D may be implemented in order to perform operation 904 of FIG. 9A implemented in response to receiving a read request. However, it should be noted that the sub-operations of FIG. 9D are illustrated in accordance with one embodiment which is in no way intended to limit the invention.

As shown, FIG. 9D includes receiving a read request, e.g., from a user, a remote system, a controller coupled to a same network as the secondary system, etc. See sub-operation 930. Depending on the approach, the received read request may be directed to a particular storage volume at the secondary system. Accordingly, decision 932 includes determining whether data corresponding to the read request is in one or more of the regions in a storage volume which the read request was directed to. The determination made in decision 932 may be performed by examining the secondary record to determine whether at least a portion of the data corresponding to the received read request has been received and stored in the storage volume which the read request was directed to. For approaches in which the secondary record is a bitmap, determining the outcome of decision 932 may include examining the bitmap to determine whether one or more of the bits corresponding to the regions associated with the received read request are set indicating that there is valid data stored in the respective region(s).

The flowchart proceeds to sub-operation 934 in response to determining that at least a portion of the data corresponding to the read request is in the storage volume which the read request was directed to. There, sub-operation 934 includes reading the at least a portion of the data corresponding to the read request from the storage volume which the read request was directed to.

However, in some instances not all of the data corresponding to the read request may be stored in the secondary system. For instance, regions in the storage volume which the read request was directed to may simply contain pointers which point to a different storage volume where the data corresponding to the respective regions is actually stored. Thus, all, part, or none of the data corresponding to a received read request may actually be stored in one or more of the regions of the storage volume which the read request was directed to.

It follows that FIG. 9D includes determining whether the complete read request has been satisfied. See decision 936. As mentioned above, in some instances although it is determined that a portion of the data corresponding to the read request is stored in regions of the secondary storage volume, a remainder of the data corresponding to the read request may not be stored in the same storage volume. Accordingly, in response to determining that the complete read request has been satisfied, the flowchart may jump to operation 944, whereby the data is supplied to the source of the read request (e.g., a user).

Conversely, referring again to decision 936, the flowchart proceeds to decision 938 in response to determining that the complete read request has not yet been satisfied. There, decision 938 includes determining whether at least a portion of the data corresponding to the read request is in one or more of the regions in at least one other storage volume in the secondary system. As shown, FIG. 9D may also progress to decision 938 from decision 932 in some approaches. Returning to decision 932, the flowchart may progress to decision 938 in response to determining that the data corresponding to the read request is not in the storage volume which the read request was directed to. It follows that decision 938 may be performed in order to search for any additional data needed in order to complete the received read request.

According to an exemplary approach, decision 938 may be performed by examining the storage volumes at the secondary system upstream from the storage volume which the read request was directed to. As mentioned above, determining whether a given storage volume includes particular data may be performed by inspecting a secondary record (e.g., bitmap) associated with the given storage volume. Moreover, it is preferred that each of the storage volumes at the secondary system which are upstream from the storage volume which the read request was directed to are examined one at a time, beginning with a storage volume directly upstream from the storage volume which the read request was directed, and progressing towards the interface of the cascaded mapping relationship.

Once one or more regions of a storage volume are determined to be storing at least a portion of the data corresponding to the read request, the flowchart returns to sub-operation 934, whereby the data corresponding to the read request may be read from the storage volume in the secondary system. Thereafter, decision 936 may again determine whether the complete read request has been satisfied as described above.

However, should decision 938 determine that none of the storage volumes at the secondary system include the outstanding (unread) data corresponding to the read request, FIG. 9D proceeds to sub-operation 940. As shown sub-operation 940 includes sending a request to the primary system for at least a portion of the data corresponding to the read request. Moreover, sub-operation 942 includes receiving the at least a portion of the data corresponding to the read request from the primary system, while sub-operation 944 includes supplying all the data corresponding to the read request to the source of the read request (e.g., a user). Depending on whether the data corresponding to the read request was retrieved from one or more different storage volumes, the data may first be merged before it is supplied to the source of the read request, e.g., as would be appreciated by one skilled in the art after reading the present description.

If data was received from the primary system during the course of satisfying a received read request, it is preferred that the data received from the primary system be stored at the secondary system. By doing so, subsequently received read requests may be performed more efficiently. Accordingly, sub-operation 946 includes storing the at least a portion of the data corresponding to the read request which was received from the primary system. Although the data received from the primary system may be stored in any of the storage volumes at the secondary system, it is preferred that the data is stored in one or more regions of the storage volume in the secondary system which is immediately downstream from the interface of the cascaded mapping relationship. Thus, the storage volume immediately downstream from the interface of the cascaded mapping relationship may continue to develop a full set of data, e.g., rather than pointers to where the data is actually stored in the primary system, thereby reducing the amount of system throughput over time as data is acquired.

Furthermore, sub-operation 948 includes updating a secondary record associated with the storage volume in the secondary system immediately downstream from the interface of the cascaded mapping relationship to indicate which regions in the associated storage volume contain at least a portion of the data corresponding to the read request received from the primary system (valid data). In approaches where the secondary record is a bitmap, sub-operation 948 may be performed by setting the bits of the regions in the storage volume which the data was added to (e.g., written in).

Further still, sub-operation 950 includes sending a message to the primary system indicating the one or more regions in the storage volume in the secondary system immediately downstream from the interface of the cascaded mapping relationship which the data corresponding to the read request received from the primary system is stored in. Sending this message allows for the primary system to be informed of any updates which have occurred to the regions of the secondary storage volume and/or the secondary record associated therewith. Thus, the message sent in sub-operation 950 may effectively be for updating a primary record that indicates which portions of the point-in-time copy of the primary storage volume have been received by the secondary system. As a result, the primary record and the secondary record may maintain a matching record of which portions of the storage volume in the secondary system immediately downstream from the interface of the cascaded mapping relationship contain valid data, e.g., as will be described in further detail below. Maintaining matching (e.g., equivalent) primary and secondary records allows for the primary and secondary systems to ensure that the replication process creates a full version of the point-in-time copy in the secondary storage volume, thereby avoiding data loss, data corruption, etc.

Once sub-operation 950 has been performed, any one or more of the processes included in FIG. 9A may be repeated, e.g., depending on the approach. However, in other approaches method 900 may be ended, e.g., until a subsequent cascaded mapping relationship is established. It should also be noted that sub-operations 946, 948, 950 are performed if data was received from the primary system during the course of satisfying a received read request. It follows that sub-operations 946, 948, 950 may not be performed should all the data corresponding to the read request already be located in storage volumes at the secondary system.

Figure 9E:
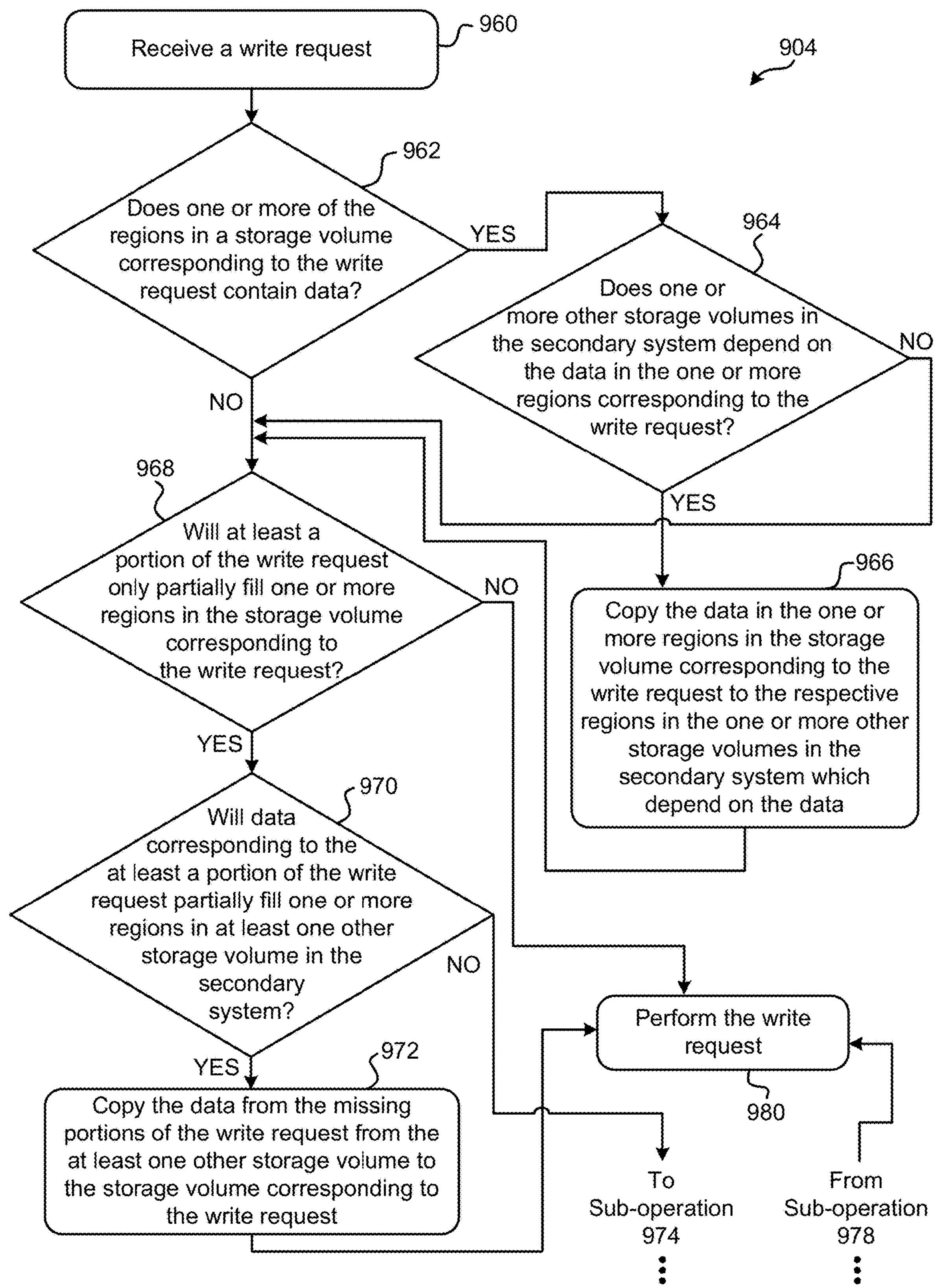
FIG. 9E is a flowchart of sub-operation which may be performed as a part of an operation included in the method of FIG. 9A, in accordance with one embodiment.
Figure 9E:
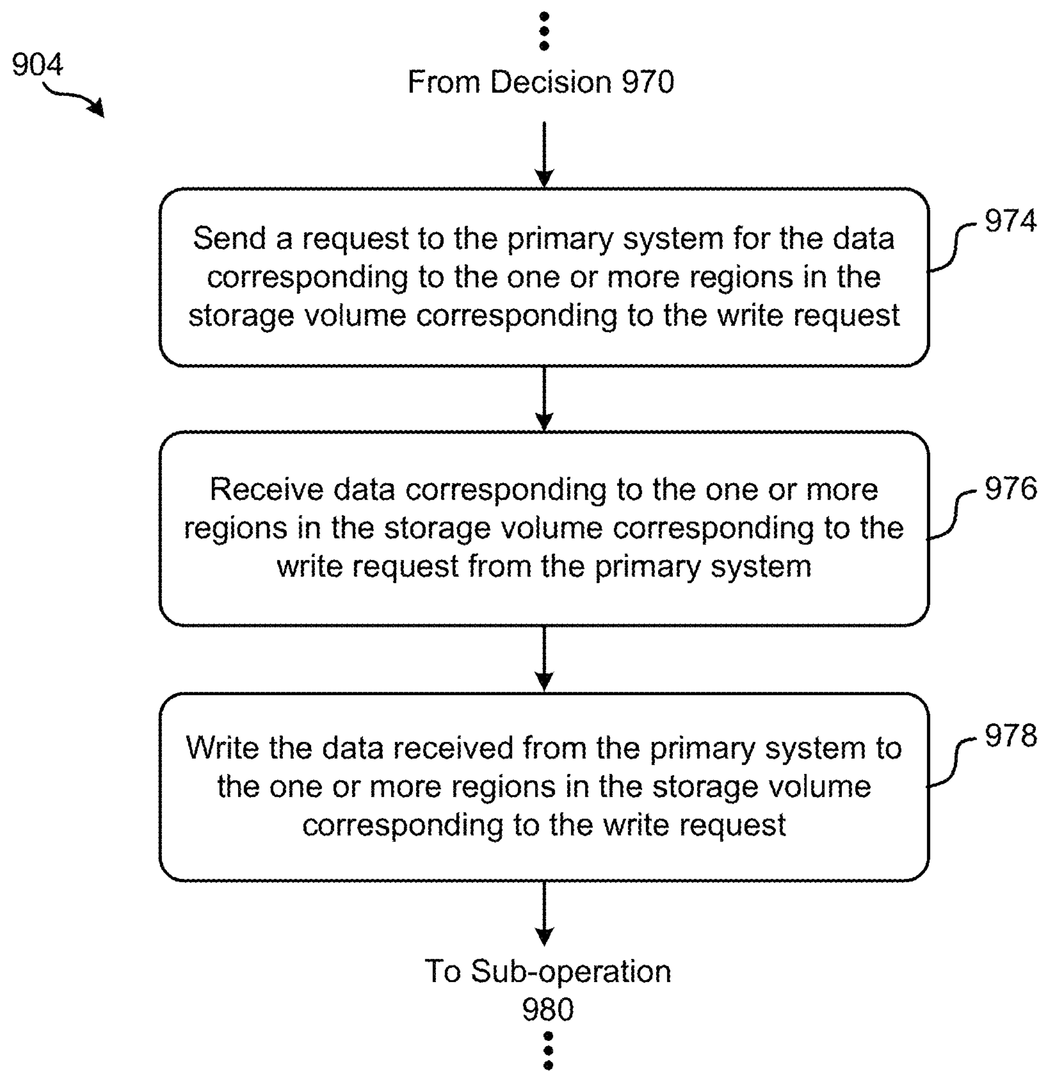

Referring now to FIG. 9E, exemplary sub-processes involved with maintaining the cascaded mapping relationship which may be implemented in response to receiving a write request are illustrated in accordance with another embodiment. It follows that any one or more of the sub-processes included in FIG. 9E may be implemented in order to perform operation 904 of FIG. 9A implemented in response to receiving a read request. However, it should be noted that the sub-operations of FIG. 9E are illustrated in accordance with one embodiment which is in no way intended to limit the invention.

As shown, FIG. 9E includes receiving a write request, e.g., from a user, a remote system, a controller coupled to a same network as the secondary system, etc. See sub-operation 960. The received write request may be directed to one or more specific regions of a particular storage volume at the secondary system. Accordingly, decision 962 includes determining whether one or more of the regions in a storage volume corresponding to the write request contain data. The determination made in decision 962 may be performed by examining the secondary record to determine whether one or more of the regions in a storage volume corresponding to the write request contain data. For approaches in which the secondary record is a bitmap, determining the outcome of decision 962 may include examining the bitmap to determine whether one or more of the bits corresponding to the regions associated with the received write request are set indicating that there is data stored in the respective region(s).

The flowchart proceeds to decision 964 in response to determining that one or more of the regions in the storage volume corresponding to the write request contain data. There, decision 964 includes determining whether one or more other storage volumes in the secondary system depend on the data in the one or more regions corresponding to the write request. As shown, FIG. 9E proceeds to decision 968 in response to determining that no other storage volumes in the secondary system depend on the data in the one or more regions corresponding to the write request. There, decision 968 includes determining whether at least a portion of the write request will only partially fill one or more regions in the storage volume corresponding to the write request, e.g., as will be described in further detail below.

However, returning to decision 964, the flowchart proceeds to sub-operation 966 in response to determining that one or more other storage volumes in the secondary system depend on the data in the one or more regions in the storage volume corresponding to the write request. There, sub-operation 966 includes copying the data in the one or more regions in the storage volume corresponding to the write request to the respective regions in the one or more other storage volumes in the secondary system which depend on the data. Accordingly, any storage volumes which depend on the data in the regions which correspond to the received write request may receive a copy of the data before it is overwritten when the write request is performed, thereby avoiding data loss while also keeping memory usage efficient.

Once the data in the one or more regions in the storage volume corresponding to the write request has been copied to the one or more other storage volumes in the secondary system which depend on the data, the flowchart may proceed to decision 968, e.g., as will be described in further detail below. Moreover, returning again to decision 962, the flowchart proceeds to decision 968 in response to determining that the one or more regions in the storage volume corresponding to the write request do not contain data. There, decision 968 includes determining whether at least a portion of the write request will only partially fill one or more regions in the storage volume corresponding to the write request. As mentioned above, the write request may correspond to one or more different regions in a storage volume. Moreover, depending on how much of the data included in one of these regions corresponds to the received write request, all or only a portion of the data included in this region may be overwritten when the write request is performed. Accordingly, in some approaches decision 968 may equivalently determine whether at least a portion of the write request will fill (e.g., completely fill) one or more regions in the storage volume corresponding to the write request. However, it should be noted that the flowchart of FIG. 9E may progress differently in such approaches. For example, the flowchart of FIG. 9E may progress to sub-operation 980 in response to determining that at least a portion of the write request will fill (e.g., completely fill) one or more regions in the storage volume corresponding to the write request, rather than in response to determining that no portions of the write request will only partially fill one or more regions in the storage volume corresponding to the write request. Therefore, one or more of the processes described in relation to FIG. 9E may be made using equivalent determinations, e.g., as would be appreciated by one skilled in the art.

Referring still to FIG. 9E, the flowchart jumps to sub-operation 980 in response to determining that none of the write request will only partially fill one or more regions in the storage volume corresponding to the write request, whereby the at least a portion of the write request is performed. However, the flowchart may proceed to decision 970 in response to determining that at least a portion of the write request will only partially fill one or more regions in the storage volume corresponding to the write request (e.g., or equivalently in response to determining that no portion of the write request will fill one or more regions in the storage volume corresponding to the write request).

There, decision 970 includes determining whether data corresponding to the at least a portion of the write request will partially fill one or more regions in at least one other storage volume in the secondary system. In other words, decision 970 may be used to determine whether data corresponding to at least a portion of the write request will partially fill regions in more than one volume in the secondary system. However, as mentioned above, in some approaches decision 970 may include determining whether data corresponding to the at least a portion of the write request will fill (e.g., completely fill) one or more regions in at least one other storage volume in the secondary system.

According to some approaches, determining whether certain data is in and/or corresponds to one or more of the regions in at least one other storage volume in the secondary system is preferably performed by examining the storage volumes at the secondary system upstream from the storage volume which the write request was directed to. As mentioned above, determining whether a given storage volume includes particular data may be performed by inspecting a secondary record (e.g., bitmap) associated with the given storage volume. Moreover, it is preferred that each of the storage volumes at the secondary system which are upstream from the storage volume which the write request was directed to are examined one at a time, beginning with a storage volume directly upstream from the storage volume which the write request was directed, and progressing towards the interface of the cascaded mapping relationship.

Once one or more regions of at least one other storage volume are determined to be storing at least a portion of the data corresponding to the write request, the flowchart proceeds to sub-operation 972, whereby the data corresponding to the one or more regions in the storage volume corresponding to the write request is copied from the at least one other storage volume in the secondary system to the one or more regions in the storage volume corresponding to the write request. In other words, the data corresponding to the at least a portion of the write request from the one or more regions in the at least one other storage volume to the storage volume corresponding to the write request is preferably copied. As previously mentioned, sub-operation 972 may be performed in response to determining that the data corresponding to the at least a portion of the write request will fill one or more regions in at least one other storage volume in the secondary system in some exemplary approaches.

Thereafter, the flowchart may proceed directly to sub-operation 980 whereby the write request may be performed. However, it should be noted that in some instances, the data corresponding to the regions which correspond to the received write request may be stored in both the secondary system and the remote primary system. Accordingly, it may be desirable to determine whether all the data corresponding to the regions which correspond to the received write request has been retrieved before jumping to sub-operation 980, whereby subsequent steps may be taken in response to determining that there is still data that has not yet been retrieved (e.g., see sub-operation 974 below).

Returning to decision 970, should it be determined that at least some of the data corresponding to the at least a portion of the write request will not partially fill one or more regions in at least one other storage volume in the secondary system, FIG. 9E proceeds to sub-operation 974. Moreover, once again it should be noted that in some approaches, FIG. 9E may equivalently proceed to sub-operation 974 in response to determining that at least some of the data corresponding to the at least a portion of the write request will fill one or more regions in at least one other storage volume in the secondary system.

As shown sub-operation 974 includes sending a request to the primary system for the data corresponding to the one or more regions in the storage volume corresponding to the write request. Moreover, sub-operation 976 includes receiving data corresponding to the one or more regions in the storage volume corresponding to the write request from the primary system, while sub-operation 978 includes writing the data received from the primary system to the one or more regions in the storage volume corresponding to the write request. Accordingly, sub-operation 978 effectively fills any outstanding regions in the storage volume corresponding to the write request with the appropriate data. Furthermore, the flowchart proceeds to operation 980, whereby the received write request may be performed.

Once sub-operation 980 has been performed, any one or more of the processes included in FIG. 9A may be repeated, e.g., depending on the approach. However, in other approaches method 900 may be ended, e.g., until a subsequent cascaded mapping relationship is established.

Figure 9F:
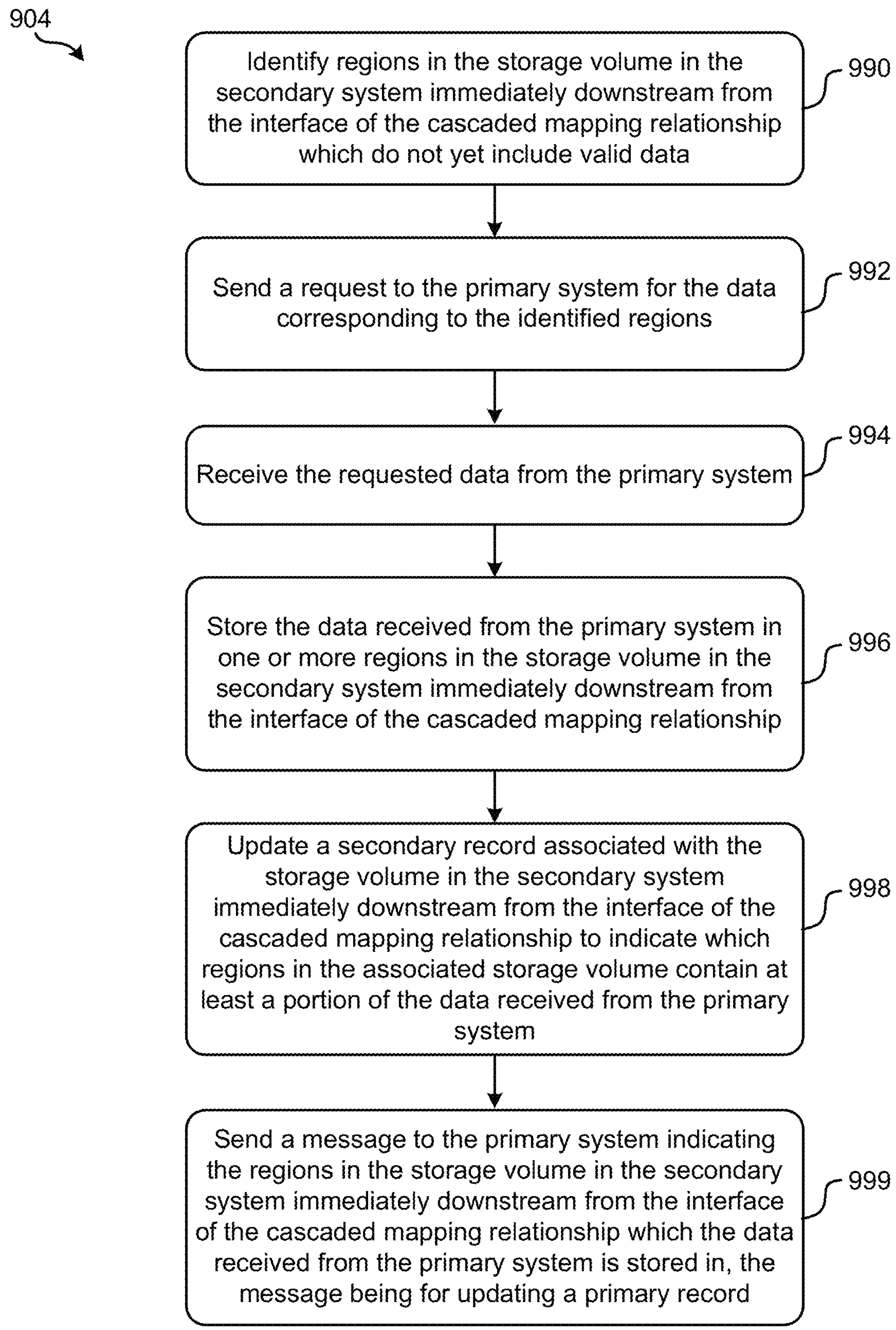
FIG. 9F is a flowchart of sub-operation which may be performed as a part of an operation included in the method of FIG. 9A, in accordance with one embodiment.

Referring now to FIG. 9F, exemplary sub-processes involved with maintaining the cascaded mapping relationship which may be implemented in response to receiving a write request are illustrated in accordance with another embodiment. It follows that any one or more of the sub-processes included in FIG. 9F may be implemented in order to perform operation 904 of FIG. 9A implemented in response to receiving a read request. However, it should be noted that the sub-operations of FIG. 9F are illustrated in accordance with one embodiment which is in no way intended to limit the invention.

As shown, FIG. 9F includes identifying regions in the storage volume in the secondary system immediately downstream from the interface of the cascaded mapping relationship which do not yet include valid data. See sub-operation 990. As previously mentioned, it is preferred that the data received from the primary system be stored at the secondary system in order to form a complete copy of data (e.g., as opposed to having pointers to storage volumes at the primary system) in at least the storage volume immediately downstream from the interface of the cascaded mapping relationship. By doing so, subsequently received read and/or write requests may be performed more efficiently by not having to request data be sent from the primary system.

Moreover, sub-operation 992 includes sending a request to the primary system for the data corresponding to the identified regions. By requesting data corresponding to the identified regions rather than waiting for the data to be requested in correspondence with an outstanding read and/or write operation, the processes included in FIG. 9F are able to reduce system latency and decrease data access times. While sub-operation 992 may be performed at any desired point in time, it may be desirable that data requests are sent to the primary system when the primary and/or secondary systems are idle (e.g., no outstanding read and/or write requests).

Furthermore, the requested data is received from the primary system (see sub-operation 994), whereby the data received from the primary system may be stored in one or more regions in the storage volume in the secondary system immediately downstream from the interface of the cascaded mapping relationship. See sub-operation 996.

The secondary record associated with the storage volume in the secondary system immediately downstream from the interface of the cascaded mapping relationship is also preferably updated to indicate which regions in the associated storage volume contain at least a portion of the data received from the primary system (valid data). See sub-operation 998. Furthermore, sub-operation 999 includes sending a message to the primary system indicating the one or more regions in the storage volume in the secondary system immediately downstream from the interface of the cascaded mapping relationship which the data received from the primary system is stored in. As previously mentioned, the message sent to the primary system may be for updating a primary record which indicates which regions in the storage volume in the secondary system immediately downstream from the interface of the cascaded mapping relationship contain valid data.

Once sub-operation 999 has been performed, any one or more of the processes included in FIG. 9A may be repeated, e.g., depending on the approach. However, in other approaches method 900 may be ended, e.g., until a subsequent cascaded mapping relationship is established.

However, should any of the storage volumes in the secondary system go offline (e.g., due to a storage failure, an out-of-space condition, etc.) while the cascaded mapping relationship exists between the secondary system and remote primary system, it is preferred that appropriate action is taken to avoid data corruption and replication failure.

Figure 10:
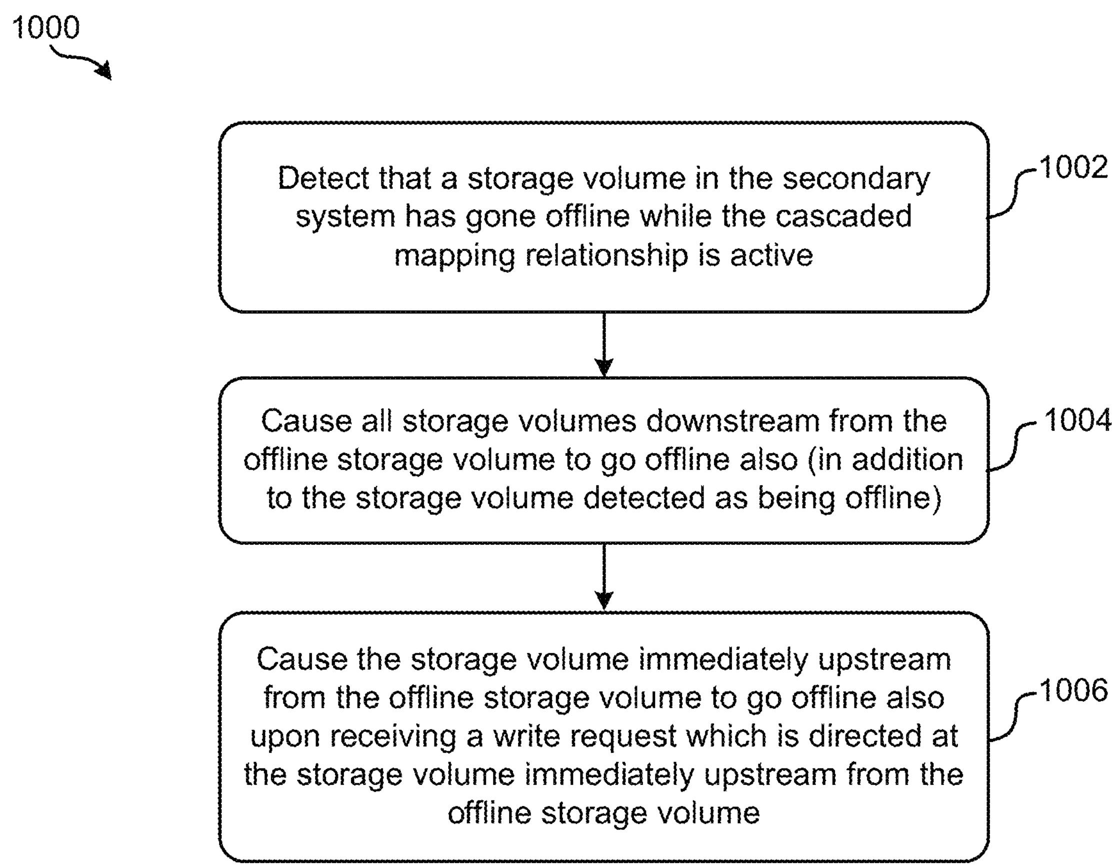
FIG. 10 is a flowchart of a method in accordance with one embodiment.

Accordingly, looking to FIG. 10, an exemplary method 1000 for handling a storage volume failure at the secondary system is illustrated according to one embodiment, which is in no way intended to limit the invention. The method 1000 may be performed in accordance with the present invention in any of the environments depicted in FIGS. 1-4 and 9A-9E, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, operation 1002 includes detecting that a storage volume in the secondary system has gone offline while the cascaded mapping relationship is active (e.g., in place). According to various approaches, the detection in operation 1002 may be made in response to receiving a notification from a user at the secondary system that the storage volume has gone offline, in response to not receiving a status report from a controller coupled to the storage volume once a predetermined amount of time has passed since a last status report, upon experiencing a system timeout, etc.

Upon detecting that the storage volume has gone offline, method 1000 includes causing all storage volumes downstream from the offline storage volume to go offline also (in addition to the storage volume detected as being offline). See operation 1004. Causing all storage volumes downstream from the offline storage volume to go offline is desirable because they will be unable to satisfy some I/Os in view of the fact that they logically depend on the storage volume originally determined as being offline.

However, storage volumes upstream from the storage volume originally determined to be offline in the cascaded mapping relationship may be unaffected in terms of performing read requests that are received. However, write requests directed to the storage volume immediately upstream from the offline storage volume may cause issues by potentially corrupting data on the offline storage volume (as some of the data in the offline storage volume will no longer exist). Accordingly, operation 1006 includes causing the storage volume immediately upstream from the offline storage volume to go offline also upon receiving a write request which is directed at the storage volume immediately upstream from the offline storage volume. Moreover, similar steps may be taken regarding the storage volumes at the primary system, e.g., as described below.

Alternatively, write requests directed to the storage volume immediately upstream from the offline storage volume may simply be postponed, e.g., until the offline storage volume has been brought back online (repaired). The write requests which are postponed may be stored in memory, e.g., such that they may be performed once the storage volume is brought back online. However, still other approaches the write requests received while the storage volume is offline may simply be rejected (e.g., failed). However, once the storage volume is brought back online to a normal mode of operation, the storage volumes downstream and/or the storage volume immediately upstream from the previously offline storage volume may also be brought back online as well. Moreover, any postponed read and/or write requests may be performed prior to returning to a normal mode of operation.

Although the approaches included above in reference to method 900 were described from the secondary (e.g., DR) storage system's point of view, similar processes may be performed at the primary system in order to achieve these improvements as well. Accordingly, looking to FIG. 11A, a method 1100 for creating more than one copy of a data storage volume on a remote system is shown from a primary system's point of view according to one embodiment. Accordingly, one or more of the processes included in method 1100 may include various ones of the approaches described above with reference to FIG. 9A.

The method 1100 may be performed in accordance with the present invention in any of the environments depicted in FIGS. 1-4 and 9A-10, among others, in various embodiments. Of course, more or less operations than those specifically described in FIG. 11A may be included in method 1100, as would be understood by one of skill in the art upon reading the present descriptions.

Moreover, each of the steps of the method 1100 may be performed by any suitable component of the operating environment. For example, in various embodiments, the method 1100 may be partially or entirely performed by a controller (e.g., see 430, 432 of FIG. 4), a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

Figure 11A:
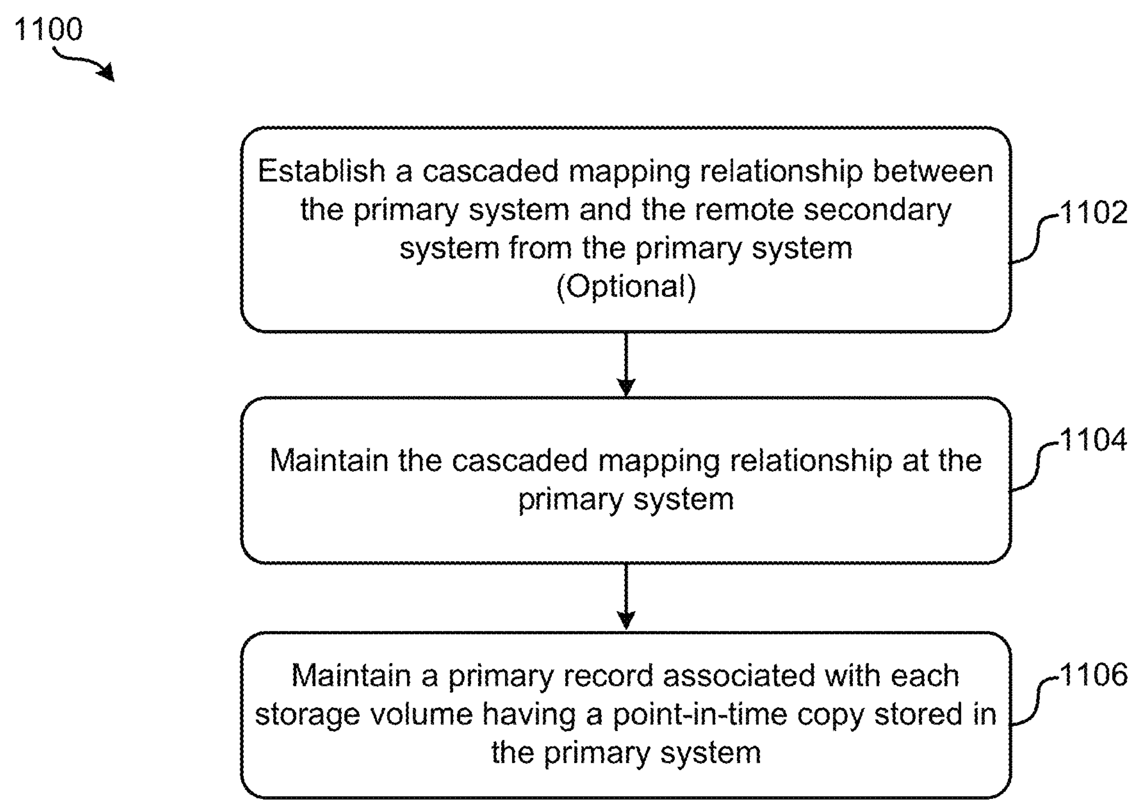
FIG. 11A is a flowchart of a method in accordance with one embodiment.

As shown in FIG. 11A, optional operation 1102 of method 1100 includes establishing a cascaded mapping relationship between the primary system and the remote secondary system from the primary system. As mentioned above, operation 1102 is presented as being an "optional" operation in the present embodiment, because the cascaded mapping relationship may need not be established each time method 1100 is performed. For instance, the cascaded mapping relationship may have already been established, e.g., in a previous iteration. Moreover, any of the approaches described above with respect to operation 1102 may be implemented in order to establish cascaded mapping relationship between the primary system and the remote secondary system from the primary system, e.g., as would be appreciated by one skilled in the art after reading the present description.

Moreover, operation 1104 of method 1100 includes maintaining the cascaded mapping relationship at the primary system. Although a cascaded mapping relationship itself may already be established between the primary system and the remote secondary system, the manner in which the cascaded mapping relationship is actually managed (e.g., implemented during use) may include various different sub-processes depending on the situation, e.g., as will soon become apparent.

Furthermore, operation 1106 further includes maintaining a primary record associated with each storage volume having a point-in-time copy stored in the primary system. As mentioned above, each primary record indicates which regions in a storage volume corresponding to the respective point-in-time copy contain valid data. In preferred approaches the primary records include (e.g., at least some are) bitmaps, where each bit in a given bitmap preferably corresponds to a given region of the storage volume in which the respective point-in-time copy is stored, e.g., according to any of the approaches introduced herein. For instance, a clustered system may be implemented whereby each of the bitmaps may be stored on two or more nodes in the clustered system, e.g., as described in further detail above. However, it should again be noted that any one or more of the primary records associated with the point-in-time copies stored in the primary system may have a different form depending on the desired embodiment. For instance, it should be noted that a primary record is preferably not maintained for a storage volume at the head of the cascaded mapping relationship (the source volume).

Figure 11B:
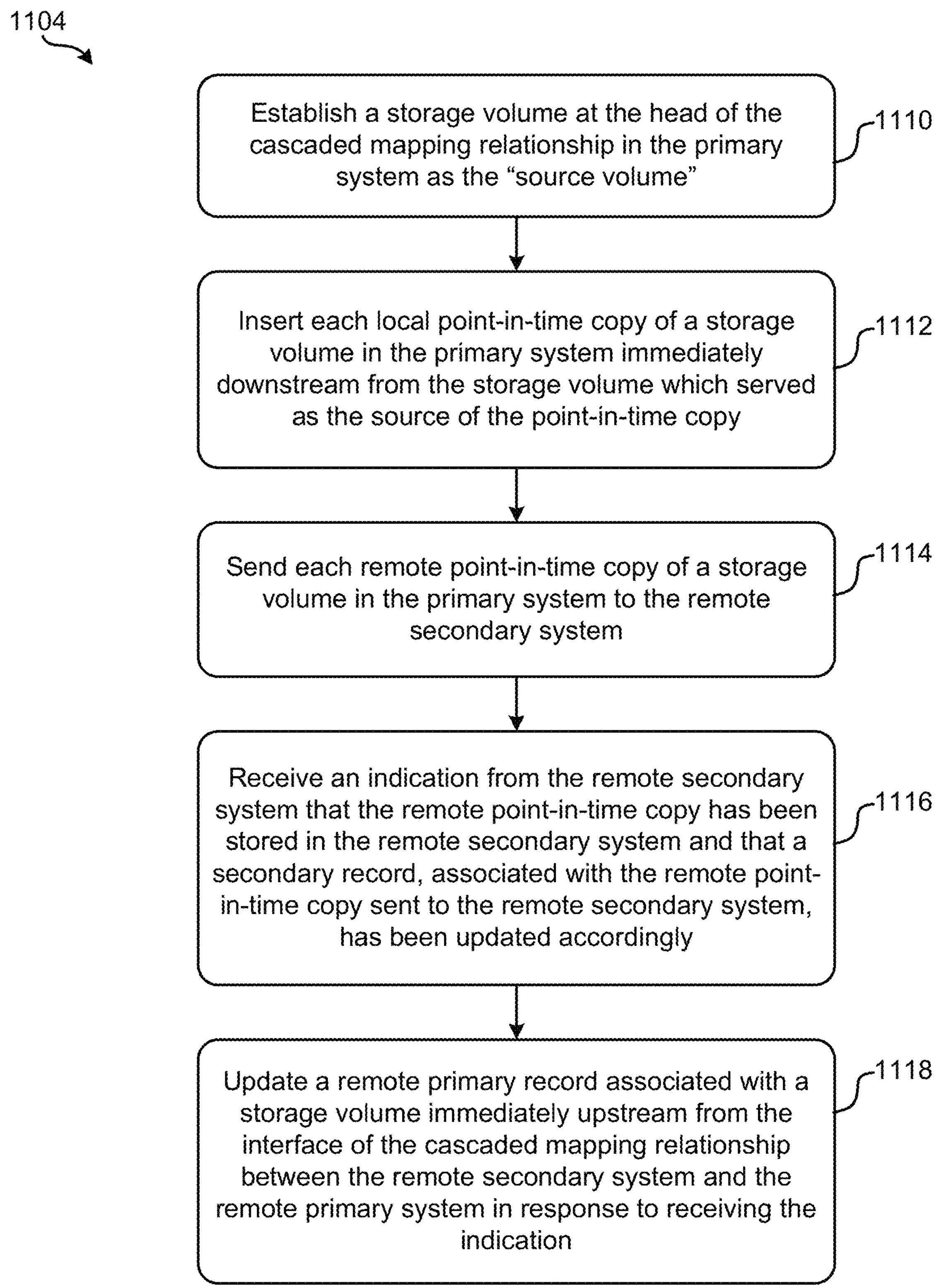
FIG. 11B is a flowchart of sub-operation which may be performed as a part of an operation included in the method of FIG. 11A, in accordance with one embodiment.
Figure 11C:
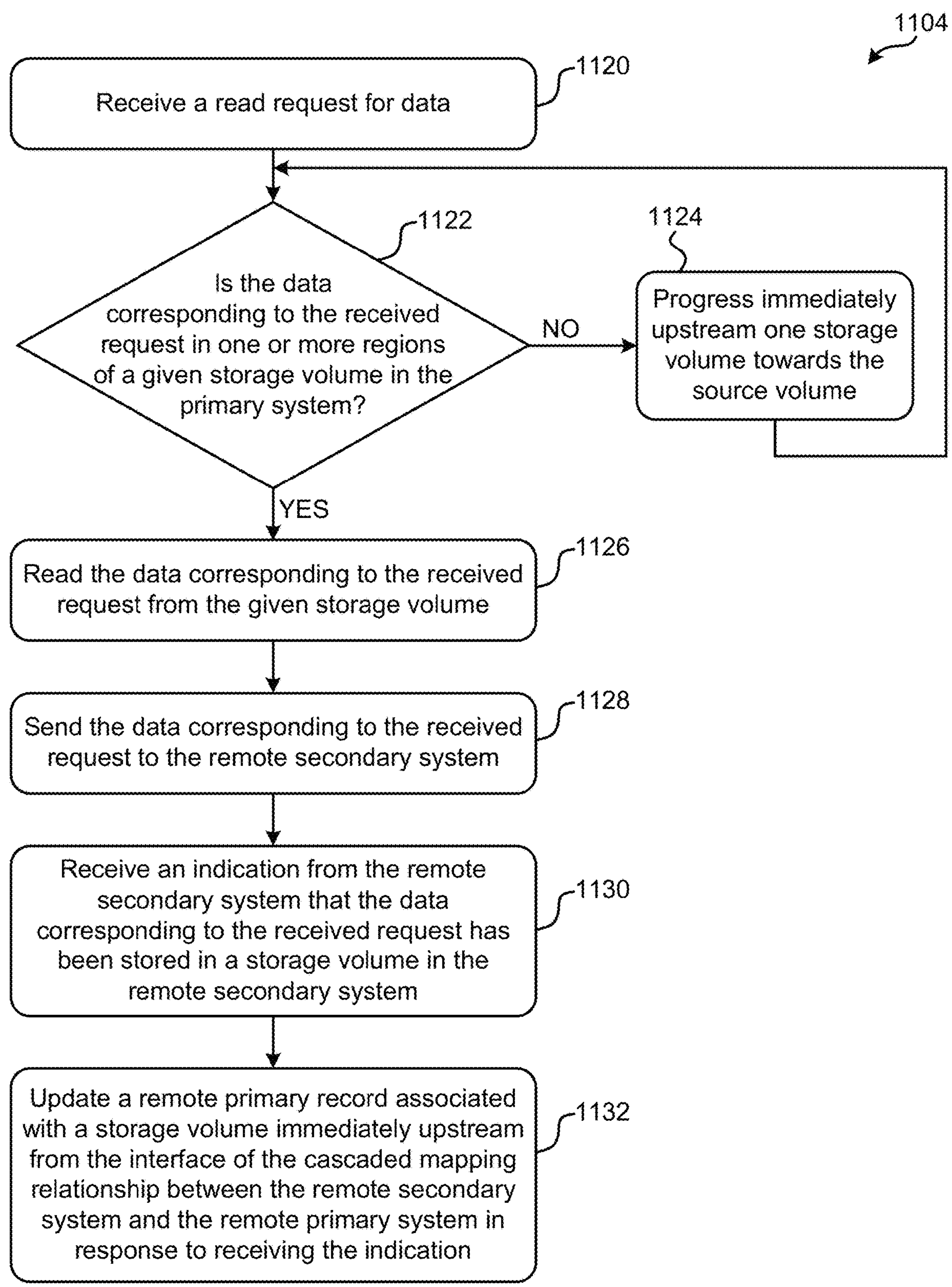
FIG. 11C is a flowchart of sub-operation which may be performed as a part of an operation included in the method of FIG. 11A, in accordance with one embodiment.
Figure 11D:
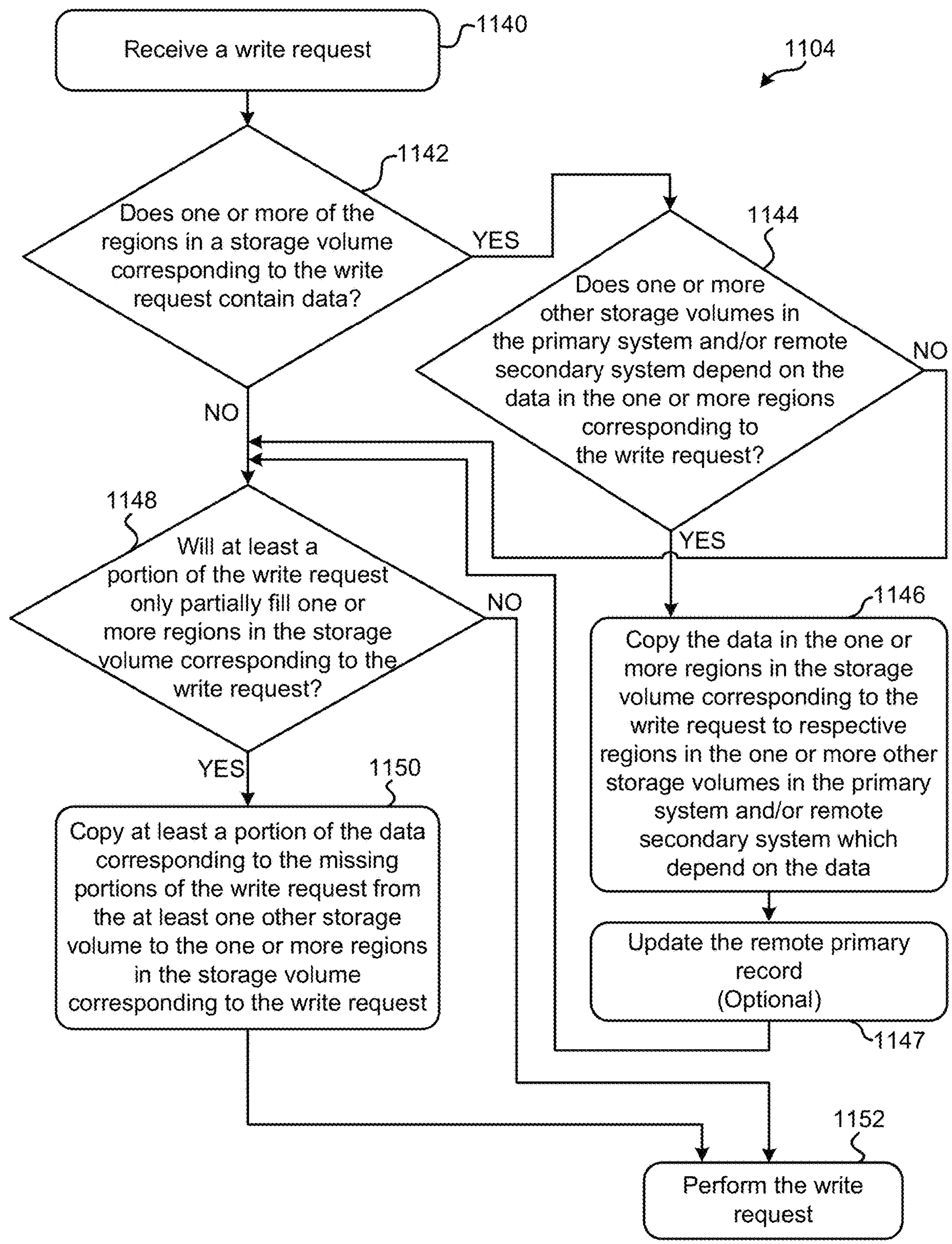
FIG. 11D is a flowchart of sub-operation which may be performed as a part of an operation included in the method of FIG. 11A, in accordance with one embodiment.

As mentioned above, sub-processes involved with maintaining the cascaded mapping relationship at the primary system as seen in operation 1104 may vary depending on the particular situation. Accordingly, FIGS. 11B-11D depict sub-processes which may be implemented in order to maintain the cascaded mapping relationship at a primary system in response to experiencing different conditions. For example, which is in no way intended to limit the invention, FIG. 11B includes exemplary sub-processes involved with maintaining the cascaded mapping relationship which may be implemented in association with sending a point-in-time copy from the primary system to the remote secondary system. It follows that any one or more of the sub-processes included in FIG. 11B may be implemented in order to perform operation 1104 of FIG. 11A. However, it should be noted that the sub-operations of FIG. 11B are illustrated in accordance with one embodiment which is in no way intended to limit the invention.

Referring now to FIG. 11B, sub-operation 1110 includes establishing (e.g., storing) a storage volume at the head of the cascaded mapping relationship in the primary system as the "source volume." As mentioned above, the source volume may not have a primary record associated therewith, e.g., because the source volume may not depend on (have pointers to) the data stored in any other storage volumes.

Moreover, sub-operation 1112 includes inserting each local point-in-time copy of a storage volume in the primary system immediately downstream from the storage volume which served as the source of the point-in-time copy. However, each remote point-in-time copy of a storage volume in the primary system is sent to the remote secondary system. See sub-operation 1114. Again, remote point-in-time copies sent to the remote secondary system are preferably placed in a storage volume and inserted immediately downstream from the interface of the cascaded mapping relationship between the primary system and the remote secondary system.

With continued reference to FIG. 11B, sub-operation 1116 includes receiving an indication from the remote secondary system that the remote point-in-time copy has been stored in a storage volume immediately downstream from the interface of the cascaded mapping relationship between the remote secondary system and the remote primary system in the remote secondary system. Moreover, the indication received in sub-operation 1116 also preferably specifies that a secondary record, associated with the remote point-in-time copy sent to the remote secondary system, has been updated accordingly. However, in some approaches two separate indications may be received, one of which indicates the remote point-in-time copy has been stored, and the other of which indicates a corresponding secondary record has been updated.

Furthermore, sub-operation 1118 includes updating a remote primary record associated with a storage volume immediately upstream from the interface of the cascaded mapping relationship between the remote secondary system and the remote primary system in response to receiving the indication in sub-operation 1116. The remote primary record preferably indicates which regions in a storage volume in the remote secondary system immediately downstream from the interface of the cascaded mapping relationship between the remote secondary system and the remote primary system contain valid data. In other words, the remote primary record may be used to keep track of which regions in the storage volume in the remote secondary system immediately downstream from the interface of the cascaded mapping relationship no longer have pointers to data stored in regions of other storage volumes. Moreover, the storage volume immediately upstream from the interface of the cascaded mapping relationship may have an additional primary record associated therewith, where the additional primary record indicates which regions of the associated storage volume contain valid data. Thus, in some approaches the storage volume immediately upstream from the interface of the cascaded mapping relationship may have a first bitmap, each bit of which indicates whether a respective region of the storage volume contains valid data, as well as a second bitmap, each bit of which indicates whether a respective region of the storage volume immediately downstream from the interface of the cascaded mapping relationship contains valid data, e.g., as will be described in further detail below with reference to FIGS. 13A-13F.

Once sub-operation 1118 has been performed, any one or more of the processes included in FIG. 11A may be repeated, e.g., depending on the approach. However, in other approaches method 1100 may be ended, e.g., until a subsequent cascaded mapping relationship is established.

Referring now to FIG. 11C, exemplary sub-processes involved with maintaining the cascaded mapping relationship which may be implemented in response to receiving a read request are illustrated in accordance with another embodiment. It follows that any one or more of the sub-processes included in FIG. 11C may be implemented in order to perform operation 1104 of FIG. 11A implemented in response to receiving a read request. However, it should be noted that the sub-operations of FIG. 11C are illustrated in accordance with one embodiment which is in no way intended to limit the invention.

As shown, FIG. 11C includes receiving a read request for data. See sub-operation 1120. In some approaches, the read request in sub-operation 1120 may be received from the remote secondary system. For example, the remote secondary system may receive a read request for data which is not actually stored in any of the storage volumes at the remote secondary system. Accordingly, the remote secondary system may send a request to the primary system for the data corresponding to the read request received at the remote secondary system. According to other approaches, the read request in sub-operation 1120 may be received directly from a user, a controller coupled to a same network as the remote secondary system, an administrator, etc.

Once the read request has been received by the primary system (e.g., by a controller coupled thereto), the data corresponding to the request may be located and read from the respective storage volume in which it is stored. As shown in FIG. 11C, decision 1122 determines whether the data corresponding to the received request is in one or more regions of a given storage volume in the primary system. It is preferred that decision 1122 initially evaluates a storage volume immediately upstream from the interface of the interface of the cascaded mapping relationship to determine whether the data corresponding to the received request is included therein.

In response to determining that the given storage volume does not include the data corresponding to the read request, the flowchart proceeds to sub-operation 1124 as shown. There, sub-operation 1124 includes progressing immediately upstream one storage volume towards the source volume, after which decision 1122 may be performed again for the next storage volume. It follows that decision 1122 and sub-operation 1124 may be repeated until a storage volume containing the requested data is located (e.g., identified), thereby effectively forming an iterative process.

Returning to decision 1122, once it is determined that a presently examined storage volume contains the data corresponding to the read request, the flowchart proceeds to sub-operation 1126. There, sub-operation 1126 includes reading the data corresponding to the received request from the given storage volume. Moreover, sub-operation 1128 includes sending the data corresponding to the received request to the remote secondary system (e.g., where the read request was received from).

With continued reference to FIG. 11C, sub-operation 1130 includes receiving an indication from the remote secondary system that the data corresponding to the received request has been stored in a storage volume in the remote secondary system. It is preferred that the data is stored in a storage volume immediately downstream from the interface of the cascaded mapping relationship between the remote secondary system and the remote primary system in the remote secondary system. Moreover, the indication received in sub-operation 1130 also preferably specifies that a secondary record, associated with the storage volume in which the data corresponding to the received request has been stored, has been updated accordingly. However, in some approaches two separate indications may be received, one of which indicates the data corresponding to the read request has been stored, and the other of which indicates a corresponding secondary record has been updated.

Furthermore, sub-operation 1132 includes updating a remote primary record associated with a storage volume immediately upstream from the interface of the cascaded mapping relationship between the remote secondary system and the remote primary system in response to receiving the indication in sub-operation 1130. As mentioned above, the remote primary record preferably indicates which regions in a storage volume in the remote secondary system immediately downstream from the interface of the cascaded mapping relationship between the remote secondary system and the remote primary system contain valid data. In other words, the remote primary record may be used to keep track of which regions in the storage volume in the remote secondary system immediately downstream from the interface of the cascaded mapping relationship no longer have pointers to data stored in regions of other storage volumes. Moreover, the storage volume immediately upstream from the interface of the cascaded mapping relationship may have an additional primary record associated therewith, where the additional primary record indicates which regions of the associated storage volume contain valid data, e.g., as will be described in further detail below with reference to 13A-13F.

Once sub-operation 1132 has been performed, any one or more of the processes included in FIG. 11A may be repeated, e.g., depending on the approach. However, in other approaches method 1100 may be ended, e.g., until a subsequent cascaded mapping relationship is established.

Referring now to FIG. 11D, exemplary sub-processes involved with maintaining the cascaded mapping relationship which may be implemented in response to receiving a write request are illustrated in accordance with another embodiment. It follows that any one or more of the sub-processes included in FIG. 11D may be implemented in order to perform operation 1104 of FIG. 11A implemented in response to receiving a write request. However, it should be noted that the sub-operations of FIG. 11D are illustrated in accordance with one embodiment which is in no way intended to limit the invention.

As shown, FIG. 11D includes receiving a write request at the primary system, e.g., from a user, a remote system, a controller coupled to a same network as the secondary system, etc. See sub-operation 1140. The received write request may be directed to one or more specific regions of a particular storage volume at the primary system. Accordingly, decision 1142 includes determining whether one or more of the regions in a storage volume corresponding to the write request contain data. The determination made in decision 1142 may be performed by examining the primary record associated therewith to determine whether one or more of the regions in the storage volume corresponding to the write request contain data. For approaches in which the primary record is a bitmap, determining the outcome of decision 1142 may include examining the bitmap to determine whether one or more of the bits corresponding to the regions associated with the received write request are set indicating that there is data stored in the respective region(s).

The flowchart proceeds to decision 1144 in response to determining that the one or more regions in the storage volume corresponding to the write request contain data. There, decision 1144 includes determining whether one or more other storage volumes in the primary system and/or remote secondary system depend on the data in the one or more regions corresponding to the write request. As shown, FIG. 11D proceeds to decision 1148 in response to determining that no other storage volumes in the primary system and/or remote secondary system depend on the data in the one or more regions corresponding to the write request. There, decision 1148 includes determining whether at least a portion of the write request will only partially fill one or more regions in the storage volume corresponding to the write request, e.g., as will be further described below.

However, returning to decision 1144, the flowchart proceeds to sub-operation 1146 in response to determining that one or more other storage volumes in the primary system and/or remote secondary system depend on the data in the one or more regions in the storage volume corresponding to the write request. There, sub-operation 1146 includes copying the data in the one or more regions in the storage volume corresponding to the write request to respective regions in the one or more other storage volumes in the primary system and/or remote secondary system which depend on the data. Accordingly, any storage volumes which depend on the data in the regions which correspond to the received write request may receive a copy of the data before it is overwritten when the write request is performed, thereby avoiding data loss while also keeping memory usage efficient.

Once the data in the one or more regions in the storage volume corresponding to the write request has been copied to the one or more other storage volumes in the primary system and/or remote secondary system which depend on the data, the flowchart may proceed to optional sub-operation 1147. Optional sub-operation 1147 includes updating a remote primary record associated with a storage volume immediately upstream from the interface of the cascaded mapping relationship between the remote secondary system and the remote primary system. As mentioned above, the remote primary record preferably indicates which regions in a storage volume in the remote secondary system immediately downstream from the interface of the cascaded mapping relationship between the remote secondary system and the remote primary system contain valid data. In other words, the remote primary record may be used to keep track of which regions in the storage volume in the remote secondary system immediately downstream from the interface of the cascaded mapping relationship no longer have pointers to data stored in regions of other storage volumes. Accordingly, sub-operation 1147 is denoted as being optional as in some approaches it may be unnecessary to update the remote primary record. For example, the write request may not correspond to regions in the storage volume in the remote secondary system immediately downstream from the interface of the cascaded mapping relationship.

Following optional sub-operation 1147, the flowchart proceeds to decision 1148. Similarly, returning again to decision 1142, the flowchart may proceed to decision 1148 in response to determining that the one or more regions in the storage volume corresponding to the write request do not contain data. As shown, decision 1148 includes determining whether at least a portion of the write request will only partially fill one or more regions in the storage volume corresponding to the write request. As mentioned above, the write request may correspond to one or more different regions in a storage volume. Moreover, depending on how much of the data included in one of these regions corresponds to the received write request, all or only a portion of the data included in this region may be overwritten when the write request is performed. Accordingly, as previously mentioned, in some approaches decision 1148 may equivalently include determining whether at least a portion of the write request will fill (e.g., completely fill) one or more regions in the storage volume corresponding to the write request. However, it should be noted that the flowchart of FIG. 11D may progress differently in such approaches. For example, the flowchart of FIG. 11D may progress to sub-operation 1152 in response to determining that at least a portion of the write request will fill (e.g., completely fill) one or more regions in the storage volume corresponding to the write request, rather than in response to determining that no portions of the write request will only partially fill one or more regions in the storage volume corresponding to the write request. Therefore, one or more of the processes described in relation to FIG. 11D may be made using equivalent determinations, e.g., as would be appreciated by one skilled in the art.

As mentioned above, FIG. 11D jumps to sub-operation 1152 in response to determining that none of the write request will only partially fill the one or more regions in the storage volume corresponding to the write request, whereby the at least a portion of the write request is performed. However, the flowchart may proceed to sub-operation 1150 in response to determining that at least a portion of the write request will only partially fill one or more regions in the storage volume corresponding to the write request. There sub-operation 1150 includes copying at least a portion of the data corresponding to the missing portions of the write request from the at least one other storage volume (e.g., which may be in the primary system) to the one or more regions in the storage volume corresponding to the write request. In other words, sub-operation 1150 may include copying the data corresponding to the one or more regions in the storage volume corresponding to the write request from the at least one other storage volume in the primary system to the one or more regions in the storage volume corresponding to the write request.

Thereafter, the flowchart proceeds to sub-operation 1152 which includes performing the write request. Once sub-operation 1152 has been performed, any one or more of the processes included in FIG. 11A may be repeated, e.g., depending on the approach. However, in other approaches method 1100 may be ended, e.g., until a subsequent cascaded mapping relationship is established.

As mentioned above, it is preferred that all storage volumes downstream from a storage volume which goes offline are taken offline as well (e.g., artificially). In other words, it is preferred that upon detecting that a given storage volume at the primary system goes offline as a result of storage failure, an out-of-space condition, etc., it is preferred that all storage volumes downstream from the offline storage volume are taken offline as well in order to avoid data corruption, waste of system resources, additional failure conditions, etc. It should be noted that this extends to all storage volumes at the remote secondary system as well. According to an exemplary embodiment, any of the processes included in method 1000 as presented above may be implemented once a storage volume at the primary system is determined as being offline for whatever reason.

It has also been previously mentioned that the storage volume immediately downstream from the interface of the cascaded mapping relationship preferably includes only valid data rather than pointers to locations where the data is stored. Thus, the storage volume immediately downstream from the interface of the cascaded mapping relationship may continue to develop a full set of data, e.g., rather than pointers to where the data is actually stored in the primary system, thereby reducing the amount of system throughput over time as data is acquired.

Figure 12:
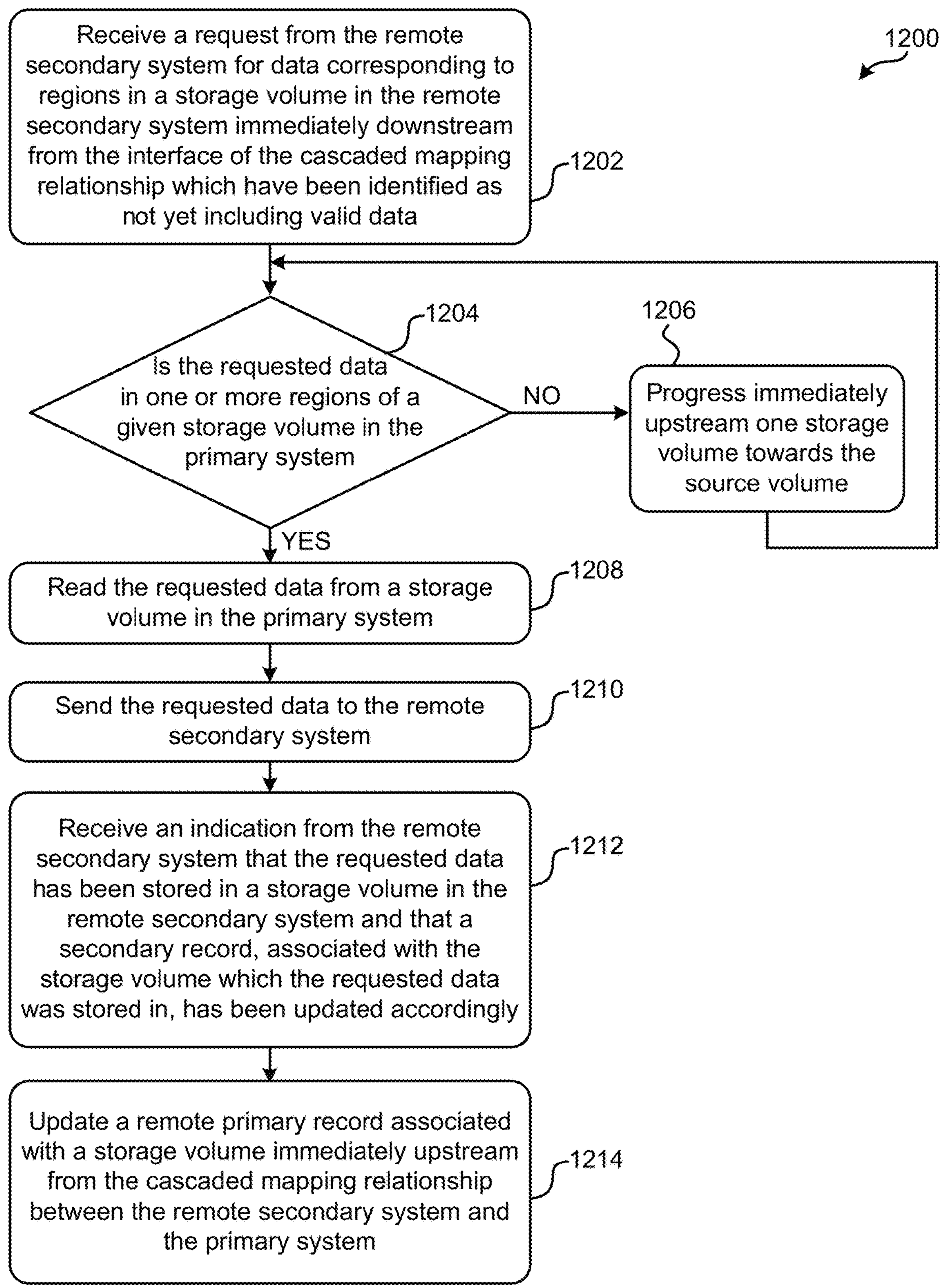
FIG. 12 is a flowchart of a method in accordance with one embodiment.

In order to develop a storage volume which includes only valid data, any one of the processes included in FIG. 12 may be implemented. It follows that FIG. 12 includes a method 1200 in accordance with one embodiment. The method 1200 may be performed in accordance with the present invention in any of the environments depicted in FIGS. 1-11D, among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 12, operation 1202 of method 1200 includes receiving a request from the remote secondary system for data corresponding to regions in a storage volume in the remote secondary system immediately downstream from the interface of the cascaded mapping relationship which have been identified as not yet including valid data.

In response to receiving the request in operation 1202, method 1200 proceeds to decision 1204 which includes determining whether the requested data is in one or more regions of a given storage volume in the primary system. As previously mentioned, it is preferred that decision 1204 is first performed with respect to the storage volume immediately upstream from the interface of the cascaded mapping relationship. Moreover, in response to determining that the requested data is not in any of the regions of the given storage volume, method 1200 proceeds to operation 1206 which includes progressing immediately upstream one storage volume towards the source volume. After operation 1206 has been performed, method 1200 returns to decision 1204 which is repeated. It follows that decision 1204 and operation 1206 may be repeated until a storage volume containing the requested data is located (e.g., identified), thereby effectively forming an iterative process.

Returning to decision 1204, once it is determined that a presently examined storage volume contains the data corresponding to the request received in operation 1202, method 1200 proceeds to operation 1208. There, operation 1208 includes reading the requested data from a storage volume in the primary system. Furthermore, operation 1210 includes sending the requested data to the remote secondary system, e.g., via a network connection.

With continued reference to FIG. 12, method 1200 additionally includes receiving an indication from the remote secondary system that the requested data has been stored in the storage volume in the remote secondary system. See operation 1212. Again, it is preferred that the requested data is stored in a storage volume in the remote secondary system immediately downstream from the interface of the cascaded mapping relationship, but in no way required. Moreover, the indication received in operation 1212 also preferably indicates that a secondary record, associated with the storage volume in the remote secondary system which the requested data was stored in, has been updated accordingly. Once the indication in operation 1212 has been received, method 1200 further includes updating a remote primary record associated with a storage volume immediately upstream from the cascaded mapping relationship between the remote secondary system and the primary system. See operation 1214.

Various approaches described herein are able to achieve multiple point-in-time copies of a given volume on a remote storage system using a cascaded relationship. Each of the point-in-time copies may be taken at a different point in time, and each of the point-in-time copies are preferably instantly available as described above. Moreover, these achievements are made without using any additional space on the local storage system for the additional remote copies. Further still, I/O operations may be performed without any added time and/or bandwidth consumption. It follows that various ones of the approaches included herein are able to achieve significant improvements over conventional products.

Different detailed examples, which are in no way intended to limit the invention, are described below. It should be noted that any of the following detailed examples may be implemented with any of the approaches described above, e.g., depending on the desired embodiment, as would be appreciated by one skilled in the art after reading the present description.

It should be noted that the detailed examples to follow preferably adhere to a few standards, one of which includes that the source volume at the primary system is established at a head of the cascaded mapping relationship. Moreover, it is also preferred that a local point-in-time copy of a given volume are inserted into the cascaded mapping relationship immediately downstream from the volume when stored at a same system as the volume. Furthermore, in the case where a local point-in-time copy is created at the secondary system and there are no other point-in-time copies formed at the secondary system yet, it is preferred that the local point-in-time copy is inserted at the tail (farthest downstream) of the cascaded mapping relationship. This desirably ensures that copies on a system are grouped together in the cascaded mapping relationship, where a most recent copy is located at the left of the group.

Referring now to FIGS. 13A-13F, representative diagrams 1300 of various storage volumes across primary and secondary systems are illustrated at different stages in accordance with one embodiment. As an option, the present diagrams 1300 may be implemented in conjunction with features from any other embodiment listed herein, such as those described with reference to the other FIGS. However, such diagrams 1300 and others presented herein may be used in various applications and/or in permutations which may or may not be specifically described in the illustrative embodiments listed herein. Further, the diagrams 1300 presented herein may be used in any desired environment. Thus FIGS. 13A-13F (and the other FIGS.) may be deemed to include any possible permutation.

As shown in FIG. 13A, nine different storage volumes A, B, C, D, E, F, X, Y, Z are positioned across the primary system 1306 and secondary system 1308. Moreover, the storage volumes are interrelated via point-in-time copying relationships which extend between them. Volumes A, B, C, and Z are on the primary (e.g., production) system 1306, and D, E, F, X, and Y are on the secondary (e.g., DR) system 1308. It should be noted that in the present embodiment, single arrows are intended to represent local point-in-time copies, while double arrows are intended to represent remote point-in-time copies. In the example here, the copies were started in the order of the numbers adjacent to each arrow. For instance, in order to create the cascaded relationship in FIG. 13B, the point-in-time copy relationships corresponding to numbers 1-5 were performed. Moreover, those numbered arrows marked with an asterisk will be used to explain adding a volume to a cascaded mapping relationship below.

Looking now to FIG. 13B, a cascaded mapping relationship extending between six different storage volumes (labeled A, B, C, D, E, F) has been formed by starting the first five point-in-time copies (numbered 1-5) illustrated in FIG. 13A according to the standards described above. As shown, there is only a single remote point-in-time copy interface (e.g., link) in the cascaded mapping relationship, between volumes C and D, joining the two groups of volumes on the primary and secondary systems 1306, 1308. Each volume in the cascaded mapping relationship other than the leftmost volume (designated as the "source volume") has a bitmap associated therewith (Bb, Bc, Bd, Be, Bf). Moreover, the storage volume immediately upstream from the cascaded mapping relationship interface includes an additional bitmap associated with it Rd. This additional bitmap Rd may imitate the bitmap associated with volume D of the secondary system.

The storage system that a given point-in-time copy is stored in will know which regions (e.g., grains) of a storage volume corresponding to that given point-in-time copy contain valid data, e.g., rather than pointers to the valid data. As previously mentioned, a region of a storage volume is preferably a static-size, contiguous unit of the storage volume. For example, one or more storage volumes may be split into a plurality of 256 kB-sized regions.

Each system may track which regions contain valid data using any desired approach. However, tracking which regions contain valid data is preferably performed using a bitmap. In some approaches, one bitmap may be maintained per local point-in-time copy, while two bitmaps may be maintained associated with the storage volume immediately upstream from the cascaded mapping relationship interface, e.g., as seen in FIG. 13B. In each case, when a point-in-time copy is first formed, the bitmap or bitmaps associated therewith start off with all bits unset, signifying that the volume is identical to the volume in the cascaded mapping relationship from which the point-in-time copy was formed. Embodiments implemented on a clustered environment (e.g., such as IBM Spectrum Virtualize) preferably include bitmaps which are located on the same nodes in the cluster. Accordingly, scanning through multiple bitmaps looking for a volume that has valid data may be performed in a single node, without any messages needing to be sent between nodes. This allows cascades to be arbitrarily long with essentially no overhead. Moreover, establishing, maintaining, performing operations across, etc. a clustered environment may be performed by implementing any of the approaches described in U.S. Pat. No. 7,386,695, which is hereby incorporated by reference.

When processing a read request directed to (e.g., intended for) any storage volume in the cascaded mapping relationship, it is preferred that the data corresponding to read request is located, read, and returned in response to the received request, e.g., sent to a host.

As described above, the storage volume the read request was directed to, may first be examined for the data corresponding to a read request, e.g., by checking the bitmap associated therewith to see if the region(s) the data is supposed to be stored in contain(s) valid data. If it does, that data is read therefrom and returned to the host. However, if not, the system may repeat this process of examining the bitmap associated with the storage volume immediately upstream in the cascaded mapping relationship from the previously inspected one. This iterative process may continue upstream along the cascaded mapping relationship until a volume containing data for that one or more region is found.

As the source volume at the far left of the cascaded mapping relationship is considered to have a full set of data (no pointers), this process will terminate by reading from the source volume if data is not identified earlier. Accordingly, the manner in which point-in-time copies are formed and stored according to the various approaches included herein ensures that the first valid data for those one or more regions identified working upstream along the cascaded mapping relationship will be from the same point in time as the copy that the read was submitted to. However, if moving over the storage volume immediately downstream from the interface of the cascaded mapping relationship, the volume immediately upstream will be on a different system. In other words, all viable point-in-time copies at the secondary system that might have the data corresponding to the read request have been exhausted at this point. Accordingly, the secondary system (or a controller coupled thereto) preferably sends a message to retrieve the data corresponding to the read request from the primary system.

Upon receiving the request, the primary system attempts to read the data from the storage volume immediately upstream from the interface of the cascaded mapping relationship on the production. If valid data is not included in that storage volume, the process will continue upstream until a point-in-time copy which includes the requested data is found. Once valid data is located, it is read from that volume, and transmitted back to the secondary system.

After receiving the requested data, the secondary system may simply use the data to satisfy the read request and then discard it. However, according to a preferred approach, the data may additionally be written to the storage volume immediately downstream from the interface of the cascaded mapping relationship on the secondary system. Although the data may alternatively be written to the volume that the read request was submitted to, it is more desirable to write the data to the storage volume immediately downstream from the interface of the cascaded mapping relationship, as doing so will avoid the need to push and/or pull that same data across the cascaded mapping relationship interface in response to receiving subsequent read and/or write requests. In order to indicate that the data has been added to the storage volume immediately downstream from the interface of the cascaded mapping relationship on the secondary system, the appropriate bit(s) associated with the respective one or more regions of the storage volume in which the data is written are preferably set. Moreover, as soon as the data has been written to the storage volume immediately downstream from the interface of the cascaded mapping relationship, that secondary system preferably sets the respective bit(s) on the associated bitmap. The secondary system may then send an indication (e.g., message) to the primary system such that the equivalent bit(s) in the corresponding bitmap may be set (e.g., see Rd in FIG. 13B).

Moreover, in some situations, a read request may be received and/or processed by the secondary system at about the same time as a write request is received and/or processed by the secondary system. As described above, it follows that data located in response to performing the read request may be used to perform the write request should the two requests correspond to at least some of the same data, and vice versa. This desirably reduces system throughput and data retrieval delays. Similarly, multiple read and/or write requests may be outstanding at a given point in time. Accordingly, it is preferred that a first request is performed while the remainder of the requests are delayed until the request being performed is completed.

When processing a received write request corresponding to any of the volumes in the cascaded mapping relationship, it is preferred that the current data on that volume is copied to any volumes that still depends on it (e.g., have pointers pointing to it), thereby avoiding data corruption. Moreover, if there currently is no data on the volume for the region corresponding to the write request, and the write is smaller than the given region, it is also preferred that enough data is copied from the previous volume with data to pad the host write to a whole region before the whole region is written to the respective storage volume.

Ensuring that data is copied to regions which still depend on it before it is overwritten may be achieved by looking at the bit for the region being written to in the bitmap associated with the storage volume immediately downstream along the cascaded mapping relationship from the storage volume being written to. If no storage volume is located downstream from the one being written to, or that storage volume has its own copy of the data (signified by the appropriate bit in its bitmap being set), it may be determined that the existing data in the region(s) being written to is not depended on by any other storage volumes and the write request may be performed. Otherwise, the existing data in the region(s) being written is depended on.

In the case where the existing data in the region(s) being written to is depended on, all the data in the region(s) being written to is preferably read. However, because the data may not be valid on the storage volume being written to, the process will work upstream through the cascade starting at the volume being written to, looking for a volume with valid data for those particular one or more regions. Once the storage volume containing the valid data is found, the data is read into memory, and written to the first volume downstream from the volume the write request was directed to.

However, checking if the volume to the right of the one being written to has its own copy of the data being overwritten is straightforward, except where the volume being written to is the storage volume immediately upstream from the interface of the cascaded mapping relationship. Rather, it is preferred that the remote bitmap (e.g., see Rd in FIG. 13B) on the primary system may be used to determine if the storage volume immediately downstream from the interface of the cascaded mapping relationship has its own copy of data in the region(s) being overwritten. This remote bitmap is desirably updated a soon after any changes are made to the contend of the storage volume immediately downstream from the interface of the cascaded mapping relationship, meaning that there is a small possibility that the primary system may end up sending data unnecessarily to the secondary system as a result of consulting the remote bitmap, but the secondary system may safely ignore such unnecessary data as the remote bitmap will have the bit set as soon as the storage volume immediately downstream from the interface of the cascaded mapping relationship has its own data.

Reading the current data from the volume being written to will be performed as described in any of the approaches described above, e.g., by incrementally attempting to locate the data in each of the storage volumes upstream through the cascaded mapping relationship, and sending a retrieval message to the primary system if the write request was directed to a storage volume in the secondary system, but no copy of the existing data in the region being overwritten by the write request is found on the secondary system. Once the data is retrieved, it may be used to write to the next storage volume in the cascade, downstream of the storage volume being written to. Moreover, unless the storage volume the write request was directed to is the storage volume immediately downstream from the interface of the cascaded mapping relationship, it is preferred that the existing data in the region(s) being overwritten by the write request should also be written to the storage volume immediately downstream from the interface, and the associated bit(s) should be set. Moreover, a message is preferably sent to the primary system which instructs the primary system to set the bit in the primary system's remote bitmap (e.g., see Rd of FIG. 13B).

Writing the current data to the next volume in the cascade is relatively straightforward except in the case where the volume being written to is the storage volume immediately upstream from the interface of the interface of the cascaded mapping relationship, in which case a message is sent to the secondary system containing the data from the region(s) to be overwritten by the write request. The secondary system preferably writes the received data to the storage volume immediately downstream from the interface of the cascaded mapping relationship, and sets the respective bit in the associated bitmap. The secondary system then preferably sends a completion message to the primary system, which may in turn finally set a corresponding bit in the remote bitmap.

According to some approaches, a process may examine a bit corresponding to the region being written to in the bitmap associated with the storage volume being written to. If this bit is set, the region includes valid data and padding is not needed. Next, the process may examine the size (e.g., amount of data) of the write request. If it is determined that the write request will cover the whole region (writes larger than a single region will be split into region-length writes before this point), the write will modify the whole region without padding out the region such that it is filled with data. However, if at least one of the regions being written to does not include valid data therein and the corresponding portion of the write request is less than the size of the region, existing data is preferably written to the region prior to the write request being performed therein in order to pad out the region, as would be appreciated by one skilled in the art after reading the present description. The data used to pad out the region may have been read in a previous step if there was another storage volume depending on the data, in which case it can be reused. Otherwise the current data corresponding to the region being padded out may be located as described in the various approaches described above, e.g., working through the cascaded mapping relationship until a copy of the relevant data is found, whereby the data may be read and used to pad out the region being written to.

However, if the write request is directed to the storage volume immediately downstream from the interface of the cascaded mapping relationship, after setting the relevant bit in bitmap associated therewith in the secondary system, a message is also preferably sent to the primary system, where the message is used by the primary system to set the relevant bit in the remote bitmap on the primary system.

Transitioning to detailed examples in which storage volumes are added to various locations across the cascaded mapping relationship, it should be noted that it is preferred that each read and/or write only results in, at most, a single roundtrip message being sent between the primary and secondary systems. In other words, going from any storage volume in the cascaded mapping relationship upstream towards the source volume desirably only transitions between the systems one time. Accordingly, initiating a point-in-time copy where the volume is already in the cascaded mapping relationship, and both the originating and target volumes are on the same system, the point-in-time copy is inserted into the cascaded mapping relationship immediately downstream from the originating volume. Referring again to FIG. 13B, the point-in-time copies on corresponding to storage volumes B, C, and F were formed this way.

Figure 13C:
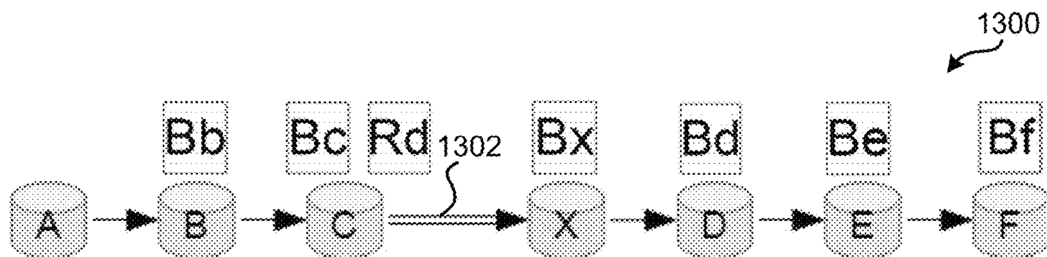

However, forming remote point-in-time copies may include inserting a point-in-time copy of the data in a storage volume on the primary system somewhere along the cascaded mapping relationship at the secondary system. The first category of forming a remote point-in-time copy (where the originating volume is at the primary system, and the target volume is at the secondary system), involves the originating volume being the storage volume immediately upstream from the interface of the cascaded mapping relationship. For example, the point-in-time copy marked as number 6 in FIG. 13A was formed according to this category. Accordingly, looking now to FIG. 13C, storage volume X at the secondary system is formed as a remote point-in-time copy of storage volume C on the primary system. As shown, storage volume X has been inserted into the cascaded mapping relationship immediately downstream from the interface. Moreover, various approaches described in U.S. Pat. No. 7,386,695, which has been incorporated by reference, may be implemented in order to form a remote point-in-time copy as shown in FIG. 13C.

The newly formed point-in-time copy in storage volume X is identical to the storage volume C in that both storage volumes include the same version of data. In other words, no alterations have been made (e.g., overwrites) to the regions in storage volume X to differentiate it from the regions in storage volume C. Accordingly, data is not moved between volumes X and C, while bitmap manipulation may be performed. The bitmap Bx associated with the storage volume being added (here storage volume X) begins with all bits clear. Moreover, because the remote bitmap (now Rx) on the primary system shadows (e.g., imitates) the bitmap Bx associated with the storage volume immediately downstream from the interface of the cascaded mapping relationship, all bits in the remote bitmap Rx may also be clear at first. However, all other bitmaps in the primary and secondary systems may remain the same. For instance, in the present example, bitmap Bd remains the same, as volume D still contains the same data as before volume X was inserted, and differs from volume X in exactly the same way as it differs from volume C, as volumes C and X are identical at this point by definition. Again, bitmap Bx is entirely clear, representing the fact that volume X contains no data, and would need data from volume C to satisfy any read directed to volume X. Remote bitmap Rx is likewise clear, shadowing bitmap Bx, so the primary system understands that any write to volume C will result in a request for data to be pushed to volume X. In some approaches, data from volume D may be used to partially populate volume X in order to minimize the amount of data that will be copied from the primary system to volume X, e.g., as will be described in further detail below.

As an implementation detail, all the local bitmaps (those bitmaps in FIG. 13C marked with a "B" prefix) may be created at the point in time that a respective point-in-time copy is made, and may be retained throughout the existence of that point-in-time copy, regardless of where the point-in-time copy is located along the cascaded mapping relationship. However, the remote bitmap (denoted by the "R" prefix) is preferably created when the first remote point-in-time copy is created (where the source and target volumes are on different systems). Again the remote bitmap preferably shadows the bitmap associated with the storage volume immediately to the right of the interface of the cascaded mapping relationship. Moreover, the remote bitmap has been renamed from Rd to Rx between FIGS. 13B and 13C in order to signify the bitmap at the secondary system that the remote bitmap is shadowing for clarity, and is in no way required.

The second category of starting a remote point-in-time copy involves forming a remote point-in-time copy of a storage volume on the primary system other than the one immediately upstream from the interface was copied to the DR system. In such instances, it is desirable that the remote point-in-time copy is insert into the cascaded mapping relationship in a position other than immediately downstream from the originating volume. Again, it is desirable that volumes in a system are grouped together in a cascade. In order to achieve this result, inserting the remote point-in-time copy may be performed in two steps. For exemplary purposes, the remote point-in-time copy marked as number 7 from source volume A on the primary system to volume Y on the secondary system in FIG. 13A will be examined in FIG. 13D.

Figure 13D:
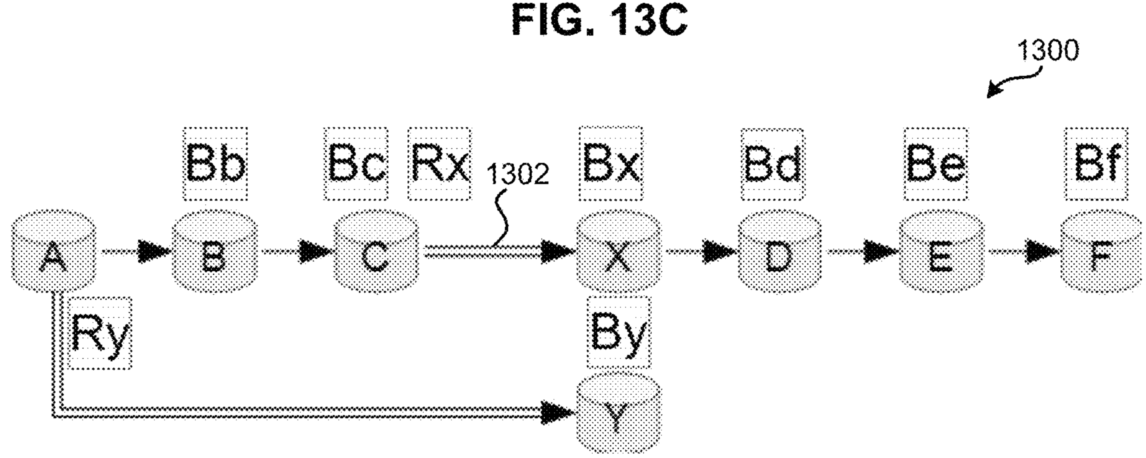

Looking now to FIG. 13D, volume Y is initially added as a new remote point-in-time copy of source volume A, independent from the existing cascaded mapping relationship. This involves establishing a new remote bitmap Ry and a local bitmap By associated with volume Y. Accordingly, each write to source volume A would need to consider doing a copy-on-write to volumes B and Y separately. However, creating a new cascaded mapping relationship each time a remote point-in-time copy is created from a production volume other than the one immediately upstream from the interface results in a less optimal system as data is transferred for each remote point-in-time copy separately. Moreover, existing volumes X and Y would not be able to take advantage of data already transferred for the other.

Accordingly, in preferred embodiments, volume Y is modified so that it may be inserted into the cascaded mapping relationship immediately downstream from the interface of the cascaded mapping relationship. Volume Y will nominally depend on volumes B and C for data, however it will differ from volumes B and C with respect to regions in those volumes that have been modified. Accordingly, the originating source and target volumes refer to the remote point-in-time copy that is being added to the cascaded mapping relationship in order to perform an illustrative process. The illustrative process includes 1) logically ORing the bitmaps for all the primary system storage volumes in the original cascaded mapping relationship downstream from the source volume to a temporary bitmap. According to FIG. 13D, this operation may be performed by Bb OR Bc, as would be appreciated by one skilled in the art after reading the present description. Moreover, the illustrative process includes 2) for each bit in this temporary bitmap, the current data in the originating volume is preferably copied to the target volume Y, thereby updating the remote bitmap Ry associated with the target volume Y and the target volume Y's associated bitmap (bitmaps Ry and By seen in FIG. 13D). Steps 1 and 2 of the illustrative process are preferably repeated until the remote bitmap for the target volume Y is set for each bit set in any bitmaps downstream from the originating volume in the primary system. According to the example illustrated in FIG. 13D, bitmap Ry is desirably set for all bits which are set in (Bb OR Bc). This may also be represented by $Ry \supseteq (Bb \cup Bc)$, as would be appreciated by one skilled in the art after reading the present description.

According to an illustrative embodiment, which is in no way intended to limit the invention, adding storage volume Y to the secondary system may include: receiving the remote point-in-time copy (volume Y) of the source volume (volume A) on the primary system; updating a secondary record (By) associated with the received remote point-in-time copy (volume Y) to reflect each of the primary records associated with the respective storage volumes on the primary system other than the source volume; and inserting the received remote point-in-time copy (volume Y) of the source volume (volume A) between the interface of the cascaded mapping relationship and a storage volume immediately downstream from the interface of the cascaded mapping relationship (volume X) upon completing the updating, e.g., such that the remote point-in-time copy is now in a respective storage volume immediately downstream from the interface of the cascaded mapping relationship.

While this illustrative process is ongoing, the point-in-time copy process may continue to be applied to both cascaded mapping relationships. In some instances, this illustrative process may take some time to terminate, as the bitmaps for the primary volumes downstream from the source volume (for instance volumes Bb and Bc in FIG. 13D) may continually be updated. However, there are several ways to ensure that this illustrative process terminates in a timely manner, e.g., should that be desired. For example, the rate at which the copying happens compared to the production volumes being updated may be set at a desired value. In other approaches, updates to the storage volumes at the primary system may be delayed until the desired data has been copied to the new target volume Y.

Figure 13E:
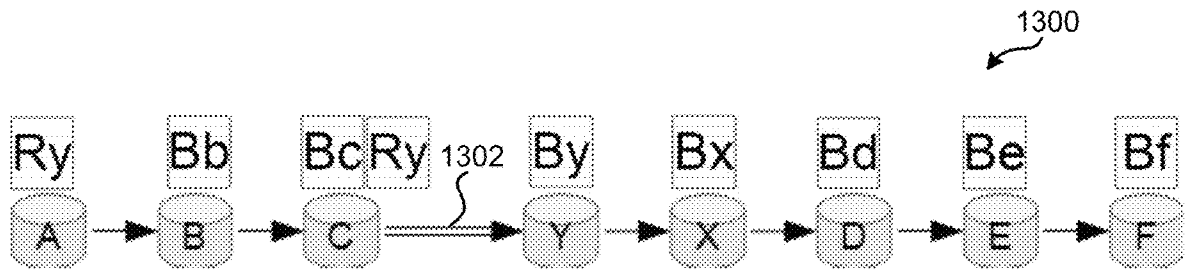

Once this illustrative process terminates (is completed), the target volume Y may be inserted into the original cascaded mapping relationship immediately downstream from the interface, e.g., as seen in FIG. 13E. The bitmap By associated with the target volume Y already correctly indicates how volume Y differs from the storage volume C immediately upstream from the interface. Moreover, the remote bitmap on the primary system for the original cascade (Rx seen in FIG. 13D) is replaced by the remote bitmap on the temporary cascade (Ry seen in FIG. 13E). As mentioned above, bitmap By remains the same, although Rx is replaced by Ry and discarded.

Looking now to FIG. 13E, after copying all the data from source volume A to volume Y (thereby indicating in volume Y how it differs from volumes B and C), volume Y may be inserted immediately downstream from the interface of the cascaded mapping relationship.

In cases where other volumes are added to the cascaded mapping relationship during the illustrative process described in correspondence with FIGS. 13D-13E, some changes may be implemented, e.g., depending on the desired embodiment. For instance, if the number of storage volumes at the primary system to the right of the source volume increases, the remote bitmap for the new target volume preferably includes bits which are set according to bits included in the added bitmap(s). Moreover, if additional remote point-in-time copies are made from any of the storage volumes at the primary system other than the storage volume immediately upstream from the interface, those additional point-in-time copies are desirably inserted into the cascaded mapping relationship serially, e.g., rather than using this process at the same time. However, other storage volumes may be added to the cascaded mapping relationship without impacting this process.

Figure 13F:
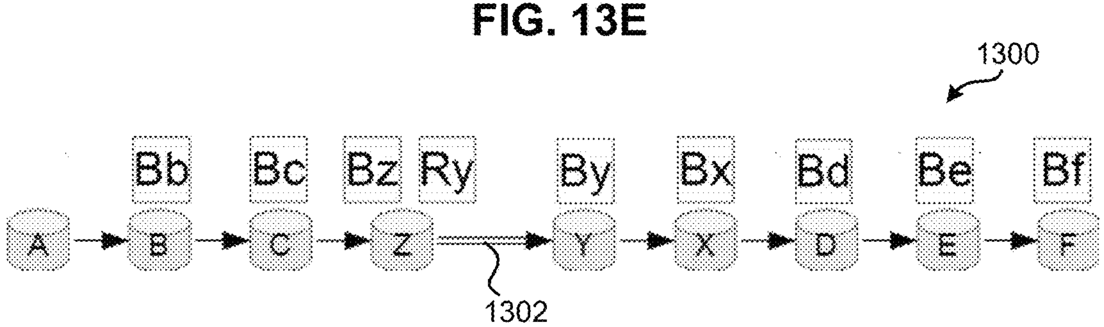

Furthermore, in some instances a new target volume may be is added immediately upstream from the interface of the cascaded mapping relationship, e.g., as shown in FIG. 13F. Looking to FIG. 13F, volume Z may be created by making a new point-in-time copy from volume C, which may immediately be added to the cascaded mapping relationship to the right of volume C. A new target volume may be is added immediately upstream from the interface of the cascaded mapping relationship according to any of the approaches described in U.S. Pat. No. 7,386,695, which has been incorporated herein by reference. Volume Z is identical to volume C and contains no data, so bitmap Bz can be initialized with every bit clear. Moreover, volume Y is as different to volume Z as it was to volume C, so bitmaps Ry and By need not be altered. For implementation simplicity, I/Os to all volumes in a cascaded mapping relationship are preferably quiesced before adding and/or removing volumes from the cascaded mapping relationship. However, it is possible to change the cascaded mapping relationship with I/Os in flight as would be appreciated by one skilled in the art after reading the present description.

Volumes may be removed from the cascaded mapping relationship if the point-in-time image stored on it is no longer depended on (e.g., pointed to by pointers from other storage volumes), including when the corresponding storage volume is deleted. Removing a storage volume from a cascaded mapping relationship may implement any of the approaches described in U.S. Pat. No. 7,386,695 which has been incorporated herein by reference. For instance, all regions in the storage volume to be removed that have valid data that is depended on by other storage volumes in the cascaded mapping relationship (e.g., which may be identified if the bit for that region on the bitmap of the storage volume being removed is set, while the bit for the corresponding region on the storage volume immediately downstream in the cascaded mapping relationship is clear) preferably first have their data copied to the next volume in the cascade. That next volume will then have the bit set in its bitmap for any region that now has data.

However, moving data from the storage volume immediately upstream from the interface of the cascaded mapping relationship to the storage volume immediately downstream from the interface may involve using the remote point-in-time messages to push the data over the interface. Moreover, bits in the remote bitmap at the primary system as well as bitmaps at the secondary systems are preferably updated, e.g., according to any of the approaches described herein.

When a point-in-time copy process completes in the cascaded mapping relationship, the cascaded may be separated into two at that point, e.g., according to any of the approaches described in U.S. Pat. No. 7,386,695, which has been incorporated herein by reference. A point-in-time copy process may be completed when a copy has valid data for every region therein. For instance, if in FIG. 13B, a host completely overwrote every region in volumes E and C, there would be three cascaded relationships remaining in the primary and secondary systems, these cascaded relationships being between volumes A and B, volumes C and D, and volumes E and F. Each of these cascaded relationships may be processed independently. In other words, the storage volumes downstream from the point-in-time copy process that has completed do not depend on the storage volumes upstream of the point-in-time copy process that has completed. This in turn means that the storage volumes downstream will remain online if the volumes upstream go offline. It also means that at least part of the cascaded mapping relationship will no longer have a remote-point-in-time copy included therein, thereby lowering the potential for host I/O to cause copy-on-write and/or copy-on-read activity.

As mentioned above, it is also desirable to be able to perform some copying ahead of time, to avoid the copy-on-read and/or copy-on-write processes delaying host I/O. With a cascaded mapping relationship spanning between two remote systems, the greatest impact will come from copying data between the remote systems ahead of time. Accordingly, a background copy process which focuses on supplying the storage volume immediately downstream from the interface of the cascaded mapping relationship a complete set of data may be implemented. This can be done by a process on the secondary system that repeatedly identifies a region on the storage volume immediately downstream from the interface that does not have valid data yet (e.g., the respective bit in the bitmap is clear), retrieving the corresponding data for that region as though it corresponds to an outstanding read request, writing the data (once retrieved) to the storage volume immediately downstream from the interface, and setting the appropriate bit in the associated bitmap for that volume and the remote bitmap on the primary system. For example, see method 1200 of FIG. 12 above.

This process of filling the storage volume immediately downstream from the interface may choose which region to fill with data next either sequentially, or by prioritizing the regions, e.g., based on which ones are likely to receive I/Os soon. As a result, this background copy task will drive towards copy completion. Moreover, if future copies are to be made from storage volumes at the primary system along the cascaded mapping relationship, it may be preferable to disable this background copy procedure for such storage volumes, otherwise the cascaded mapping relationship may be split on the primary system. However, these background copy processes may increase storage consumption of copies that use thin-provisioned storage volumes. Thus a user may desirably be able to configure the system such that background copy processes are only used for the storage volume immediately downstream from the interface of the cascaded mapping relationship.

It follows that various ones of the embodiments described herein are able to achieve significant improvements over conventional products. For instance, some of the embodiments included herein are able to desirably decrease the amount of bandwidth involved with maintaining more than one point-in-time copy on a remote system, decrease latency associated with performing copy-on-read and/or copy-on-write operations (as would be appreciated by one skilled in the art after reading the present description), relate different point-in-time copies to each other, etc.

Various in-use examples, which are in no way intended to limit the invention, are described below. It should be noted that any of the following in-use examples may be implemented with any of the approaches described above, e.g., depending on the desired embodiment, as would be appreciated by one skilled in the art after reading the present description.

Recording Differences

It is possible to use a second bitmap for each storage volume, where one may be used to describe how it differs from the volume immediately upstream (e.g., the "difference bitmap"), and the second bitmap is used to describe what data is valid on the associated volume (e.g., the "validity bitmap").

Accordingly, a copy-on-read process and background copy process may set the validity bitmap and leave the difference bitmap clear when pulling data from a volume upstream, as well as (if desired) performing a copy-on-write operation to push the old data to the next volume downstream. To clarify, for a write, the system would check the validity bitmap for the volume downstream in the cascade (using the remote validity bitmap if the volume written to is the rightmost production volume). If the validity bitmap is set, or there is no such volume, and this step may effectively be skipped. Otherwise, copy data from the volume being written to (locating it on a volume upstream if the volume being written to does not have valid data) to the volume downstream, and set the validity bit for the volume downstream (and the remote validity bit if the volume written to is the storage volume immediately upstream from an interface of the cascaded mapping relationship).

Thereafter, the host write may be padded to a full region as described herein, and written to the volume in question. Moreover, the difference bit may be set for the volume in question (unless it is the storage volume immediately downstream from the interface, as that has neither a difference nor a validity bitmap).

Furthermore, the difference bit for the volume immediately downstream (if any) may be set. If the volume written to is the storage volume immediately upstream from the interface, a message will be sent to the secondary system to achieve this, then the remote difference bit is desirably set to shadow that change. If the remote difference bit was already set, no such message may be sent.

When a new volume is added to the cascade, the difference bitmap of the new copy is clear, as it is the same as the volume immediately upstream. The exception to this is when a remote point-in-time copy is created of a production volume other than the volume farthest downstream (e.g., as seen with volume Y in the embodiments above). Here, the difference bitmap of the new target volume is set as it is added into the original cascade, to the logical OR of all difference bitmaps upstream from it.

It may be noted that the validity bit is preferably set if the difference bit is set for a region as it cannot be different from the volume immediately upstream if it doesn't have valid data. This modification allows several improvements in turn.

Efficient Adding of Remote Volumes to Cascade

As new remote point-in-time copies from the primary system are inserted at the upstream end of the secondary system's copies, the new remote point-in-time copies cannot take advantage of any data already copied for previous remote point-in-time copies. This increases bandwidth use, and may increase storage requirements if the copies are on thin-provisioned storage volumes, as the new copy will include its own copy of data.

By introducing difference bitmaps, e.g., as described above, certain embodiments may be able to identify matching data on the same system, downstream in the cascaded mapping relationship from the new volume. So for a read to a volume, either from a host read, a read to pad out a write, or a read to perform a copy-on-write write, a copy of data may be identified as follows: from the volume desired to be read, going upstream in the cascade for volumes on the same system, look at the validity bit. Use the first volume found with the validity bit set. If the read is on the primary system, the desired data may successfully be provided. If valid data is found, skip the remaining steps. If the read is on the secondary system and all storage volumes on the secondary system upstream from the one being read have been exhausted, the volumes downstream from the one being read are preferably inspected in the next step. From the volume intended to be read, going downstream in the cascade for volumes on the same system, look at the validity bit and the difference bit. If the difference bit is set, skip this part of the process and send a message to the primary system to find the data. However, if the difference bit is not set, but the validity bit is set, use the data on this copy and skip all the remaining steps. If neither bit is set, move to the next storage volume downstream in the cascade.

Thus reads and/or writes to the new copy may be satisfied within the secondary system if the data has been copied there previously, unless the most recent copy with valid data for that region on the secondary system has had that region modified by a host write. All the benefit of copy-on-read storing data on the secondary system will be preserved even when new copies are added upstream.

It is also desirable to improve the copy-on-write process for the storage volume immediately upstream from the interface of the cascaded mapping relationship. The remote validity bitmap on the primary system simply shadows the validity bitmap associated with the storage volume immediately downstream from the interface. With this extension, a third remote bitmap may be implemented, referred to herein as a "remote satisfiability bitmap." This differs from the remote validity bitmap by having a bit set for each region if the volume immediately downstream from the interface has valid data (e.g., the validity bitmap is set); or any copy on the secondary system has the valid bit set and all volumes upstream (including that copy) have the difference bit clear.

This remote satisfiability bitmap may be maintained on the primary system by the secondary system using messages between the systems as the above conditions change. When a new point-in-time copy is inserted in the cascade immediately downstream from the interface, the remote validity bitmap and the remote difference bitmap may be cleared, but the remote satisfiability bitmap is left intact. If the storage volume immediately upstream from the interface is written to, it is desirable that a copy-on-write process is performed if the remote validity bit is set. If the remote satisfiability bit is clear, the copy-on-write process may be performed as before, by reading the data and transmitting it to the secondary system. If the remote satisfiability bit is set, the copy-on-write process sends a message to the secondary system to tell (e.g., instruct) it to copy the data from a copy on the secondary system as described earlier in this section.

In some instances the data does not need to actually be copied before the write may be applied, but rather the difference bit is preferably set associated with the storage volume immediately downstream from the interface, as any attempts to read the data will locate it from a storage volume downstream. However, the copy of data on the secondary system is desirably still performed in a timely fashion, e.g., to ensure that volumes can generally search upstream to locate data. Moreover, it is desirable that host writes on the secondary system will check if such a lazy copy requests the data being overwritten, and should complete the lazy copy before applying the write. Accordingly, a new point-in-time copy may be inserted immediately downstream from the interface without driving an increased number of copy-on-read or copy-on-write processes, and while allowing any previously copied data to improve performance of the new copy.

Efficient Copying of Non-Rightmost Production Volumes

When copying the storage volumes immediately upstream from the interface, the processes described in the previous section may significantly improve system performance. However, when copying other storage volumes at the primary system, and initially using a separate cascade, the process of preparing the new point-in-time copy to insert it into the cascade may further be improved, e.g., compared to conventional products.

The point-in-time copy system may only copy data to the new copy for regions that have a bit set in the difference bitmap of at least one copy downstream of the originating volume. If a background copy is enabled between volumes on the primary system, the difference bitmap will have few regions set compared to the validity bitmap. To put this another way, using the difference bitmap allows a background copy process to be used without increasing the amount of data to be copied when remote point-in-time copying a storage volume at the primary system other than the one immediately upstream from the interface of the cascaded mapping relationship.

Efficient Removal of Volumes from the Cascade

When removing a volume, regions which have valid data on the volume in question, no valid data on the volume immediately downstream, and have the difference bit set on the volume being removed are preferably copied to the volume immediately downstream. However, data copied by the copy-on-read and background copy processes may not be moved.

If removing a storage volume on the secondary system from the cascaded mapping relationship which has a region: 1) with valid data (e.g., the validity bit is set), 2) that is the same as the storage volume immediately upstream from the interface (e.g., difference bits are unset for this volume and all storage volumes upstream at the secondary system), and 3) which is relied on by the secondary system (any copies before the next copy downstream with the difference bit set do not have the validity bit set); would mean that reading and/or writing another storage volume at the secondary system would result in retrieving the same data from the primary system again. Accordingly, such regions may be copied to the next volume downstream before removing the volume from the cascaded mapping relationship.

As a result, future I/Os to the secondary system may be more efficiently performed, and in some approaches, may even be omitted if the volume is to be ejected from the cascaded mapping relationship more quickly.

Minimizing Storage Use on the DR System

The invention so far has copied data between systems to the leftmost DR copy. In particular, the copy-on-read process will result in the leftmost DR copy caching data read across all DR volumes. As the leftmost DR copy may change over time, the copy-on-read process may have copied data to many separate volumes.

If a user wants to reduce the storage used by the storage volumes at the secondary system, cached data may be moved and/or removed from storage volumes at the secondary system (other than the storage volume immediately downstream from the interface of the cascaded mapping relationship) as follows. For each grain, starting from the storage volume immediately downstream from the storage volume immediately downstream from the interface (e.g., volume E in FIG. 13B), examine the difference bit. If the difference bit is set, this corresponding point-in-time copy is different, so terminate this process for the current region, and resume for the next region. However, if the difference bit is clear, the validity bit is preferably examined. If the validity bit is set, there is thereby a copy which is undesirably present. Accordingly, the validity bit for the storage volume immediately downstream from the interface is preferably examined.

If the validity bit for the storage volume immediately downstream from the interface is set, the present region (for which the difference bit is clear) is unnecessary. Accordingly, the present region is preferably discarded from this thin-provisioned volume, thereby reclaiming the space, and the validity bit is preferably cleared. However, if the validity bit for the storage volume immediately downstream from the interface is clear, the present region (for which the difference bit is clear) is necessary, but on the wrong volume. Accordingly, the region is preferably copied to the storage volume immediately downstream from the interface. Moreover, the validity bit associated with the storage volume immediately downstream from the interface is set. Thereafter, the present region (for which the difference bit is clear) is preferably discarded from this thin-provisioned volume, thereby reclaiming the space, and the validity bit is preferably cleared.

Alternatively, if the validity bit for the storage volume immediately downstream from the interface is clear, there's no data here, so no action may be taken.

Finally, having moved and/or copied any data, this process may be continued for a corresponding region of a storage volume immediately downstream.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:

maintaining a cascaded mapping relationship at a secondary system, wherein the cascaded mapping relationship extends between the secondary system and a remote primary system, wherein maintaining the cascaded mapping relationship includes:

in response to receiving a remote point-in-time copy from the remote primary system, inserting the received remote point-in-time copy immediately downstream from an interface of the cascaded mapping relationship between the secondary system and the remote primary system; and inserting each local point-in-time copy of a storage volume in the secondary system immediately downstream from the storage volume, wherein upon detecting that a storage volume in the secondary system has gone offline, causing all storage volumes downstream from the offline storage volume to go offline also, and in response to receiving a write request at the secondary system:

determining whether one or more regions in a storage volume corresponding to the write request contain primary data;

determining whether one or more other storage volumes in the secondary system depend on the primary data in response to determining that the one or more regions in the storage volume corresponding to the write request contain the primary data;

copying the primary data to the one or more other storage volumes in the secondary system which depend on the primary data in response to determining that one or more other storage volumes in the secondary system depend on the primary data;

determining whether at least a portion of the write request will fill one or more regions in the storage volume corresponding to the write request;

performing the at least a portion of the write request in response to determining that the at least a portion of the write request will fill the one or more regions in the storage volume corresponding to the write request;

determining whether secondary data corresponding to the at least a portion of the write request will fill one or more regions in at least one other storage volume in the secondary system in response to determining that the write request will not fill one or more regions in the storage volume corresponding to the write request;

copying the secondary data from the one or more regions in the at least one other storage volume to the storage volume corresponding to the write request in response to determining that the secondary data will fill one or more regions in at least one other storage volume in the secondary system;

sending a request to the primary system for the primary data in response to determining that the secondary data will not fill one or more regions in at least one other storage volume in the secondary system;

writing the primary data received from the primary system to the one or more regions in the storage volume corresponding to the write request; and performing the write request.

2. The computer-implemented method of claim 1, comprising:

maintaining a secondary record associated with each of the point-in-time copies stored in the secondary system, wherein each secondary record indicates which regions in a storage volume corresponding to the respective point-in-time copy contain valid data.

3. The computer-implemented method of claim 2, wherein the secondary records include bitmaps, wherein each bit of the bitmaps corresponds to a single region of a respective storage volume, wherein each of the bitmaps is stored on two or more nodes in a clustered system.

4. The computer-implemented method of claim 3, wherein upon receiving one or more write requests which are directed at the storage volume immediately upstream from the offline storage volume:

causing the storage volume immediately upstream from the offline storage volume to go offline also;

postponing the one or more received write requests;

storing the one or more postponed received write requests in memory;

in response to determining that the offline storage volume has been brought back online, performing the one or more postponed received write requests; and causing the storage volume immediately upstream from the online storage volume to go online also.

5. The computer-implemented method of claim 1, comprising:

in response to receiving a read request at the secondary system:

determining whether data corresponding to the read request is in a storage volume which the read request was directed to;

reading the data corresponding to the read request from the storage volume which the read request was directed to in response to determining that the data corresponding to the read request is in the storage volume which the read request was directed to;

determining whether data corresponding to the read request is in at least one other storage volume in the secondary system in response to determining that the data corresponding to the read request is not in the storage volume which the read request was directed to;

reading the data corresponding to the read request from the at least one other storage volume in the secondary system in response to determining that the data corresponding to the read request is in the at least one other storage volume in the secondary system;

sending a request to the primary system for the data corresponding to the read request in response to determining that the data corresponding to the read request is not in the at least one other storage volume in the secondary system;

receiving the data corresponding to the read request from the primary system; and supplying the data corresponding to the read request.

6. The computer-implemented method of claim 5, comprising:

storing the data corresponding to the read request received from the primary system in the storage volume in the secondary system immediately downstream from the interface of the cascaded mapping relationship;

updating a secondary record associated with the storage volume in the secondary system immediately downstream from the interface of the cascaded mapping relationship to indicate which regions in the associated storage volume contain at least a portion of the data corresponding to the read request received from the primary system; and sending a message to the primary system indicating the regions in the storage volume in the secondary system immediately downstream from the interface of the cascaded mapping relationship which the data corresponding to the read request received from the primary system is stored in, the message being for updating a primary record.

7. The computer-implemented method of claim 1, comprising:

receiving a remote point-in-time copy of a source volume on the primary system;

updating a secondary record associated with the received remote point-in-time copy to reflect each of the primary records associated with the respective storage volumes on the primary system other than the source volume; and inserting the received remote point-in-time copy of the source volume between the interface of the cascaded mapping relationship and a storage volume immediately downstream from the interface of the cascaded mapping relationship.

8. The computer-implemented method of claim 1, wherein upon receiving a write request which is directed at the storage volume immediately upstream from the offline storage volume, causing the storage volume immediately upstream from the offline storage volume to go offline also.

9. The computer-implemented method of claim 1, comprising:

identifying regions in the storage volume in the secondary system immediately downstream from the interface of the cascaded mapping relationship which do not yet include valid data;

sending a request to the primary system for the data corresponding to the identified regions;

receiving the requested data from the primary system;

storing the data received from the primary system in one or more regions in the storage volume in the secondary system immediately downstream from the interface of the cascaded mapping relationship;

updating a secondary record associated with the storage volume in the secondary system immediately downstream from the interface of the cascaded mapping relationship to indicate which regions in the associated storage volume contain at least a portion of the data received from the primary system; and sending a message to the primary system indicating the regions in the storage volume in the secondary system immediately downstream from the interface of the cascaded mapping relationship which the data received from the primary system is stored in, the message being for updating a primary record.

10. A computer program product comprising a non-transitory computer readable storage medium having program instructions embodied therewith, the program instructions readable and/or executable by a processor to cause the processor to:

maintain, by the processor, a cascaded mapping relationship at a primary system, wherein the cascaded mapping relationship extends between the primary system and a remote secondary system, wherein maintaining the cascaded mapping relationship includes:

storing, by the processor, a source volume at a head of the cascaded mapping relationship in the primary system;

inserting, by the processor, a local point-in-time copy of a storage volume in the primary system immediately downstream from the storage volume;

sending, by the processor, a remote point-in-time copy of a storage volume in the primary system to the remote secondary system;

receiving, by the processor, an indication from the remote secondary system that the remote point-in-time copy has been stored in the remote secondary system and that a secondary record, associated with the remote point-in-time copy sent to the remote secondary system, has been updated accordingly; and updating, by the processor, a remote primary record in response to receiving the indication, and in response to receiving a write request at the primary system:

determine, by the processor, whether one or more regions in the storage volume corresponding to the write request contain primary data;

determine, by the processor, whether one or more other storage volumes in the primary system and/or remote secondary system depend on the primary data in response to determining that the one or more regions in the storage volume corresponding to the write request contain the primary data;

perform, by the processor, the write request in response to determining that no other storage volumes in the primary system and/or remote secondary system depend on the primary data;

copy, by the processor, the primary data to the one or more other storage volumes in the primary system and/or remote secondary system which depend on the primary data in response to determining that one or more other storage volumes in the primary system and/or remote secondary system depend on the primary data;

determine, by the processor, whether at least a portion of the write request will fill one or more regions in the storage volume corresponding to the write request;

perform, by the processor, the at least a portion of the write request in response to determining that the at least a portion of the write request will fill the one or more regions in the storage volume corresponding to the write request;

copy, by the processor, the primary data from the at least one other storage volume in the primary system to the one or more regions in the storage volume corresponding to the write request in response to determining that the write request will not fill one or more regions in the storage volume corresponding to the write request; and perform, by the processor, the write request in response to determining that at least a portion of the write request will fill one or more regions in the storage volume corresponding to the write request.

11. The computer program product of claim 10, wherein the remote point-in-time copy of the storage volume in the primary system is sent to a secondary volume in the remote secondary system, wherein the program instructions are readable and/or executable by the processor to cause the processor to:

in response to detecting that the secondary volume has gone offline before the whole point-in-time copy of the storage volume in the primary system has been sent to the secondary volume, cause, by the processor, the storage volume in the primary system to go offline also;

terminate, by the processor, a connection between the storage volume in the primary system and the secondary volume;

fail, by the processor, write requests received by the storage volume in the primary system which correspond to portions of the point-in-time copy of the storage volume in the primary system which have not yet been sent to the secondary volume; and perform, by the processor, read request and/or write requests which correspond to portions of the point-in-time copy of the storage volume in the primary system which have already been sent to the secondary volume and stored therein, wherein the remote primary record indicates which regions in a storage volume in the remote secondary system immediately downstream from an interface of the cascaded mapping relationship between the remote secondary system and the primary system contain valid data.

12. The computer program product of claim 11, wherein the remote primary record is a bitmap, wherein each bit of the bitmap corresponds to a single region of the remote storage volume immediately downstream from the interface of the cascaded mapping relationship between the remote secondary system and the primary system.

13. The computer program product of claim 10, wherein the program instructions are readable and/or executable by the processor to cause the processor to:

receive, by the processor, a request from the remote secondary system for data;

perform, by the processor, an iterative process which includes:

determining whether the data corresponding to the received request is in a particular storage volume in the primary system, beginning with a storage volume immediately upstream from an interface of the cascaded mapping relationship; and progressing, by the processor, immediately upstream one storage volume towards the source volume in response to determining that the data is not in the particular storage volume;

read, by the processor, the data corresponding to the received request from the particular storage volume in response to determining that the data is in the particular storage volume;

send, by the processor, the data corresponding to the received request to the remote secondary system;

receive, by the processor, an indication from the remote secondary system that the data corresponding to the received request has been stored in a storage volume in the remote secondary system and that a secondary record, associated with the storage volume in which the data corresponding to the received request has been stored, has been updated accordingly; and update, by the processor, a remote primary record in response to receiving the indication.

14. The computer program product of claim 10, wherein the program instructions are readable and/or executable by the processor to cause the processor to: upon detecting that a storage volume in the primary system has gone offline, cause, by the processor, all storage volumes downstream from the offline storage volume to go offline also.

15. The computer program product of claim 14, wherein the program instructions are readable and/or executable by the processor to cause the processor to, upon receiving one or more write requests which are directed at the storage volume immediately upstream from the offline storage volume:

cause, by the processor, the storage volume immediately upstream from the offline storage volume to go offline also;

fail, by the processor, the one or more received write requests;

in response to determining that the offline storage volume has been brought back online, cause all storage volumes downstream from the offline storage volume to go online also; and cause, by the processor, the storage volume immediately upstream from the online storage volume to go online also.

16. The computer program product of claim 10, wherein the program instructions are readable and/or executable by the processor to cause the processor to:

receive, by the processor, a request from the remote secondary system for data corresponding to regions in a storage volume in the remote secondary system which have been identified as not yet including valid data;

read, by the processor, the requested data from a storage volume in the primary system;

send, by the processor, the requested data to the remote secondary system;

receive, by the processor, an indication from the remote secondary system that the requested data has been stored in the storage volume in the remote secondary system and that a secondary record, associated with the storage volume in the remote secondary system, has been updated accordingly; and update, by the processor, a remote primary record in response to receiving the indication.

17. The computer program product of claim 16, wherein reading the requested data from a storage volume in the primary system includes:

performing, by the processor, an iterative process which includes:

determining, by the processor, whether the requested data is in a particular storage volume in the primary system, beginning with a storage volume immediately upstream from an interface of the cascaded mapping relationship; and progressing, by the processor, immediately upstream one storage volume towards the source volume in response to determining that the requested data is not in the particular storage volume; and reading, by the processor, the requested data from a storage volume in the primary system in response to determining that the data is in the particular storage volume.

* * * * *